(12) United States Patent
Uehara et al.

(10) Patent No.: US 10,649,582 B2
(45) Date of Patent: May 12, 2020

(54) DETECTION APPARATUS, DISPLAY APPARATUS, AND DETECTION METHOD

(71) Applicant: Japan Display Inc., Tokyo (JP)

(72) Inventors: Toshinori Uehara, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 133 days.

(21) Appl. No.: 15/963,670

(22) Filed: Apr. 26, 2018

(65) Prior Publication Data

US 2018/0314380 A1 Nov. 1, 2018

(30) Foreign Application Priority Data

Apr. 28, 2017 (JP) ................. 2017-090633

(51) Int. Cl.
*G06F 3/041* (2006.01)
*G06F 3/044* (2006.01)

(52) U.S. Cl.
CPC ........ *G06F 3/04166* (2019.05); *G06F 3/0412* (2013.01); *G06F 3/0445* (2019.05); *G06F 3/0446* (2019.05); *G06F 2203/04103* (2013.01); *G06F 2203/04107* (2013.01); *G06F 2203/04108* (2013.01)

(58) Field of Classification Search
CPC ...... G06F 3/044; G06F 3/0416; G06F 3/0418; G06K 9/00006–0002
See application file for complete search history.

(56) References Cited

U.S. PATENT DOCUMENTS

| 5,844,506 A * | 12/1998 | Binstead | G06F 3/0202 341/34 |
| 6,239,788 B1 * | 5/2001 | Nohno | G06F 3/0412 178/18.03 |
| 8,766,950 B1 * | 7/2014 | Morein | G06F 3/0416 345/173 |
| 8,884,909 B2 * | 11/2014 | Huang | G06F 3/044 345/173 |
| 9,886,152 B2 * | 2/2018 | Kim | G06F 3/044 |
| 10,067,620 B2 * | 9/2018 | Xie | G06F 3/044 |
| 10,209,834 B2 * | 2/2019 | Pylvas | G06F 3/0412 |
| 2008/0007679 A1 * | 1/2008 | Ochiai | G02F 1/134363 349/114 |
| 2010/0110037 A1 * | 5/2010 | Huang | G06F 3/044 345/174 |

(Continued)

FOREIGN PATENT DOCUMENTS

JP 2014-199605 A 10/2014
JP 2015-230599 A 12/2015

*Primary Examiner* — Patrick F Marinelli
(74) *Attorney, Agent, or Firm* — K&L Gates LLP

(57) ABSTRACT

A detection apparatus includes a first substrate, a first electrode, a plurality of second electrodes, a detection controller, and a second electrode controller. The first electrode is disposed on the first substrate. The second electrodes have an area smaller than the area of the first electrode and overlap the first electrode. The detection controller is coupled to the first electrode and detects a detection signal corresponding to a capacitance change in the first electrode. The second electrode controller supplies, to some of second electrodes in the second electrodes, a guard signal for suppressing a capacitance change in overlapping areas of the first electrode overlapping the respective second electrodes.

16 Claims, 32 Drawing Sheets

(56) References Cited

U.S. PATENT DOCUMENTS

| | | | |
|---|---|---|---|
| 2013/0076643 A1* | 3/2013 | Peterson | G06F 3/0416 345/173 |
| 2014/0043281 A1* | 2/2014 | Kim | G06F 3/044 345/174 |
| 2014/0292709 A1 | 10/2014 | Mizuhashi et al. | |
| 2015/0185920 A1* | 7/2015 | Reynolds | G06F 3/041 345/174 |
| 2015/0227229 A1* | 8/2015 | Schwartz | G06F 3/044 345/174 |
| 2015/0277626 A1* | 10/2015 | Shinkai | G06F 3/044 345/174 |
| 2015/0355765 A1 | 12/2015 | Fukushima et al. | |
| 2016/0070387 A1* | 3/2016 | Park | G06F 3/0416 345/174 |
| 2016/0098114 A1* | 4/2016 | Pylvas | G06F 3/0412 345/174 |
| 2016/0306467 A1* | 10/2016 | Reynolds | G06F 3/041 |
| 2017/0052614 A1* | 2/2017 | Hsiao | G06F 3/044 |
| 2017/0068349 A1* | 3/2017 | Kim | G06F 3/044 |
| 2017/0090615 A1* | 3/2017 | Bohannon | G06F 3/044 |
| 2017/0090658 A1* | 3/2017 | Park | G06F 3/0416 |
| 2017/0192508 A1* | 7/2017 | Lim | G06F 3/016 |
| 2017/0315646 A1* | 11/2017 | Roziere | G02F 1/13338 |
| 2017/0336910 A1* | 11/2017 | Han | G06F 3/0416 |
| 2017/0351378 A1* | 12/2017 | Wang | G06F 3/0416 |
| 2018/0046274 A1* | 2/2018 | Xie | G06F 3/044 |
| 2018/0095581 A1* | 4/2018 | Hwang | H01L 27/323 |
| 2018/0275824 A1* | 9/2018 | Li | G06F 3/044 |
| 2018/0307368 A1* | 10/2018 | Koide | G02F 1/13338 |
| 2018/0314380 A1* | 11/2018 | Uehara | G06F 3/0416 |
| 2018/0348951 A1* | 12/2018 | Kurasawa | G02F 1/13338 |
| 2019/0065807 A1* | 2/2019 | Mizuhashi | G06F 3/044 |
| 2019/0073061 A1* | 3/2019 | Krah | G02F 1/13338 |
| 2019/0102004 A1* | 4/2019 | Krah | G06F 1/1643 |
| 2019/0102010 A1* | 4/2019 | Knabenshue | G06F 3/044 |
| 2019/0102037 A1* | 4/2019 | Krah | G06F 3/0416 |

* cited by examiner

(TABLE 2)

$Ca_{mn}$

| n\m | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 |
| 3 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 |
| 4 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 |
| 5 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 |
| 6 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 |
| 7 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 |
| 8 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 |
| 9 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 |
| 10 | 1 | 0 | 1 | 0 | 1 | 0 | 1 | 0 | 0 | 1 | 0 | 1 | 0 | 1 | 0 | 1 | 1 | 0 | 1 | 0 | 1 | 0 | 1 | 0 | 0 | 1 | 0 | 1 | 0 | 1 | 0 | 1 |
| 11 | 1 | 1 | 0 | 0 | 1 | 1 | 0 | 0 | 0 | 0 | 1 | 1 | 0 | 0 | 1 | 1 | 1 | 1 | 0 | 0 | 1 | 1 | 0 | 0 | 0 | 0 | 1 | 1 | 0 | 0 | 1 | 1 |
| 12 | 1 | 0 | 0 | 1 | 1 | 0 | 0 | 1 | 0 | 1 | 1 | 0 | 0 | 1 | 1 | 0 | 1 | 0 | 0 | 1 | 1 | 0 | 0 | 1 | 0 | 1 | 1 | 0 | 0 | 1 | 1 | 0 |
| 13 | 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 | 0 | 1 | 0 | 0 | 0 | 0 | 1 | 1 | 1 |
| 14 | 1 | 0 | 1 | 0 | 0 | 1 | 0 | 1 | 0 | 1 | 0 | 1 | 1 | 0 | 1 | 0 | 1 | 0 | 1 | 0 | 0 | 1 | 0 | 1 | 0 | 0 | 0 | 1 | 0 | 1 | 0 | 1 |
| 15 | 1 | 1 | 0 | 0 | 0 | 0 | 1 | 1 | 0 | 0 | 1 | 1 | 1 | 1 | 0 | 0 | 1 | 1 | 0 | 0 | 0 | 0 | 1 | 1 | 0 | 0 | 1 | 1 | 1 | 1 | 0 | 0 |
| 16 | 1 | 0 | 0 | 1 | 0 | 1 | 1 | 0 | 0 | 1 | 1 | 0 | 1 | 0 | 0 | 1 | 1 | 0 | 1 | 0 | 1 | 1 | 1 | 0 | 0 | 1 | 0 | 1 | 0 | 0 | 0 | 1 |
| 17 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |
| 18 | 1 | 0 | 1 | 0 | 1 | 0 | 1 | 0 | 1 | 0 | 1 | 0 | 1 | 0 | 1 | 0 | 0 | 1 | 0 | 1 | 0 | 1 | 0 | 1 | 0 | 1 | 0 | 1 | 0 | 1 | 0 | 1 |
| 19 | 1 | 1 | 0 | 0 | 1 | 1 | 0 | 0 | 1 | 1 | 0 | 0 | 1 | 1 | 0 | 0 | 0 | 0 | 1 | 1 | 0 | 0 | 1 | 1 | 0 | 0 | 1 | 1 | 0 | 0 | 1 | 1 |
| 20 | 1 | 0 | 0 | 1 | 1 | 0 | 0 | 1 | 1 | 0 | 0 | 1 | 1 | 0 | 0 | 1 | 0 | 1 | 1 | 0 | 0 | 1 | 1 | 0 | 0 | 1 | 1 | 0 | 0 | 1 | 1 | 0 |
| 21 | 1 | 1 | 1 | 1 | 0 | 0 | 0 | 0 | 1 | 1 | 1 | 1 | 0 | 0 | 0 | 0 | 0 | 0 | 0 | 0 | 1 | 1 | 1 | 1 | 0 | 0 | 0 | 0 | 1 | 1 | 1 | 1 |
| 22 | 1 | 0 | 1 | 0 | 0 | 1 | 0 | 1 | 1 | 0 | 1 | 0 | 0 | 1 | 0 | 1 | 0 | 1 | 0 | 1 | 1 | 0 | 1 | 0 | 0 | 1 | 0 | 1 | 1 | 0 | 1 | 0 |
| 23 | 1 | 1 | 0 | 0 | 0 | 0 | 1 | 1 | 1 | 1 | 0 | 0 | 0 | 0 | 1 | 1 | 0 | 0 | 1 | 1 | 1 | 1 | 0 | 0 | 0 | 0 | 1 | 1 | 1 | 1 | 0 | 0 |
| 24 | 1 | 0 | 0 | 1 | 0 | 1 | 1 | 0 | 1 | 0 | 0 | 1 | 0 | 1 | 1 | 0 | 0 | 1 | 1 | 0 | 1 | 0 | 0 | 1 | 0 | 1 | 1 | 0 | 1 | 0 | 0 | 1 |
| 25 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 |
| 26 | 1 | 0 | 1 | 0 | 1 | 0 | 1 | 0 | 0 | 1 | 0 | 1 | 0 | 1 | 0 | 1 | 0 | 1 | 0 | 1 | 0 | 1 | 0 | 1 | 1 | 0 | 1 | 0 | 1 | 0 | 1 | 0 |
| 27 | 1 | 1 | 0 | 0 | 1 | 1 | 0 | 0 | 0 | 0 | 1 | 1 | 0 | 0 | 1 | 1 | 0 | 0 | 1 | 1 | 0 | 0 | 1 | 1 | 1 | 1 | 0 | 0 | 1 | 1 | 0 | 0 |
| 28 | 1 | 0 | 0 | 1 | 1 | 0 | 0 | 1 | 0 | 1 | 1 | 0 | 0 | 1 | 1 | 0 | 0 | 1 | 1 | 0 | 1 | 1 | 1 | 0 | 1 | 0 | 0 | 1 | 1 | 0 | 0 | 1 |
| 29 | 1 | 1 | 1 | 1 | 0 | 0 | 0 | 0 | 0 | 0 | 0 | 0 | 1 | 1 | 1 | 1 | 0 | 0 | 0 | 0 | 1 | 1 | 1 | 1 | 1 | 1 | 1 | 1 | 0 | 0 | 0 | 0 |
| 30 | 1 | 0 | 1 | 0 | 0 | 1 | 0 | 1 | 0 | 1 | 0 | 1 | 1 | 0 | 1 | 0 | 0 | 1 | 0 | 1 | 1 | 0 | 1 | 0 | 1 | 0 | 1 | 0 | 0 | 1 | 0 | 1 |
| 31 | 1 | 1 | 0 | 0 | 0 | 0 | 1 | 1 | 0 | 0 | 1 | 1 | 1 | 1 | 0 | 0 | 0 | 0 | 1 | 1 | 1 | 1 | 0 | 0 | 1 | 1 | 0 | 0 | 0 | 0 | 1 | 1 |
| 32 | 1 | 0 | 0 | 1 | 0 | 1 | 1 | 0 | 0 | 1 | 1 | 0 | 1 | 0 | 0 | 1 | 0 | 1 | 1 | 0 | 1 | 0 | 0 | 1 | 1 | 0 | 0 | 1 | 0 | 1 | 1 | 0 |

$Ca_{1n}$

DETECTION APPARATUS, DISPLAY APPARATUS, AND DETECTION METHOD

CROSS-REFERENCE TO RELATED APPLICATIONS

This application claims priority from Japanese Application No. 2017-090633, filed on Apr. 28, 2017, the contents of which are incorporated by reference herein in its entirety.

BACKGROUND

Technical Field

The present disclosure relates to a detection apparatus, a display apparatus, and a detection method.

Description of the Related Art

Detection apparatuses capable of detecting an external proximity object, what are called touch panels, have recently been attracting attention. Touch panels are mounted on or integrated with a display apparatus, such as a liquid crystal display apparatus, and used as display apparatuses. Various methods for driving such detection apparatuses are known, including code division multiplex drive. Code division multiplex drive is a method for detecting an external proximity object by selecting a plurality of drive electrodes simultaneously and supplying drive signals having phases determined based on a predetermined code to the respective selected drive electrodes (refer to Japanese Patent Application Laid-open Publication No. 2014-199605).

If drive signals having different phases are supplied to a plurality of detection electrodes, capacitive coupling between the detection electrodes increases, thereby reducing the detection sensitivity. To increase the resolution for detection, it is necessary to divide the detection electrodes into a number of pieces, couple wires to the respective detection electrodes, and control the detection electrodes individually. This configuration increases the number of detection electrodes to be controlled and the number of wires, making it difficult to increase the detection resolution.

SUMMARY

A detection apparatus according to one aspect includes a first substrate, a first electrode disposed on the first substrate, a plurality of second electrodes having an area smaller than the area of the first electrode and overlapping the first electrode, a detection controller coupled to the first electrode and configured to detect a detection signal corresponding to a capacitance change in the first electrode, and a second electrode controller configured to supply, to some of second electrodes in the second electrodes, a guard signal for suppressing a capacitance change in overlapping areas of the first electrode overlapping the respective second electrodes.

A display apparatus according to one aspect includes the above-described detection apparatus, and a display layer configured to display an image.

A detection method according to one aspect performed by a detection apparatus including a first substrate, a first electrode disposed on the first substrate, a plurality of second electrodes having an area smaller than the area of the first electrode and overlapping the first electrode, a detection controller coupled to the first electrode and configured to detect a detection signal corresponding to a capacitance change in the first electrode, and a second electrode controller configured to select some of second electrodes in the second electrodes, includes step of supplying, to the some of the second electrodes by the second electrode controller, a guard signal for suppressing a capacitance change in overlapping areas of the first electrode overlapping the respective second electrodes and supplying a detection signal corresponding to the capacitance change in the first electrode to the detection controller.

BRIEF DESCRIPTION OF THE DRAWINGS

FIG. 13 is a diagram for explaining an example of an allocation pattern of a CDM code in code division multiplex drive performed by the detector according to the first embodiment;

FIG. 25 is a table of an example of the CDM code according to the second modification of the first embodiment;

DETAILED DESCRIPTION

Figure 1:
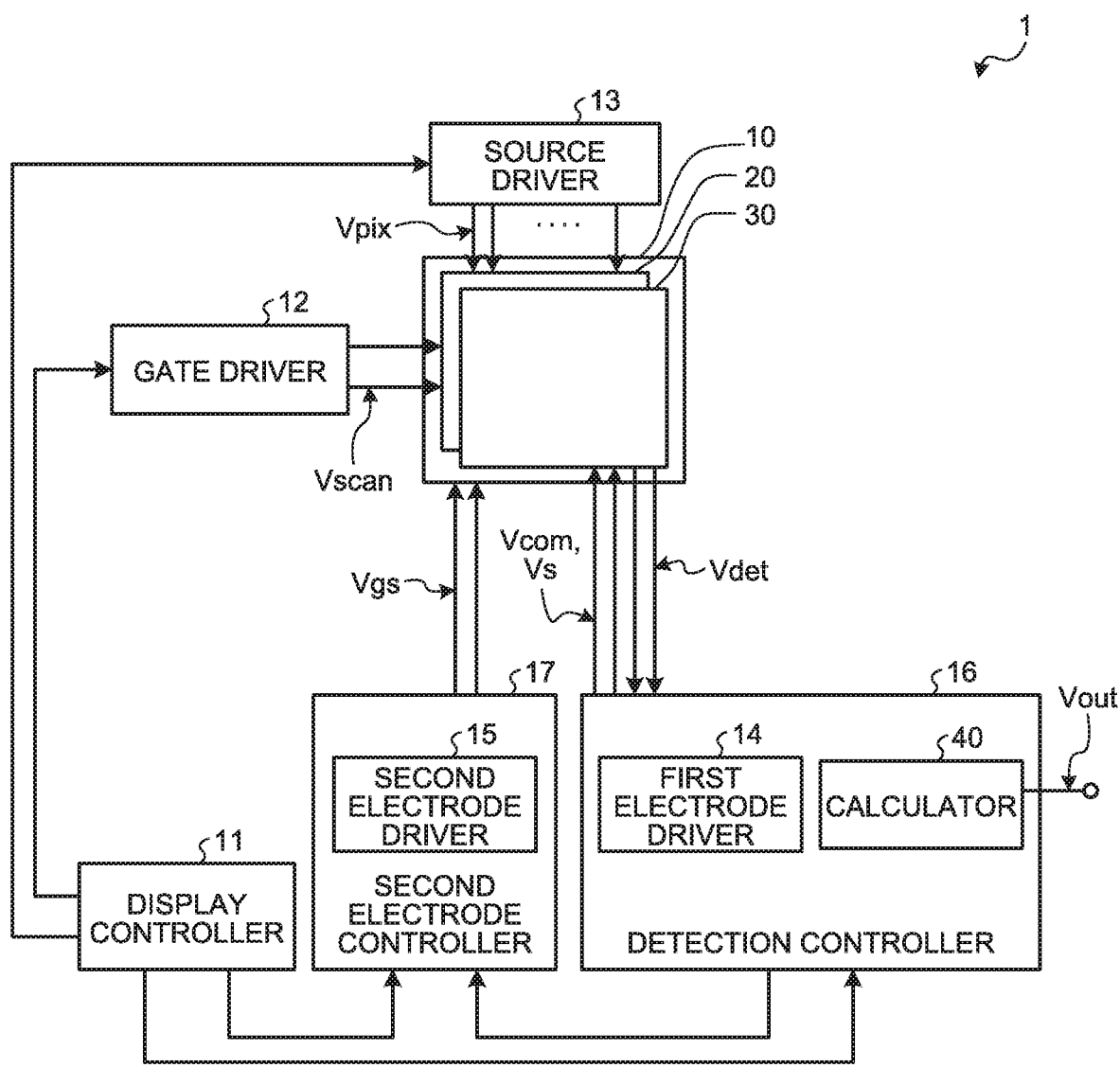
FIG. 1 is a block diagram of an exemplary configuration of a display apparatus according to a first embodiment of the present disclosure.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate changes made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present specification and the figures, components similar to those previously described with reference to previous figures are denoted by like reference numerals, and detailed explanation thereof may be appropriately omitted.

First Embodiment

FIG. 1 is a block diagram of an exemplary configuration of a display apparatus according to a first embodiment of the present disclosure. As illustrated in FIG. 1, a display apparatus 1 includes a detection display device 10, a display controller 11, a gate driver 12, a source driver 13, a detection controller 16, and a second electrode controller 17. The display apparatus 1 has a detection function.

The detection display device 10 includes a display device 20 and a detector 30. The display device 20 includes display elements that perform display. The detector 30 is a detection apparatus that detects touch input. The detection display device 10 according to the present embodiment is an apparatus in which the display device 20 and the detector 30 are integrated. An apparatus in which the display device 20 and the detector 30 are integrated means an apparatus in which some of members, such as substrates and electrodes, are shared by the display device 20 and the detector 30, for example. The detection display device 10 may be what is called an on-cell apparatus in which the detector 30 is mounted on the display device 20. The display device 20 according to the present embodiment is a display panel including liquid crystal display elements serving as display elements. Alternatively, the display device 20 may be a display panel including organic electroluminescence (EL) elements serving as display elements, for example. Touch input according to the present embodiment includes not only contact but also proximity to the detection display device 10.

The display device 20 is a display apparatus that sequentially scans horizontal lines one by one to perform display based on scanning signals Vscan supplied from the gate driver 12.

The display controller 11 is a circuit that mainly controls a display operation. The display controller 11 supplies display control signals to the gate driver 12 and the source driver 13 based on video signals supplied from the outside. The display controller 11 supplies detection control signals to the detection controller 16 and the second electrode controller 17. The display controller 11 supplies synchronization signals to the gate driver 12, the source driver 13, the detection controller 16, and the second electrode controller 17, thereby controlling them to operate synchronously with one another. Alternatively, the display controller 11 may control them to operate asynchronously with one another.

The gate driver 12 has a function to sequentially select one horizontal line to be a target of display drive in the detection display device 10 based on the display control signals supplied from the display controller 11.

The source driver 13 is a circuit that supplies pixel signals Vpix to respective pixels Pix of the detection display device 10 based on the display control signals supplied from the display controller 11. The display controller 11 may generate the pixel signals Vpix and supply them to the source driver 13.

The detector 30 operates based on the basic principle of capacitance touch detection. The detector 30 performs a touch detection operation by a self-capacitance method to detect contact or proximity of an external conductor. If the detector 30 detects contact or proximity of an external conductor, the detector 30 outputs detection signals Vdet.

The detection controller 16 includes a first electrode driver 14 and a calculator 40. The detection controller 16 is a circuit that controls a detection operation for detecting contact or proximity of an external conductor. The first electrode driver 14 is a circuit that supplies detection drive signals Vs to first electrodes 25 of the detection display device 10 based on the detection control signals supplied from the display controller 11. The first electrode driver 14 is a circuit that supplies display drive signals Vcom to the first electrodes 25 based on the display control signals supplied from the display controller 11. The calculator 40 is a circuit that determines whether touch input is performed on the detector 30 based on the detection control signals supplied from the display controller 11 and on detection signals Vdet output from the first electrodes 25. If touch input is detected, the calculator 40 calculates the coordinates at which the touch input is performed, for example.

The second electrode controller 17 includes a second electrode driver 15. The second electrode controller 17 is supplied with guard control signals based on a predetermined code from the detection controller 16. The second electrode controller 17 is a circuit that controls second electrodes 26 based on the guard control signals. The second electrode driver 15 selects second electrodes 26 based on the predetermined code and supplies guard signals Vgs to the selected second electrodes 26. Alternatively, the second electrode driver 15 supplies no guard signal Vgs to the second electrodes 26 and brings them into a floating state.

Figure 2:
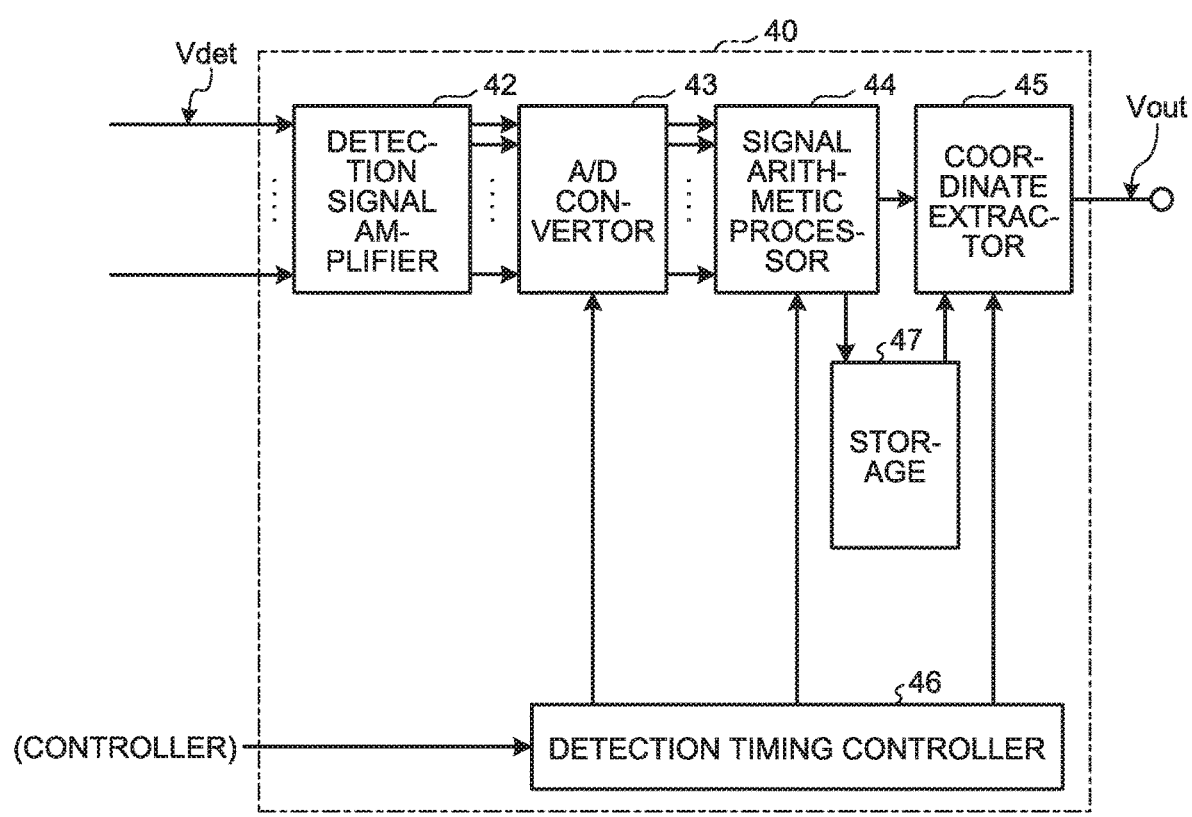
FIG. 2 is a block diagram of an exemplary configuration of a calculator.

FIG. 2 is a block diagram of an exemplary configuration of the calculator. The calculator 40 includes a detection signal amplifier 42, an analog/digital (A/D) converter 43, a signal arithmetic processor 44, a coordinate extractor 45, a detection timing controller 46, and a storage 47. The detection timing controller 46 controls the A/D converter 43, the signal arithmetic processor 44, and the coordinate extractor 45 such that they operate synchronously with one another based on the detection control signals supplied from the display controller 11.

Figure 3:
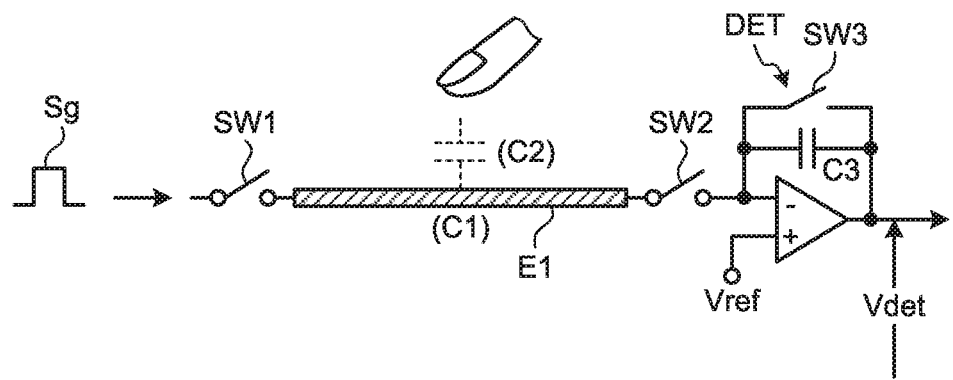
FIG. 3 is a diagram for explaining the basic principle of self-capacitance touch detection.
Figure 4:
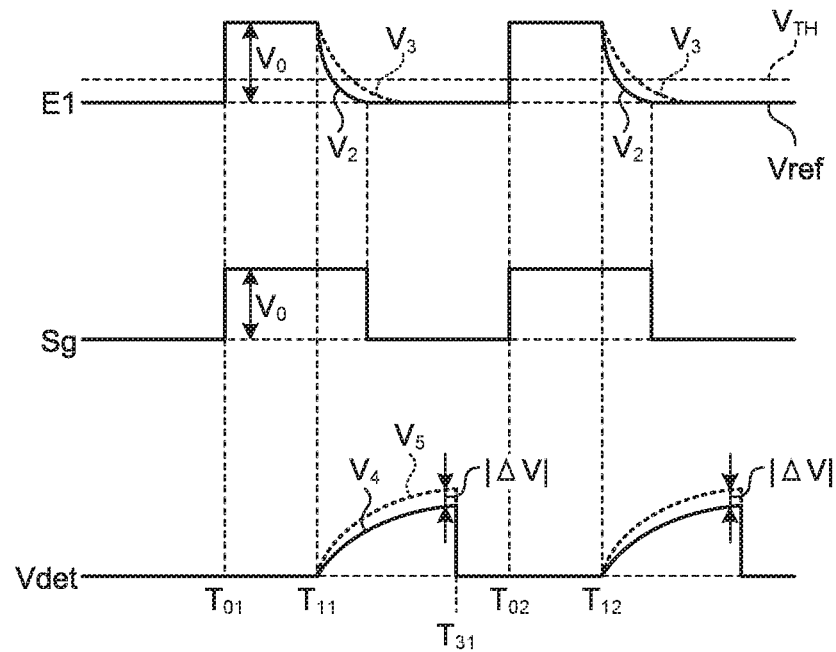
FIG. 4 is a diagram of an example of waveforms of a drive signal and a detection signal in self-capacitance touch detection.

As described above, the detector 30 operates based on the basic principle of capacitance touch detection. The following describes the basic principle of self-capacitance touch detection with reference to FIGS. 3 and 4. FIG. 3 is a diagram for explaining the basic principle of self-capacitance touch detection. FIG. 4 is a diagram of an example of waveforms of a drive signal and a detection signal in self-capacitance touch detection. FIG. 3 also illustrates a detection circuit.

In a state where a finger is neither in contact with nor in proximity to a detection electrode E1, an AC rectangular wave Sg at a predetermined frequency (e.g., a frequency of the order of several kilohertz to several hundred kilohertz) is applied to the detection electrode E1. The detection electrode E1 has capacitance C1, and an electric current corresponding to the capacitance C1 flows therethrough. A voltage detector DET converts fluctuations in the electric current depending on the AC rectangular wave Sg into fluctuations in the voltage (waveform $V_4$ indicated by the solid line (refer to FIG. 4)). The voltage detector DET is an integration circuit included in the detection signal amplifier 42 illustrated in FIG. 2, for example.

In a state where a finger is in contact with or in proximity to the detection electrode E1 as illustrated in FIG. 3, capacitance C2 formed between the finger and the detection electrode E1 is added to the capacitance C1 of the detection electrode E1. When the AC rectangular wave Sg is applied to the detection electrode E1, an electric current depending on the capacitance C1 and the capacitance C2 flows. As illustrated in FIG. 4, the voltage detector DET converts fluctuations in the electric current depending on the AC rectangular wave Sg into fluctuations in the voltage (waveform $V_5$ indicated by the dotted line). The calculator 40 integrates the voltage values of the waveforms $V_4$ and $V_5$ and compares the obtained values, thereby determining whether a finger is in contact with or in proximity to the detection electrode E1. The calculator 40 does not necessarily perform the operation described above and may compare the voltage values without integrating them. Alternatively, the calculator 40 may employ another method of calculating respective periods until when a waveform $V_2$ and a waveform $V_3$ in FIG. 4 fall to a predetermined reference voltage $V_{TH}$ and comparing these periods, for example.

Specifically, as illustrated in FIG. 3, the detection electrode E1 can be cut off from a power source that outputs the AC rectangular wave Sg by a switch SW1 and cut off from the voltage detector DET by a switch SW2. As illustrated in FIG. 4, the voltage level of the AC rectangular wave Sg rises to a level corresponding to a voltage $V_0$ at time $T_{01}$. At this time, the switch SW1 is turned on, and the switch SW2 is turned off. As a result, the voltage level of the detection electrode E1 also rises to the voltage $V_0$.

Subsequently, the switch SW1 is turned off before time $T_{11}$. At this time, the electric potential of the detection electrode E1 is maintained at $V_0$ by the capacitance C1 of the detection electrode E1 or capacitance (C1+C2, refer to FIG. 3) obtained by adding the capacitance C2 generated by contact or proximity of a finger or the like to the capacitance C1 of the detection electrode E1. Subsequently, a switch SW3 is turned on before time $T_{11}$ and turned off after a predetermined time has elapsed, thereby resetting the voltage detector DET. With this reset operation, the output voltage is made substantially equal to Vref.

Subsequently, when the switch SW2 is turned on at time $T_{11}$, the electric charge accumulated in the capacitance C1 (or C1+C2) of the detection electrode E1 moves to capacitance C3 in the voltage detector DET, whereby output from the voltage detector DET increases (Vdet). When a finger or the like is not in proximity to the detection electrode E1, the output (Vdet) from the voltage detector DET is represented by the waveform $V_4$ indicated by the solid line, and Vdet=C1×$V_0$/C3 is satisfied. When capacitance generated by an effect of a finger or the like is added, the output is represented by the waveform $V_5$ indicated by the dotted line, and Vdet=(C1+C2)×$V_0$/C3 is satisfied.

Subsequently, at time $T_{31}$, the switch SW2 is turned off, and the switches SW1 and SW3 are turned on. As a result, the electric potential of the detection electrode E1 falls to a low level, and the voltage detector DET is reset.

The operation described above is repeatedly performed at a predetermined frequency (e.g., a frequency of the order of several kilohertz to several hundred kilohertz). It can be determined whether an external proximity object is present (whether a touch is made) based on an absolute value |ΔV| of the difference between the waveform $V_4$ and the waveform $V_5$. As illustrated in FIG. 4, when a finger or the like is not in proximity to the detection electrode E1, the electric potential of the detection electrode E1 is represented by the waveform $V_2$. By contrast, when the capacitance C2 generated by an effect of a finger or the like is added, the electric potential is represented by the waveform $V_3$.

The detection signal amplifier 42 illustrated in FIG. 2 amplifies the detection signals Vdet supplied from the detector 30. The A/D converter 43 samples analog signals output from the detection signal amplifier 42 at a timing synchronized with the detection drive signals Vs, thereby converting the analog signals into digital signals.

The signal arithmetic processor 44 is a logic circuit that determines whether a touch is made on the detector 30 based on the output signals from the A/D converter 43. The signal arithmetic processor 44 performs processing of extracting only the difference between the detection signals caused by a finger. The signal of difference caused by a finger corresponds to the absolute value |ΔV| of the difference between the waveform $V_4$ and the waveform $V_5$.

The signal arithmetic processor 44 compares the absolute value |ΔV| with a predetermined threshold voltage. If the absolute value |ΔV| is lower than the threshold voltage, the signal arithmetic processor 44 determines that an external proximity object is in a non-contact state. By contrast, if the absolute value |ΔV| is equal to or higher than the threshold voltage, the signal arithmetic processor 44 determines that an external proximity object is in a contact state. The calculator 40 thus can perform touch detection. The signal arithmetic processor 44 receives detection signals from the first electrodes 25 and performs arithmetic processing on the detection signals based on the predetermined code. The detection signals resulting from the arithmetic processing are temporarily stored in the storage 47. The signal arithmetic processor 44 receives the detection signals stored in the storage 47 and performs decoding on the detection signals based on the predetermined code. The storage 47 may be a random access memory (RAM), a read only memory (ROM), or a register circuit, for example.

The coordinate extractor 45 is a logic circuit that calculates, if the signal arithmetic processor 44 detects a touch, the touch panel coordinates of the touch. The coordinate extractor 45 calculates the touch panel coordinates based on the information resulting from decoding and outputs the obtained touch panel coordinates as output Vout. As described above, the display apparatus 1 according to the present embodiment can detect the touch panel coordinates of the position at which a conductor, such as a finger, is in contact with or in proximity to the detector 30 based on the basic principle of self-capacitance touch detection.

Figure 5:
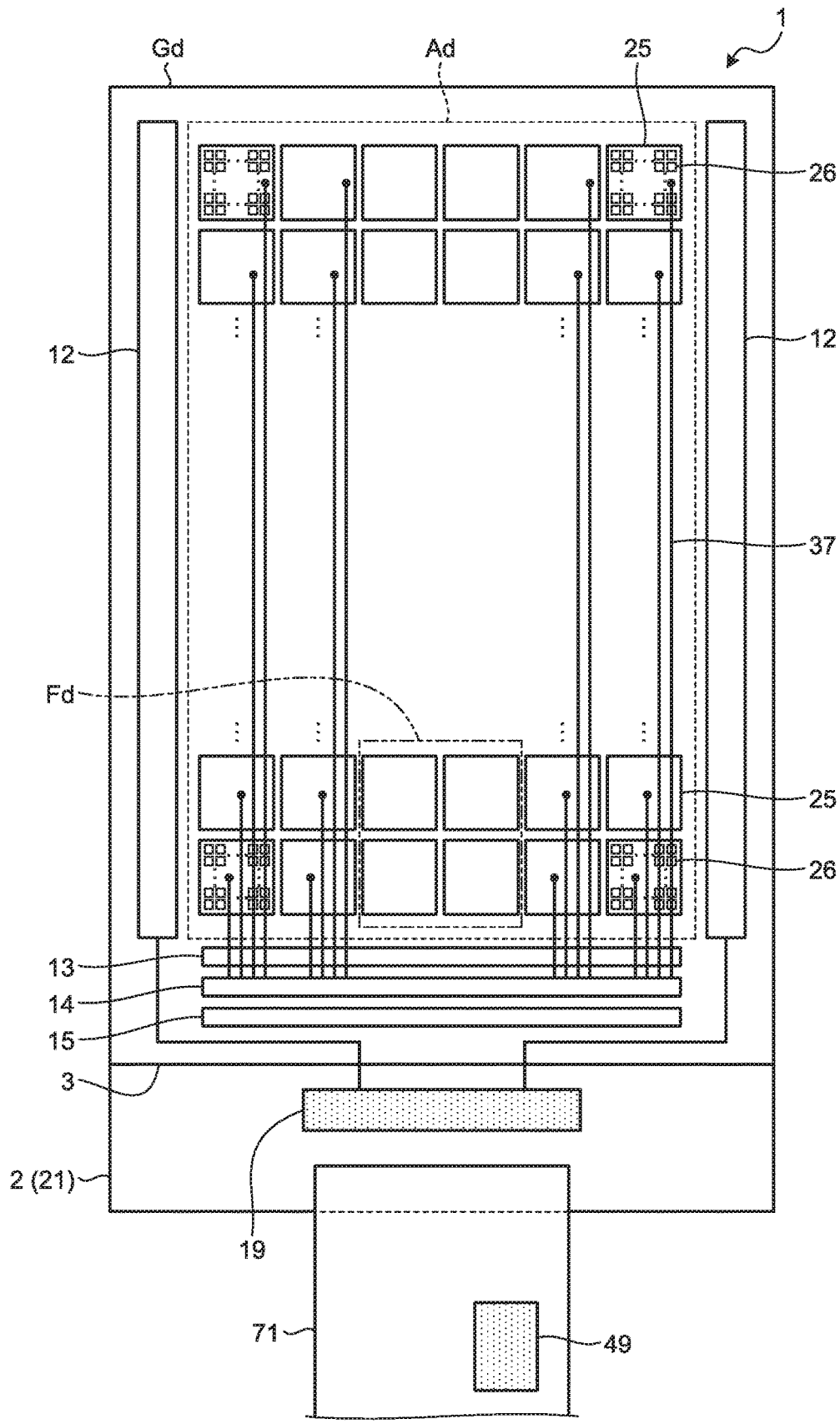
FIG. 5 is a diagram of an example of a module provided with the display apparatus.

FIG. 5 is a diagram of an example of a module provided with the display apparatus. As illustrated in FIG. 5, the display apparatus 1 includes a pixel substrate 2 (first substrate 21) and a printed circuit board 71. The printed circuit board 71 is a flexible printed circuit board, for example. The pixel substrate 2 (first substrate 21) is provided with a first semiconductor integrated circuit (hereinafter, referred to as a "first IC") 19, which is a chip on glass (COG), for example. The first IC 19 is a chip of an IC driver mounted on the first substrate 21 and is a control device serving as the display controller 11 illustrated in FIG. 1 and including circuits required for the display operation.

The gate driver 12, the source driver 13, the first electrode driver 14, and the second electrode driver 15 according to the present embodiment are provided on the first substrate 21. At least one of the gate driver 12, the source driver 13, the first electrode driver 14, and the second electrode driver 15 may be included in the first IC 19. The COG is given by way of example of a mounting form, and the first IC 19 is not limited thereto. A component having the same functions as those of the first IC 19 may be provided as a chip on film or a chip on flexible (COF), for example.

As illustrated in FIG. 5, the first substrate 21 has a display region Ad and a frame region Gd. In the display region Ad, an image on the display device 20 is displayed. The frame region Gd is provided on the outside of the display region Ad. A plurality of first electrodes 25 are provided in a row-column configuration at a position overlapping the display region Ad of the first substrate 21. The first electrode 25 has a rectangular shape. The first electrodes 25 are arrayed in directions along the long side and the short side of the display region Ad. While the first electrode 25 has a rectangular shape in the description above, the shape of the first electrode 25 is not limited thereto and may be another shape. The first electrode 25, for example, may have a polygonal shape or a comb shape.

A plurality of second electrodes 26 are provided overlapping the first electrodes 25. The second electrode 26 has an area smaller than that of the first electrode 25 in planar view. A plurality of second electrodes 26 are disposed in a row-column configuration in an area overlapping one first electrode 25. While some of the second electrodes 26 are illustrated in FIG. 5, the second electrodes 26 are arrayed across the whole area of the display region Ad. As illustrated in FIG. 5, part of the display region Ad is provided with a fingerprint acquisition portion Fd. The fingerprint acquisition portion Fd is an area overlapping four first electrodes 25, for example, and is provided on the side closer to the printed circuit board 71 in the display region Ad. The configuration of the fingerprint acquisition portion Fd is not limited thereto. The fingerprint acquisition portion Fd may be an area overlapping one or two or more first electrodes 25 and be provided at any desired position in the display region Ad. A detection operation performed by the fingerprint acquisition portion Fd will be described later.

The first electrodes 25 are coupled to respective coupling wires 37 and supplied with the detection drive signals Vs from the first electrode driver 14 via the coupling wires 37. The first electrodes 25 are coupled, via the printed circuit board 71, to a second semiconductor integrated circuit (hereinafter, referred to as a "second IC") 49 mounted on the printed circuit board 71. The second IC 49 serves as the detection controller 16 and the second electrode controller 17 illustrated in FIG. 1. The detection signals Vdet from the respective first electrodes 25 are output to the second IC 49 via the coupling wires 37. While the first electrodes 25 are coupled to the second IC 49, the configuration is not limited thereto. The first IC 19, for example, may include the functions of the calculator 40, and the first electrodes 25 may be coupled to the first IC 19. The first IC 19 may have the functions of the second electrode controller 17.

The printed circuit board 71 is not limited to a flexible printed circuit board and may be a rigid circuit board or a rigid-flexible circuit board. The second IC 49 is not necessarily mounted on the printed circuit board 71 and may be provided on a control circuit board disposed outside the module and coupled via the printed circuit board 71 or on the first substrate 21. The second IC 49 according to the present embodiment is a touch driver IC mounted on the printed circuit board 71 and is a control device including circuits required to operate as the calculator 40. Part of the functions of the calculator 40 may be provided as functions of the first IC 19 or an external micro-processing unit (MPU).

Specifically, some of functions (e.g., noise reduction) in the various functions that can be provided as the functions of the second IC 49, such as A/D conversion and noise reduction, may be performed by the first IC 19 or a circuit, such as an MPU, provided separately from the second IC 49. The signal arithmetic processor 44, the coordinate extractor 45, and the storage 47 illustrated in FIG. 2 may be included in the first IC 19 or an external MPU, for example. In a case where the first IC 19 and the second IC 49 are provided as one IC (one-chip configuration), the detection signals may be transmitted to the first IC 19 on the first substrate 21 via wiring on the first substrate 21 or wiring on the printed circuit board 71, for example.

The display region Ad includes a number of pixels Pix disposed in a matrix (row-column configuration). The frame region Gd is provided with no pixel Pix when viewed in a direction perpendicular to the surface of the first substrate 21. The display region Ad according to the present embodiment has a rectangular shape. The gate driver 12, the source driver 13, the first electrode driver 14, and the second electrode driver 15 include thin-film transistor (TFT) elements and are provided in the frame region Gd on the first substrate 21. The source driver 13, the first electrode driver 14, and the second electrode driver 15 are provided along one short side of the display region Ad. In other words, the source driver 13, the first electrode driver 14, and the second electrode driver 15 are provided on one side of the frame region Gd provided with the printed circuit board 71. The gate driver 12 includes two circuits sandwiching the display region Ad.

The source driver 13, the first electrode driver 14, and the second electrode driver 15 may each include a plurality of circuits disposed along different sides of the display region Ad similarly to the gate driver 12 and be provided along the short side of the display region Ad. The gate driver 12 may be one circuit and provided along the short side of the display region Ad. While the source driver 13, the first electrode driver 14, and the second electrode driver 15 are disposed in this order from the display region Ad side to the frame region Gd side, the arrangement order is not limited thereto. The second electrode driver 15, for example, may be disposed closer to the display region Ad than the first electrode driver 14 is. The display region Ad does not necessarily have a rectangular shape and may have a polygonal shape.

The first electrode driver 14 supplies the detection drive signals Vs to the first electrodes 25 via the coupling wires 37. The first electrodes 25 output the detection signals Vdet corresponding to capacitance changes in the first electrodes 25 to the calculator 40 via the respective coupling wires 37. The first electrodes 25 according to the present embodiment correspond to the detection electrode E1 in the basic principle of self-capacitance touch detection described above. The detector 30 thus can detect a finger in contact with or in proximity to the detector 30 based on the basic principle of self-capacitance touch detection described above.

As illustrated in FIG. 5, the first electrodes 25 are disposed in a row-column configuration in the display region Ad and each serve as a touch sensor. The detection controller 16 simultaneously or sequentially outputs the detection drive signals Vs to the first electrodes 25 in the whole display region Ad. Consequently, the detection controller 16 can perform a detection operation on a touch detection surface. The detection controller 16 performs code division multiplex drive on the fingerprint acquisition portion Fd. Consequently, the detection controller 16 can detect partial detection signals that are based on capacitance changes corresponding to unevenness on the surface of an external object, such as a finger, in contact with or in proximity to the fingerprint acquisition portion Fd using the first electrodes 25.

Figure 6:
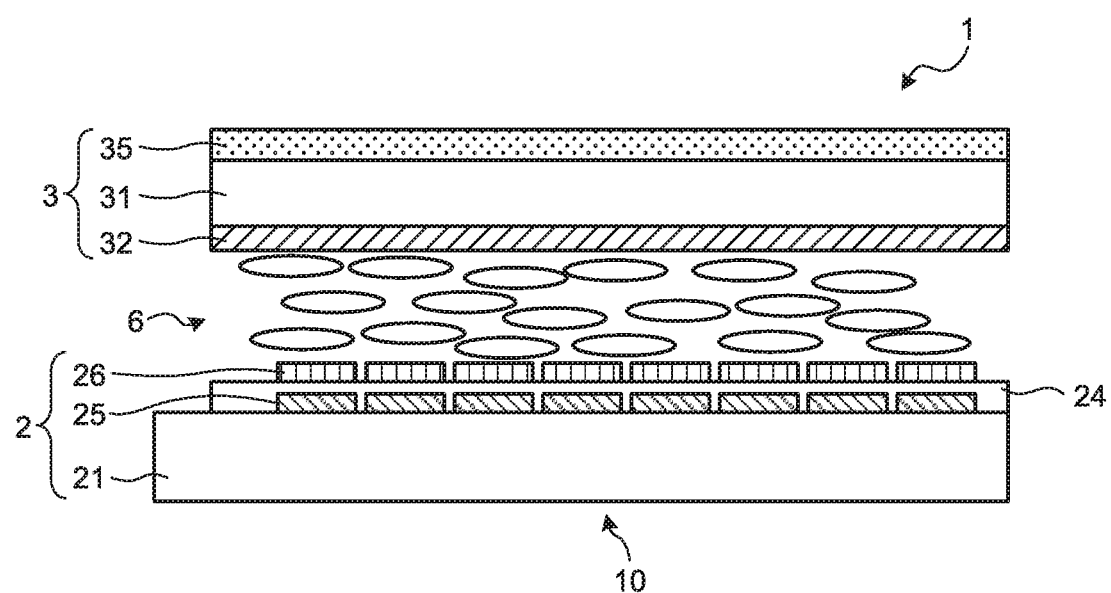
FIG. 6 is a sectional view of a schematic sectional structure of a detection display device.

The following describes an exemplary configuration of the detection display device 10 in greater detail. FIG. 6 is a sectional view of a schematic sectional structure of the detection display device. As illustrated in FIG. 6, the detection display device 10 includes the pixel substrate 2, a counter substrate 3, and a display layer (e.g., a liquid crystal layer 6). The counter substrate 3 is disposed facing the pixel substrate 2 in the direction perpendicular to the surface of the pixel substrate 2. The display layer is interposed between the pixel substrate 2 and the counter substrate 3. In other words, the display layer is provided between the first substrate 21 and a second substrate 31. The display layer may be disposed between the first electrodes 25 and the second electrodes 26, for example.

The pixel substrate 2 includes the first substrate 21, a plurality of second electrodes (pixel electrodes) 26, a plurality of first electrodes (detection electrodes) 25, and an insulating layer 24. The first substrate 21 is a circuit board. The second electrodes 26 are provided in a matrix (row-column configuration) on the first substrate 21. The first electrodes 25 are provided between the first substrate 21 and the second electrodes 26. The insulating layer 24 insulates the first electrodes 25 from the second electrodes 26. The first electrodes 25, the insulating layer 24, and the second electrodes 26 according to the present embodiment are provided in this order on the first substrate 21. The first substrate 21 is provided with TFTs. A polarizing plate may be provided under the first substrate 21 with an adhesive layer interposed therebetween. The first electrodes 25 and the second electrodes 26 are made of a translucent conductive material, such as indium tin oxide (ITO). In the present embodiment, an upper side indicates a side on which the second substrate 31 is disposed with respect to the first substrate 21, and a lower side indicates a side on which the first substrate 21 is disposed with respect to the second substrate 31.

The counter substrate 3 includes the second substrate 31 and a color filter 32. The color filter 32 is provided on one surface of the second substrate 31. In other words, the color filter 32 is disposed between the first substrate 21 and the second substrate 31. A polarizing plate 35 is provided on the second substrate 31 with an adhesive layer interposed therebetween. The color filter 32 may be disposed on the first substrate 21. The first substrate 21 and the second substrate 31 according to the present embodiment are translucent insulating substrates, that is, glass substrates or resin substrates, for example.

The liquid crystal layer 6 is provided between the first substrate 21 and the second substrate 31. The liquid crystal layer 6 modulates light passing therethrough depending on the state of an electric field. The liquid crystal layer 6, for example, includes liquid crystals in a lateral electric-field mode, such as the in-plane switching (IPS) mode including the fringe field switching (FFS) mode. Orientation films may be provided between the liquid crystal layer 6 and the first substrate 21 and between the liquid crystal layer 6 and the second substrate 31 illustrated in FIG. 6.

An illuminator is provided below the first substrate 21. The illuminator includes a light source, such as a light emitting diode (LED), and outputs light from the light source to the first substrate 21. The detection display device 10 changes the state of liquid crystal molecules included in the liquid crystal layer 6 based on the signals supplied to the first electrodes 25 and the second electrodes 26. The detection display device 10 thus switches the portions that block the light from the illuminator to prevent it from being output and the portions that allow the light to be output, thereby displaying an image on a display surface.

In a case where the display apparatus 1 is a reflective liquid crystal display apparatus including the second electrodes 26 serving as reflective electrodes that reflect light entering from the second substrate 31 side, the illuminator is not necessarily provided below the first substrate 21. The reflective liquid crystal display apparatus may include an illuminator, that is, a front light on the second substrate 31, for example. In this case, light entering from the second substrate 31 side is reflected by the reflective electrodes (second electrodes 26), passes through the second substrate 31, and reaches the eyes of an observer.

In a case where the display device 20 (refer to FIG. 1) is an organic EL display panel, the display device 20 includes self-luminous bodies for the respective pixels Pix. In this case, the display device 20 can display an image by controlling the lighting quantities of the respective self-luminous bodies. Consequently, the illuminator need not be provided. In a case where the display device 20 is an organic EL display panel, the display layer may be included in the pixel substrate 2. A luminous layer serving as the display layer, for example, may be disposed between the first electrodes and the second electrodes.

Figure 7:
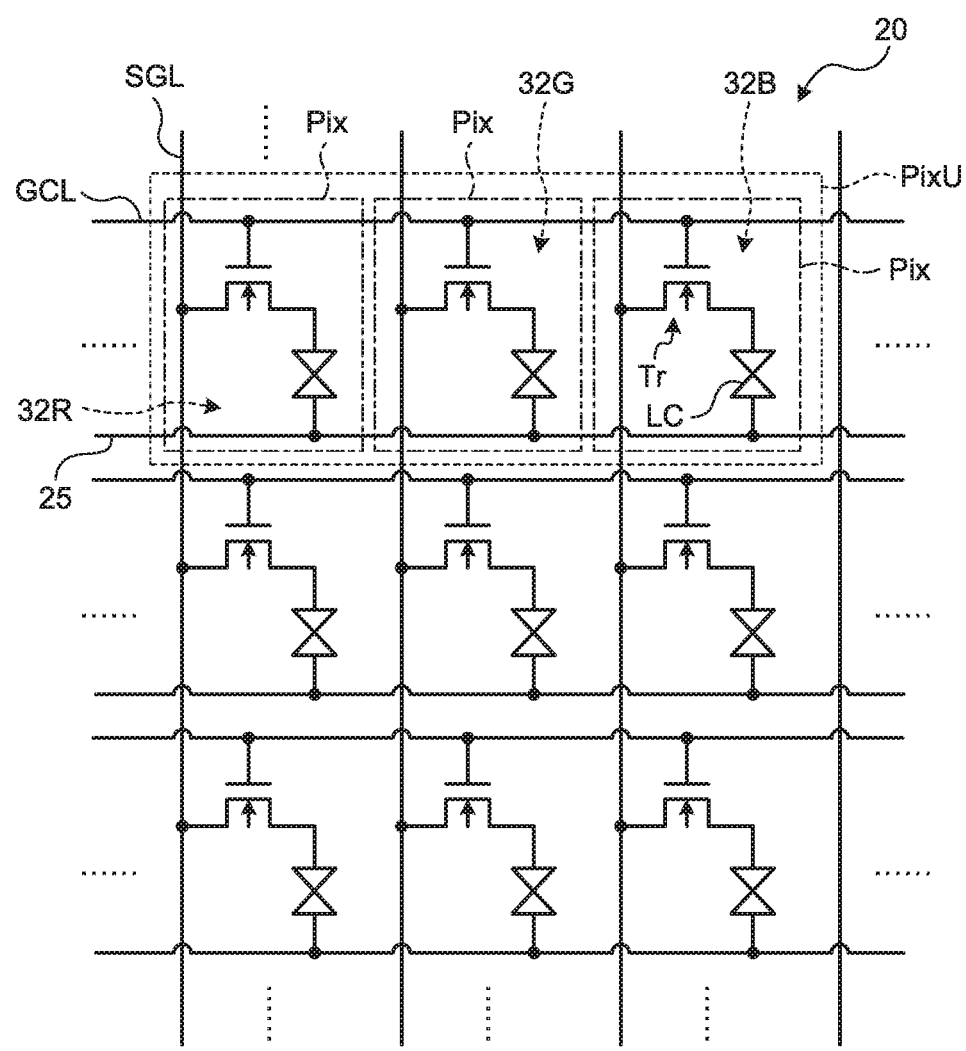
FIG. 7 is a circuit diagram of a pixel array in the detection display device according to the first embodiment.

FIG. 7 is a circuit diagram of a pixel array in the detection display device according to the first embodiment. The first substrate 21 illustrated in FIG. 6 is provided with switching elements Tr of the respective pixels Pix and wiring, such as data lines SGL and gate lines GCL, as illustrated in FIG. 7. The data lines SGL supply the pixel signals Vpix to the second electrodes 26. The gate lines GCL drive the switching elements Tr. The data lines SGL and the gate lines GCL extend on a plane parallel to the surface of the first substrate 21.

The display device 20 illustrated in FIG. 7 includes a plurality of pixels Pix arrayed in a matrix (row-column configuration). The pixels Pix each include the switching element Tr and a liquid crystal element LC serving as a display element. The switching element Tr is a thin-film transistor and is an n-channel metal oxide semiconductor (MOS) TFT in this example. One of the source and the drain of the switching element Tr is coupled to the data line SGL, the gate thereof is coupled to the gate line GCL, and the other of the source and the drain thereof is coupled to a first end of the liquid crystal element LC.

The second electrode 26 (not illustrated in FIG. 7) is coupled to the other of the source and the drain of the switching element Tr. The liquid crystal element LC is coupled to the switching element Tr via the second electrode 26. The first end of the liquid crystal element LC is coupled to the other of the source and the drain of the switching element Tr, and a second end thereof is coupled to the first electrode 25. The pixel Pix is driven based on electric charges supplied to the first electrode 25 and the second electrode 26.

The pixel Pix is coupled to the other pixels Pix belonging to the same row in the display device 20 by the gate line GCL. The gate lines GCL are coupled to the gate driver 12 (refer to FIG. 1) and supplied with the scanning signals Vscan from the gate driver 12. The pixel Pix is coupled to the other pixels Pix belonging to the same column in the display device 20 by the data line SGL. The data lines SGL are coupled to the source driver 13 (refer to FIG. 1) and supplied with the pixel signals Vpix from the source driver 13. The first electrodes 25 (common electrodes) are coupled to the first electrode driver 14 (refer to FIG. 1) and supplied with the display drive signals Vcom from the first electrode driver 14. The display drive signal Vcom is a direct-current (DC) voltage signal for supplying a common potential to a plurality of pixels Pix.

The gate driver 12 illustrated in FIG. 1 sequentially scans the gate line GCL. The scanning signals Vscan are applied to the gates of the switching elements Tr of the respective pixels Pix via the gate line GCL. As a result, one horizontal line out of the pixels Pix is sequentially selected as a target of display drive. The source driver 13 supplies the pixel signals Vpix to the pixels Pix belonging to the horizontal line. The display apparatus 1 thus performs display in units of one horizontal line. To perform the display operation, the first electrode driver 14 applies the display drive signals Vcom to the first electrode 25 corresponding to at least the horizontal line. The first electrode driver 14 may apply the display drive signals Vcom to a plurality of first electrode 25 including the first electrodes 25 (common electrodes) corresponding to the horizontal line. Alternatively, the first electrode driver 14 may apply the display drive signals Vcom to all the first electrodes 25 in the display region Ad.

The color filter 32 illustrated in FIG. 6 includes periodically arrayed color filters 32R, 32G, and 32B in three colors of red (R), green (G), and blue (B), for example. The color filters 32R, 32G, and 32B in the three colors of R, G, and B, respectively, are provided corresponding to the respective pixels Pix illustrated in FIG. 7. A set of the color filters 32R, 32G, and 32B serves as one pixel group PixU. The color filters 32 serving as one pixel group PixU may have a combination of other colors as long as they are colored in respective different colors. The color filters 32 serving as one pixel group PixU do not necessarily have a combination of three colors and may be a combination of four or more colors. The detection display device 10 does not necessarily include the color filters 32 and may perform monochrome display.

The first electrodes 25 illustrated in FIGS. 6 and 7 serve not only as common electrodes that supply a common potential to a plurality of pixels Pix of the display device 20 but also as detection electrodes of the detector 30 in touch detection.

In an example of an operating method performed by the display apparatus 1, the display apparatus 1 may perform the display operation (display period) and the touch detection operation (detection period) in a time-division manner. The display apparatus 1 may perform the touch detection operation and the display operation in any division manner. In the following description, the display apparatus 1 performs the touch detection operation and the display operation by dividing them into a plurality of sections in one frame period (1F) of the display device 20, that is, in a time required to display video information of one screen.

Figure 8:
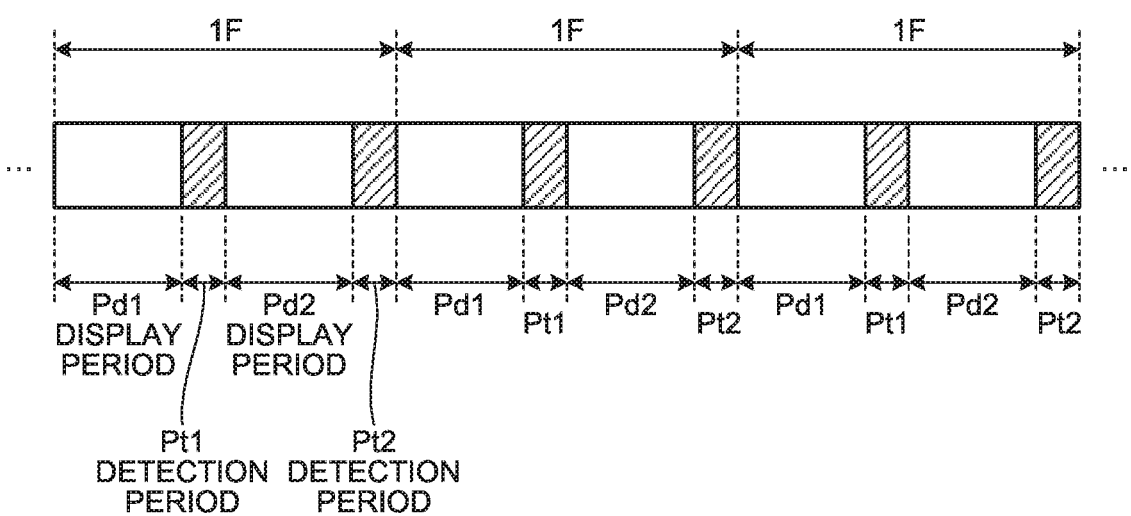
FIG. 8 is a diagram schematically illustrating an example of arrangement of display periods and detection periods.

FIG. 8 is a diagram schematically illustrating an example of arrangement of the display periods and the detection periods. One frame period (1F) includes two display periods Pd1 and Pd2 and two detection periods Pt1 and Pt2. These periods are alternately arranged on the time axis in the order of the display period Pd1, the detection period Pt1, the display period Pd2, and the detection period Pt2, for example.

The display controller 11 (refer to FIG. 1) causes the gate driver 12 and the source driver 13 to supply the pixel signals Vpix to the second electrodes 26 corresponding to the pixels Pix (refer to FIG. 7) in a plurality of rows selected in the display periods Pd1 and Pd2.

The display controller 11 (refer to FIG. 1) causes the first electrode driver 14 to supply the detection drive signals Vs to the first electrodes 25 selected in the detection periods Pt1 and Pt2. The calculator 40 determines whether touch input is performed and calculates the coordinates of an input position based on the detection signals Vdet supplied from the first electrodes 25.

The first electrodes 25 according to the present embodiment also serve as common electrodes of the display device 20. The display controller 11 causes the first electrode driver 14 to supply the display drive signals Vcom to all or some of the first electrodes 25 in the display periods Pd1 and Pd2.

In the example illustrated in FIG. 8, the display apparatus 1 performs video display of one screen by dividing it into two sections in one frame period (1F). The display apparatus 1 may divide the display period in one frame period (1F) into more sections. The display apparatus 1 may divide the detection period in one frame period (1F) into more sections.

The display apparatus 1 may perform touch detection on half of one detection screen or on one screen in each of the detection periods Pt1 and Pt2. The display apparatus 1 may perform touch detection on the whole touch detection surface in one detection period Pt1 or Pt2. Alternatively, the display apparatus 1 may perform thinned-out detection or the like as necessary. The display apparatus 1 may perform the display operation and the touch detection operation once without dividing them into a plurality of sections in one frame period (1F). The display apparatus 1 may perform the detection operation on the fingerprint acquisition portion Fd in one of the detection periods Pt1 and Pt2.

In the detection periods Pt1 and Pt2, the gate lines GCL and the data lines SGL (refer to FIG. 7) may be brought into a floating state where they are supplied with no voltage signal and their electric potential is not fixed. The gate lines GCL and the data lines SGL may be supplied with signals synchronized with and having the same waveform as that of the detection drive signals Vs. This mechanism can reduce stray capacitance between the first electrodes 25 serving as a target of detection and the gate lines GCL and between the first electrodes 25 and the data lines SGL. Consequently, the display apparatus 1 can reduce detection errors and suppress reduction in the detection sensitivity.

The following describes a method for performing detection on the fingerprint acquisition portion Fd (refer to FIG. 5). As described above, the first electrodes 25 serve as detection electrodes of the detector 30 in touch detection. To detect a fingerprint based on capacitance changes caused by unevenness on the surface of a finger, for example, it is necessary to perform touch detection at a smaller pitch and increase the resolution. With the first electrodes 25 having a smaller area and arrayed at a smaller pitch, for example, the resolution for detection can be increased. In this case, however, the number of coupling wires 37 increases, making it difficult to fabricate the configuration.

Figure 9:
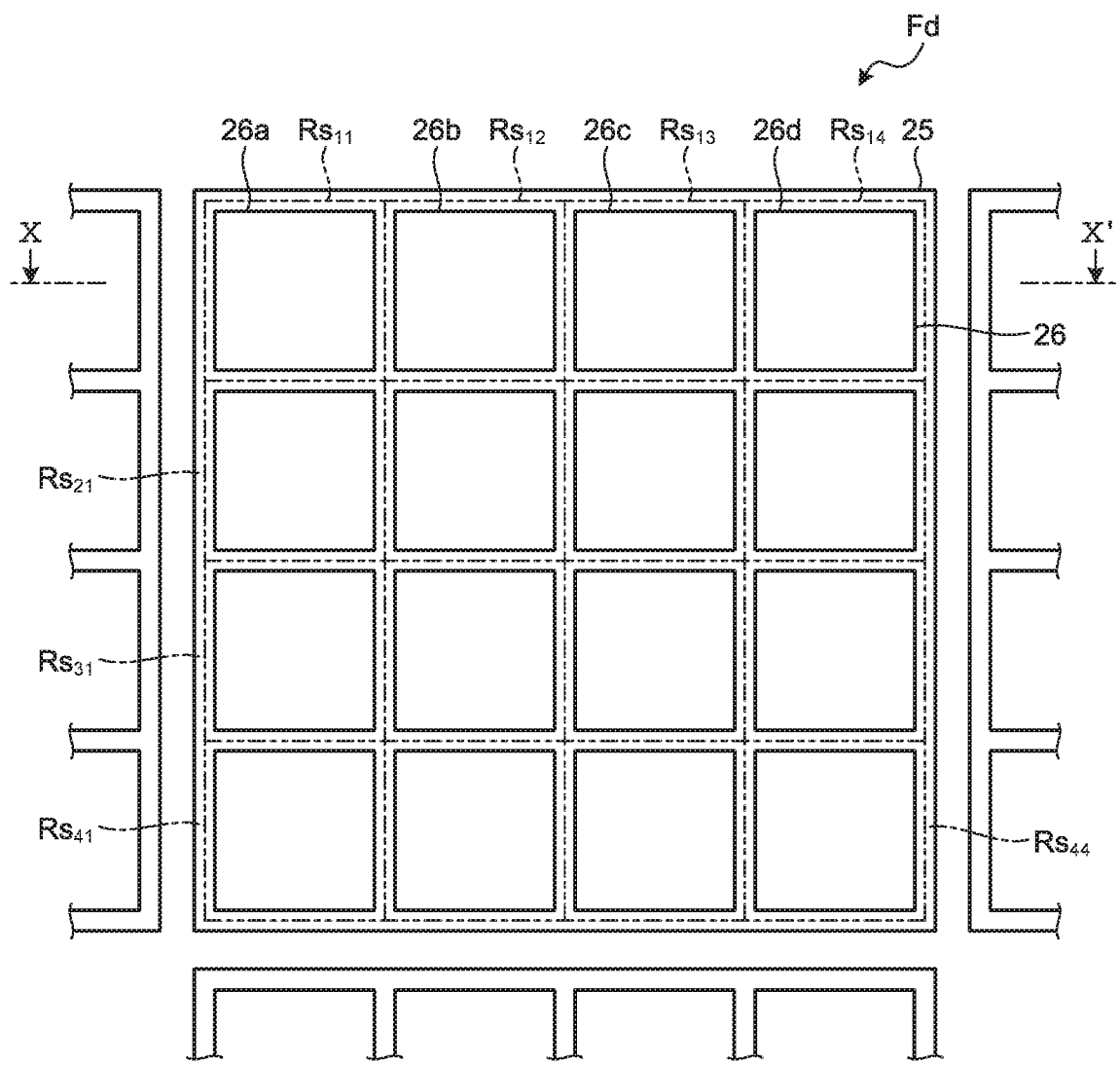
FIG. 9 is a plan view of the relation between first electrodes and second electrodes in a fingerprint acquisition portion according to the first embodiment.
Figure 10:
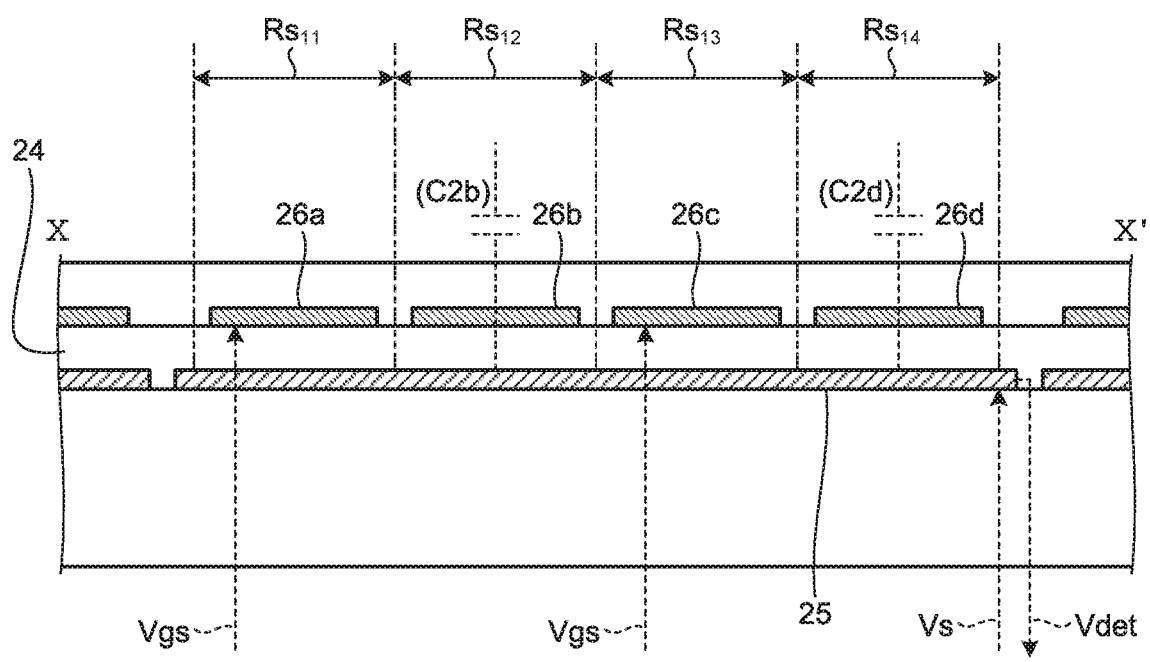
FIG. 10 is a schematic sectional view along line X-X' in FIG. 9.

FIG. 9 is a plan view of the relation between the first electrodes and the second electrodes in the fingerprint acquisition portion according to the first embodiment. FIG. 10 is a schematic sectional view along line X-X' in FIG. 9. As illustrated in FIG. 9, the second electrodes 26 are disposed in a row-column configuration overlapping one first electrode 25. Overlapping areas $Rs_{mn}$ (m=1 to m=4 and n=1 to n=4) overlapping the respective second electrodes 26 in the first electrode 25 are indicated by alternate long and two short dashes lines. The overlapping areas $Rs_{mn}$ are disposed in a row-column configuration corresponding to the respective second electrodes 26. To simplify the explanation, FIG. 9 illustrates second electrodes 26 in four rows and four columns, that is, a total of 16 second electrodes 26 provided corresponding to one first electrode 25. The configuration is not limited thereto, and 17 or more second electrodes 26 may be provided corresponding to one first electrode 25.

The second electrode controller 17 (refer to FIG. 1) according to the present embodiment selects second electrodes 26 serving as a first selection target and second electrodes 26 serving as a second selection target out of the second electrodes 26 based on the guard control signals. The second electrodes 26 serving as the second selection target are not included in the second electrodes 26 serving as the first selection target. For example, when the second electrode controller 17 selects second electrodes 26b and 26d as the first selection target and selects second electrodes 26a and 26c as the second selection target out of the second electrodes 26, the second electrode controller 17 supplies no guard signal Vgs to the second electrodes 26b and 26d serving as the first selection target as illustrated in FIG. 10. As a result, the second electrodes 26b and 26d are brought into a floating state where their electric potential is not fixed.

The second electrode controller 17 supplies the guard signals Vgs to the second electrodes 26a and 26c serving as the second selection target.

The guard signal Vgs is a signal for suppressing a capacitance change in the first electrode 25 and is a voltage signal having the same amplitude as that of the detection drive signal Vs supplied to the first electrode 25, for example. The guard signal Vgs may be a voltage signal having a waveform of the same phase as that of the detection drive signal Vs. The second electrodes 26a and 26c serving as the second selection target are driven at the same electric potential as that of the first electrode 25, thereby suppressing a capacitance change in the first electrode 25 when the detection drive signal Vs is supplied thereto. As described above, the second electrodes 26a and 26c are brought into a shielded state by the guard signals Vgs. The electric field of the first electrode 25 is blocked by the second electrodes 26a and 26c. This mechanism suppresses a capacitance change in the first electrode 25 in the overlapping areas $Rs_{11}$ and $Rs_{13}$ overlapping the second electrodes 26a and 26c, respectively.

By contrast, the second electrodes 26b and 26d are in a floating state. In the overlapping areas $Rs_{12}$ and $Rs_{14}$ overlapping the second electrodes 26b and 26d, respectively, capacitance C2b and capacitance C2d are formed between the first electrode 25 and an external object.

As described above, the second electrode controller 17 selects and drives the second electrodes 26 supplied with the guard signals Vgs and the second electrodes 26 in a floating state out of the second electrodes 26. Consequently, the second electrode controller 17 can switch the area that can detect a signal that is based on a capacitance change and the area that suppresses a capacitance change in units of the overlapping areas $Rs_{mn}$ in one first electrode 25.

The overlapping areas $Rs_{mn}$ in the first electrode 25 are electrically coupled to one another, and one coupling wire 37 is coupled to one first electrode 25. In other words, the detection signal Vdet output from the first electrode 25 is a value (detection signal) obtained by integrating the signals corresponding to capacitance changes in the respective overlapping areas $Rs_{mn}$. To increase the resolution for detection in one first electrode 25, it is necessary to calculate a signal (partial detection signal) corresponding to a capacitance change in each of the overlapping areas $Rs_{mn}$.

Figure 11:
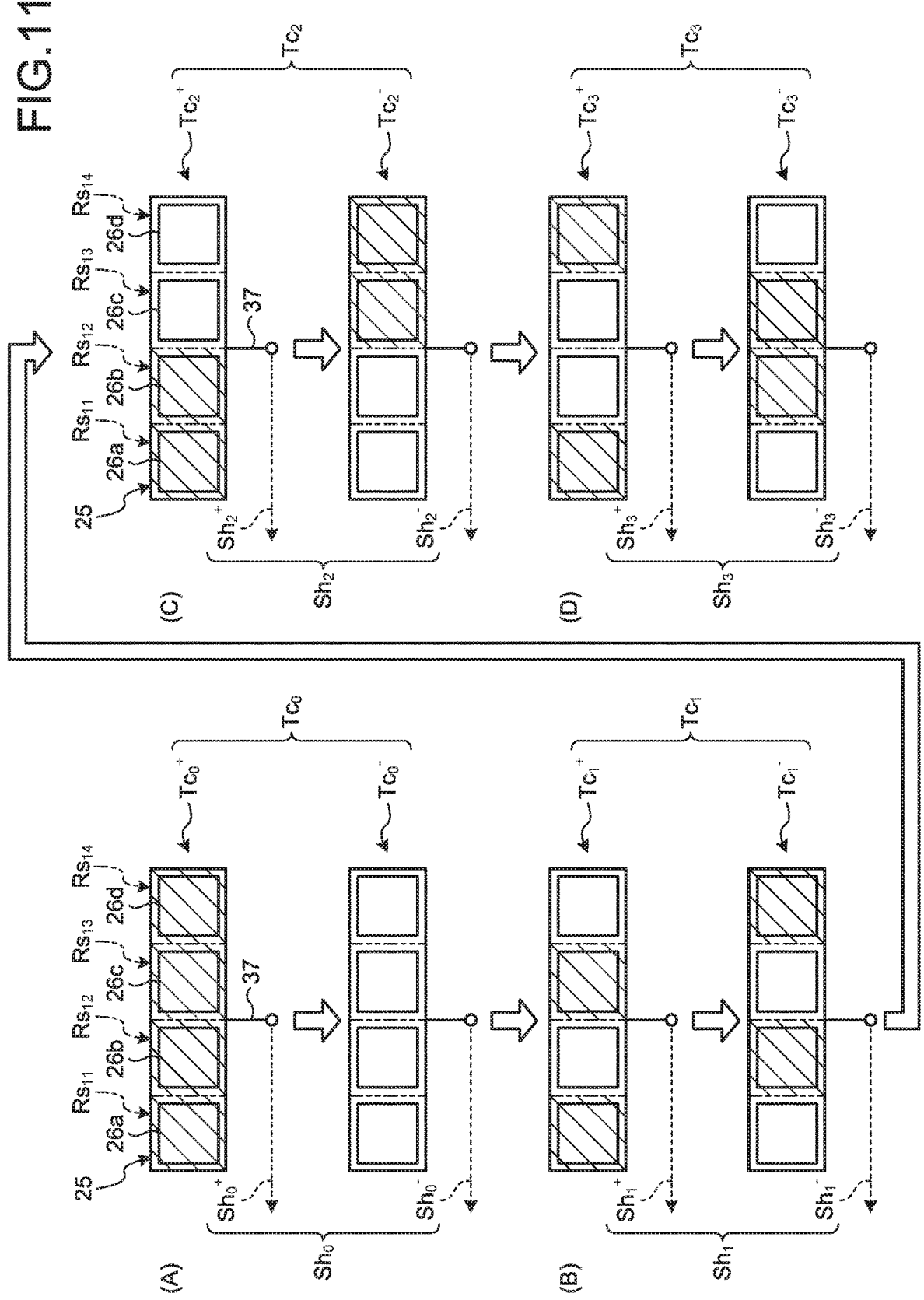
FIG. 11 is a diagram illustrating an example of code division multiplex drive and for explaining selection patterns of the second electrodes.

The following describes an example of code division multiplex drive performed by the detector 30 according to the present embodiment. FIG. 11 is a diagram illustrating an example of code division multiplex drive and for explaining selection patterns of the second electrodes. FIG. 11(A) illustrates the selection patterns of the second electrodes in a first detection operation $Tc_0$. FIG. 11(B) illustrates the selection patterns of the first electrodes in a second detection operation $Tc_1$. FIG. 11(C) illustrates the selection patterns of the first electrodes in a third detection operation $Tc_2$. FIG. 11(D) illustrates the selection patterns of the first electrodes in a fourth detection operation $Tc_3$.

The following describes the detection operations performed on the four second electrodes 26a, 26b, 26c, and 26d and the overlapping areas $Rs_{11}$, $Rs_{12}$, $Rs_{13}$, and $Rs_{14}$ overlapping the second electrodes 26a, 26b, 26c, and 26d, respectively, in the first electrodes 25 with reference to FIG. 11. The second electrode controller 17 according to the present embodiment selects the second electrodes 26 serving as the first selection target and the second electrodes 26 serving as the second selection target based on the guard control signals. The detection controller 16 supplies the detection drive signal Vs to the first electrode 25. The first electrode 25 outputs the detection signal based on a capacitance change in the first electrode 25. As described above, the first electrode 25 outputs a value (detection signal) obtained by integrating the signals corresponding to capacitance changes in the overlapping areas $Rs_{11}$, $Rs_{12}$, $Rs_{13}$, and $Rs_{14}$ in the first electrode 25. In the following description, the overlapping areas $Rs_{11}$ to $Rs_{14}$ are referred to as overlapping areas Rs when they need not be distinguished from one another.

Expression (1) represents the relation between a detection signal $Sh_p$ and a partial detection signal $Si_q$ of the first electrode 25. The partial detection signal $Si_q$ is a value (detection signal) corresponding to a capacitance change in each of the overlapping areas $Rs_{11}$, $Rs_{12}$, $Rs_{13}$, and $Rs_{14}$. When an electrode having a size corresponding to the overlapping area Rs is the detection electrode E1 in the basic principle of self-capacitance touch detection described above, the partial detection signal $Si_q$ is a signal value proportional to the capacitance C1 (refer to FIG. 3) of the detection electrode E1 or the capacitance (C1+C2, refer to FIG. 3) obtained by adding the capacitance C2 generated by contact or proximity of a finger or the like to the capacitance C1 of the detection electrode E1. For convenience of explanation, Expression (1) and other expressions indicate the partial detection signal $Si_q$ as a signal value of each of the overlapping areas Rs. In the actual operation, however, the first electrode 25 outputs not the partial detection signals $Si_q$ individually but the detection signal $Sh_p$ obtained by integrating the partial detection signals $Si_q$ to the calculator 40.

$$Sh_P = \sum_{q=0}^{Q-1} H_h Si_q \quad (1)$$

As indicated by Expression (1), the detection signal $Sh_p$ can be expressed by a square matrix $H_h$ and the partial detection signal $Si_q$. The guard control signal used to select the second electrodes 26 is a square matrix and a signal that is based on a predetermined code including a Hadamard matrix. The predetermined code is a square matrix the elements of which are either "1" or "−1" and certain two different rows of which are an orthogonal matrix. The predetermined code is defined by the square matrix $H_h$ in Expression (2), for example.

$$H_h = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (2)$$

The order of the square matrix $H_h$ is equal to the number of second electrodes 26 overlapping the first electrode 25, that is, four in the example illustrated in FIG. 11. While the present embodiment describes four second electrodes 26, the configuration is not limited thereto. The number of second electrodes 26 may be two, three, or five or more. In this case, the order of the square matrix $H_h$ also varies depending on the number of second electrodes 26.

As illustrated in FIGS. 11(A) to 11(D), the following describes an example of code division multiplex drive by dividing it into four detection operations, that is, the first detection operation $Tc_0$, the second detection operation $Tc_1$, the third detection operation $Tc_2$, and the fourth detection operation $Tc_3$. The first detection operation $Tc_0$, the second detection operation $Tc_1$, the third detection operation $Tc_2$, and the fourth detection operation $Tc_3$ include first selection operations $Tc_0^+$, $Tc_1^+$, $Tc_2^+$, and $Tc_3^+$, and second selection operations $Tc_0^-$, $Tc_1^-$, $Tc_2^-$, and $Tc_3^-$, respectively. In the following description, they may be referred to as the first selection operation $Tc^+$ and the second selection operation $Tc^-$.

The guard control signal according to the present embodiment includes a first selection signal and a second selection signal. In the first selection operation $Tc^+$ performed in a first period (first timing), the second electrode controller 17 selects the second electrodes 26 (first group) serving as the first selection target based on the first selection signals corresponding to the element "1" of a square matrix $H_v$. Simultaneously, the second electrode controller 17 selects the second electrodes 26 (second group) serving as the second selection target. The second electrodes 26 serving as the second selection target are not included in the first selection target out of the second electrodes 26. The second electrodes 26 serving as the first selection target are brought into a floating state. The second electrodes 26 serving as the second selection target are supplied with the guard signals Vgs and brought into a shielded state. In FIG. 11, the overlapping areas Rs overlapping the second electrodes 26 serving as the first selection target are hatched.

A first detection signal $Sh_p^+$ (p=0, 1, 2, 3) is output to the calculator 40 of the detection controller 16 via one coupling wire 37 from the first electrode 25. The first detection signal $Sh_p^+$ is an output detection signal obtained by integrating partial detection signals of the first electrode 25. The partial detection signals correspond to capacitance changes in the respective overlapping areas Rs overlapping the second electrodes 26 serving as the first selection target selected based on the first selection signals corresponding to the element "1" of the square matrix $H_v$.

In the second selection operation $Tc^-$ performed in a second period (second timing) different from the first period, the second electrode controller 17 selects the second electrodes 26 (third group) serving as the first selection target based on the second selection signals corresponding to the element "−1" of the square matrix $H_v$. Simultaneously, the second electrode controller 17 selects the second electrodes 26 (fourth group) serving as the second selection target out of the second electrodes 26. The second electrodes 26 serving as the first selection target are brought into a floating state. The second electrodes 26 serving as the second selection target are supplied with the guard signals Vgs and brought into a shielded state. The second electrodes 26 serving as the first selection target in the first selection operation $Tc^+$ correspond to the second electrodes 26 serving as the second selection target in the second selection operation $Tc^+$. In other words, the second selection operation $Tc^-$ is an operation for selecting the inverted pattern of the selection pattern of the second electrodes 26 in the first selection operation $Tc^+$.

A second detection signal $Sh_p^-$ (p=0, 1, 2, 3) is output to the calculator 40 of the detection controller 16 via one coupling wire 37 from the first electrode 25. The second detection signal $Sh_p^-$ is an output detection signal obtained by integrating the partial detection signals of the first electrode 25. The second electrodes 26 serving as the first selection target are selected based on the first selection signals corresponding to the element "−1" of the square matrix $H_v$. The partial detection signals correspond to capacitance changes in the respective overlapping areas Rs overlapping the second electrodes 26 serving as the first selection target.

The signal arithmetic processor 44 (refer to FIG. 2) of the calculator 40 calculates the difference between the first detection signal $Sh_p^+$ and the second detection signal $Sh_p^-$. The signal arithmetic processor 44 thus calculates the detection signal $Sh_p$, that is, $Sh_p = Sh_p^+ - Sh_p^-$. The signal arithmetic processor 44 outputs the detection signal $Sh_p$ to the storage 47 and temporarily stores it in the storage 47. The first detection signal $Sh_p^+$ and the second detection signal $Sh_p^-$ correspond to the detection signal Vdet in the basic principle of self-capacitance touch detection described above.

In a case where the order of the square matrix $H_v$ is four, four detection signals ($Sh_0$, $Sh_1$, $Sh_2$, and $Sh_3$) are obtained from one first electrode 25 as indicated by Expression (3). In this case, the detection signals ($Sh_0$, $Sh_1$, $Sh_2$, and $Sh_3$) are calculated from the four first detection signals $Sh_0^+$, $Sh_1^+$, $Sh_2^+$, and $Sh_3^+$ and the four second detection signals $Sh_0^-$, $Sh_1^-$, $Sh_2^-$, and $Sh_3^-$, respectively.

$$\begin{pmatrix} Sh_0 \\ Sh_1 \\ Sh_2 \\ Sh_3 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Si_0 \\ Si_1 \\ Si_2 \\ Si_3 \end{pmatrix} \quad (3)$$

In the following description, let us assume a case where, when the first electrode 25 is divided into the overlapping areas $Rs_{11}$, $Rs_{12}$, $Rs_{13}$, and $Rs_{14}$, the values of the partial detection signals detected corresponding to capacitance changes in the respective overlapping areas Rs are expressed by: $(Si_0, Si_1, Si_2, Si_3) = (1, 7, 3, 2)$, for example. In the display apparatus 1, one first electrode 25 outputs one detection signal obtained by integrating the partial detection signals $Si_0$, $Si_1$, $Si_2$, and $Si_3$. The calculator 40 calculates the individual partial detection signals by the arithmetic processing described below.

As illustrated in FIG. 11(A), the second electrode controller 17 selects the four second electrodes 26a, 26b, 26c, and 26d as the first selection target corresponding to the element "1" in the first row of the square matrix $H_h$ in the first selection operation $Tc_0^+$ of the first detection operation $Tc_0$. The second electrode controller 17 brings the second electrodes 26a, 26b, 26c, and 26d into a floating state. The second electrode controller 17 selects no second electrode 26 as the second selection target. The detection controller 16 supplies the detection drive signal Vs to the first electrode 25. As a result, the detection controller 16 detects a detection signal obtained by integrating the partial detection signals. The partial detection signals in this case correspond to capacitance changes in the overlapping areas $Rs_{11}$, $Rs_{12}$, $Rs_{13}$, and $Rs_{14}$ corresponding to the respective second electrodes 26. Consequently, the first detection signal $Sh_0^+$ is calculated using Expression (3) by: $Sh_0^+ = 1 \times 1 + 1 \times 7 + 1 \times 3 + 1 \times 2 = 13$.

In the second selection operation $Tc_0^-$, the second electrode controller 17 selects no second electrode 26 as the first selection target corresponding to the element "−1" because the element "−1" is not present in the first row of the square matrix $H_h$. The second electrode controller 17 selects the second electrodes 26a, 26b, 26c, and 26d as the second selection target and supplies them with the guard signals Vgs. A capacitance change is suppressed in the overlapping areas $Rs_{11}$, $Rs_{12}$, $Rs_{13}$, and $Rs_{14}$ corresponding to the respective second electrodes 26. Consequently, the second detection signal $Sh_0^-$ is calculated by: $Sh_0^- = 0 \times 1 + 0 \times 7 + 0 \times 3 + 0 \times 2 = 0$. The detection signal $Sh_0$, which is the difference between the first detection signal $Sh_0^+$ and the second detection signal $Sh_0^-$, is calculated by: $Sh_0 = Sh_0^+ - Sh_0^- = 13 - 0 = 13$.

As illustrated in FIG. 11(B), the second electrode controller 17 selects the second electrodes 26a and 26c as the first selection target corresponding to the element "1" in the second row of the square matrix $H_h$ in the first selection operation $Tc_1^+$ of the second detection operation $Tc_1$. The second electrode controller 17 brings the second electrodes 26a and 26c into a floating state. The second electrode controller 17 selects the second electrodes 26b and 26d as the second selection target and supplies them with the guard signals Vgs. The detection controller 16 supplies the detection drive signal Vs to the first electrode 25. As a result, the detection controller 16 detects a detection signal obtained by integrating the partial detection signals. The partial detection signals in this case correspond to capacitance changes in the overlapping areas $Rs_{11}$ and $Rs_{13}$ corresponding to the second electrodes 26a and 26c, respectively. By contrast, a capacitance change is suppressed in the overlapping areas $Rs_{12}$ and $Rs_{14}$ corresponding to the second electrodes 26b and 26d, respectively. Consequently, the first detection signal $Sh_1^+$ is calculated using Expression (3) by: $Sh_1^+ = 1 \times 1 + 0 \times 7 + 1 \times 3 + 0 \times 2 = 4$.

In the second selection operation $Tc_1^-$, the second electrode controller 17 selects the second electrodes 26b and 26d as the first selection target corresponding to the element "−1" in the second row of the square matrix $H_h$. The second electrode controller 17 brings the second electrodes 26b and 26d into a floating state. The second electrode controller 17 selects the second electrodes 26a and 26c as the second selection target and supplies them with the guard signals Vgs. The detection controller 16 supplies the detection drive signal Vs to the first electrode 25. As a result, the detection controller 16 detects a detection signal obtained by integrating the partial detection signals. The partial detection signals in this case correspond to capacitance changes in the overlapping areas $Rs_{12}$ and $Rs_{14}$ corresponding to the second electrodes 26b and 26d, respectively. By contrast, a capacitance change is suppressed in the overlapping areas $Rs_{11}$ and $Rs_{13}$ corresponding to the second electrodes 26a and 26c, respectively. Consequently, the second detection signal $Sh_1^-$ is calculated by: $Sh_1^- = 0 \times 1 + 1 \times 7 + 0 \times 3 + 1 \times 2 = 9$. The detection signal $Sh_1$, which is the difference between the first detection signal $Sh_1^+$ and the second detection signal $Sh_1^-$, is calculated by: $Sh_1 = Sh_1^+ - Sh_1^- = 4 - 9 = -5$.

As illustrated in FIG. 11(C), the second electrode controller 17 selects the second electrodes 26a and 26b as the first selection target corresponding to the element "1" in the third row of the square matrix $H_h$ in the first selection operation $Tc_2^+$ of the third detection operation $Tc_2$. The second electrode controller 17 brings the second electrodes 26a and 26b into a floating state. The second electrode controller 17 selects the second electrodes 26c and 26d as the second selection target and supplies them with the guard signals Vgs. The detection controller 16 supplies the detection drive signal Vs to the first electrode 25. As a result, the detection controller 16 detects a detection signal obtained by integrating the partial detection signals. The partial detection signals in this case correspond to capacitance changes in the overlapping areas $Rs_{11}$ and $Rs_{12}$ corresponding to the second electrodes 26a and 26b, respectively. By contrast, a capacitance change is suppressed in the overlapping areas $Rs_{13}$ and $Rs_{14}$ corresponding to the second electrodes 26c and 26d, respectively. Consequently, the first detection signal $Sh_2^+$ is calculated using Expression (3) by: $Sh_2^+=1\times1+1\times7+0\times3+0\times2=8$.

In the second selection operation $Tc_2^-$, the second electrode controller 17 selects the second electrodes 26c and 26d as the first detection target corresponding to the element "−1" in the third row of the square matrix $H_h$. The second electrode controller 17 brings the second electrodes 26c and 26d into a floating state. The second electrode controller 17 selects the second electrodes 26a and 26b as the second selection target and supplies them with the guard signals Vgs. The detection controller 16 supplies the detection drive signal Vs to the first electrode 25. As a result, the detection controller 16 detects a detection signal obtained by integrating the partial detection signals. The partial detection signals in this case correspond to capacitance changes in the overlapping areas $Rs_{13}$ and $Rs_{14}$ corresponding to the second electrodes 26c and 26d, respectively. By contrast, a capacitance change is suppressed in the overlapping areas $Rs_{11}$ and $Rs_{12}$ corresponding to the second electrodes 26a and 26b, respectively. Consequently, the second detection signal $Sh_2^-$ is calculated by: $Sh_2^-=0\times1+0\times7+1\times3+1\times2=5$. The detection signal $Sh_2$, which is the difference between the first detection signal $Sh_2^+$ and the second detection signal $Sh_2^-$, is calculated by: $Sh_2=Sh_2^+-Sh_2^-=8-5=3$.

As illustrated in FIG. 11(D), the second electrode controller 17 selects the second electrodes 26a and 26d as the first selection target corresponding to the element "1" in the fourth row of the square matrix $H_h$ in the first selection operation $Tc_3^+$ of the fourth detection operation $Tc_3$. The second electrode controller 17 brings the second electrodes 26a and 26d into a floating state. The second electrode controller 17 selects the second electrodes 26b and 26c as the second selection target and supplies them with the guard signals Vgs. The detection controller 16 supplies the detection drive signal Vs to the first electrode 25. As a result, the detection controller 16 detects a detection signal obtained by integrating the partial detection signals. The partial detection signals in this case correspond to capacitance changes in the overlapping areas $Rs_{11}$ and $Rs_{14}$ corresponding to the second electrodes 26a and 26d, respectively. By contrast, a capacitance change is suppressed in the overlapping areas $Rs_{12}$ and $Rs_{13}$ corresponding to the second electrodes 26b and 26c, respectively. Consequently, the first detection signal $Sh_3^+$ is calculated using Expression (3) by: $Sh_3^+=1\times1+0\times7+0\times3+1\times2=3$.

In the second selection operation $Tc_3^-$, the second electrode controller 17 selects the second electrodes 26b and 26c as the first selection target corresponding to the element "−1" in the fourth row of the square matrix $H_h$. The second electrode controller 17 brings the second electrodes 26b and 26c into a floating state. The second electrode controller 17 selects the second electrodes 26a and 26d as the second selection target and supplies them with the guard signals Vgs. The detection controller 16 supplies the detection drive signal Vs to the first electrode 25. As a result, the detection controller 16 detects a detection signal obtained by integrating the partial detection signals. The partial detection signals in this case correspond to capacitance changes in the overlapping areas $Rs_{12}$ and $Rs_{13}$ corresponding to the second electrodes 26b and 26c, respectively. By contrast, a capacitance change is suppressed in the overlapping areas $Rs_{11}$ and $Rs_{14}$ corresponding to the second electrodes 26a and 26d, respectively. Consequently, the second detection signal $Sh_3^-$ is calculated by: $Sh_3^-=0\times1+1\times7+1\times3+0\times2=10$. The detection signal $Sh_3$, which is the difference between the first detection signal $Sh_3^+$ and the second detection signal $Sh_3^-$, is calculated by: $Sh_3=Sh_3^+-Sh_3^-=3-10=-7$.

The signal arithmetic processor 44 sequentially calculates the detection signal Sh from the first detection signal $Sh^+$ and the second detection signal $Sh^-$. The signal arithmetic processor 44 sequentially outputs the four detection signals $(Sh_0, Sh_1, Sh_2, Sh_3)=(13, -5, 3, -7)$ to the storage 47. The signal arithmetic processor 44 may store the four first detection signals $Sh_0^+$, $Sh_1^+$, $Sh_2^+$, and $Sh_3^+$ and the four second detection signals $Sh_0^-$, $Sh_1^-$, $Sh_2^-$, and $Sh_3^-$ in the storage 47 and then calculate the four detection signals $Sh_0$, $Sh_1$, $Sh_2$, and $Sh_3$ after performing the detection in all the periods. The signal arithmetic processor 44 decodes the four detection signals $(Sh_0, Sh_1, Sh_2, Sh_3)=(13, -5, 3, -7)$ using Expression (4). Based on Expression (4), the signal arithmetic processor 44 calculates partial detection signals $(Si_0', Si_1', Si_2', Si_3')=(4, 28, 12, 8)$ resulting from decoding. Contact or proximity of a finger changes the values of the partial detection signals $Si_0'$, $Si_1'$, $Si_2'$, $Si_3'$ resulting from decoding corresponding to the contact or proximity position in the first electrode 25.

Based on the partial detection signals $Si_0'$, $Si_1'$, $Si_2'$, $Si_3'$ resulting from decoding performed by the signal arithmetic processor 44, the coordinate extractor 45 can calculate the coordinates of the overlapping area Rs with or to which a finger is in contact or in proximity in the first electrode 25. The calculator 40 may output the coordinates calculated based on the partial detection signals $Si_0'$, $Si_1'$, $Si_2'$, $Si_3'$ resulting from decoding as the output Vout. Alternatively, the calculator 40 does not necessarily include the coordinate extractor 45 and may output the partial detection signals $Si_0'$, $Si_1'$, $Si_2'$, $Si_3'$ resulting from decoding as the output Vout.

$$\begin{pmatrix} Si_0' \\ Si_1' \\ Si_2' \\ Si_3' \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Sh_0 \\ Sh_1 \\ Sh_2 \\ Sh_3 \end{pmatrix} \quad (4)$$

With the code division multiplex drive described above, the signal arithmetic processor 44 performs decoding using Expression (4) on the partial detection signal values $(Si_0, Si_1, Si_2, Si_3)=(1, 7, 3, 2)$, thereby deriving the partial detection signals resulting from decoding $(Si_0', Si_1', Si_2', Si_3')=(4, 28, 12, 8)$. In other words, the display apparatus 1 can provide high signal intensity four times the signal intensity obtained when it performs time division multiplex drive without raising the voltage of the signal values at respective nodes. The detection signal $Sh_p$ is the difference between the first detection signal $Sh_p^+$ and the second detection signal $Sh_p^-$. When noise enters from the outside, noise components in the first detection signal $Sh_p^+$ and those in the second detection signal $Sh_p^-$ are cancelled. Consequently, the display apparatus 1 can provide improved noise resistance.

The second electrode controller 17 according to the present embodiment switches the state of the second electrodes 26 serving as the first selection target selected based on the predetermined code and the state of the second electrodes 26 serving as the second selection target not included in the first detection target between a floating state and a shielded state. The calculator 40 of the detection controller 16 performs decoding on the detection signals output from the first electrode 25 in each of the different selection patterns of the second electrodes 26. As a result, the calculator 40 can calculate the partial detection signals corresponding to capacitance changes in the respective overlapping areas Rs in one first electrode 25. Consequently, the present embodiment can increase the resolution for detection while suppressing an increase in the number of coupling wires 37 and the number of first electrodes 25. The present embodiment performs the first selection operation $Tc^+$ and the second selection operation $Tc^-$ at different timings. Consequently, the present embodiment can suppress capacitive coupling between a plurality of detection electrodes and provide satisfactory detection sensitivity.

The square matrix $H_h$ in Expression (2) is given by way of example only and may be another Hadamard matrix.

As illustrated in FIG. 11, the first selection pattern includes four patterns indicated in the first selection operations $Tc_p^+$ (p=0, 1, 2, 3). In other words, the number of first selection patterns is equal to the number of second electrodes 26 overlapping the first electrode 25. The first selection patterns indicate combination patterns of the second electrodes 26 selected as the first selection target corresponding to the element "1" of the square matrix $H_h$. The second selection pattern includes four patterns indicated in the second selection operations $Tc_p^-$ (p=0, 1, 2, 3). The number of second selection patterns is equal to the number of second electrodes 26 overlapping the first electrode 25. The second selection patterns indicate combination patterns of the second electrodes 26 selected as the first selection target corresponding to the element "−1" of the square matrix $H_h$. The first selection pattern is included in the first selection signal. The second selection pattern is included in the second selection signal.

Figure 12:
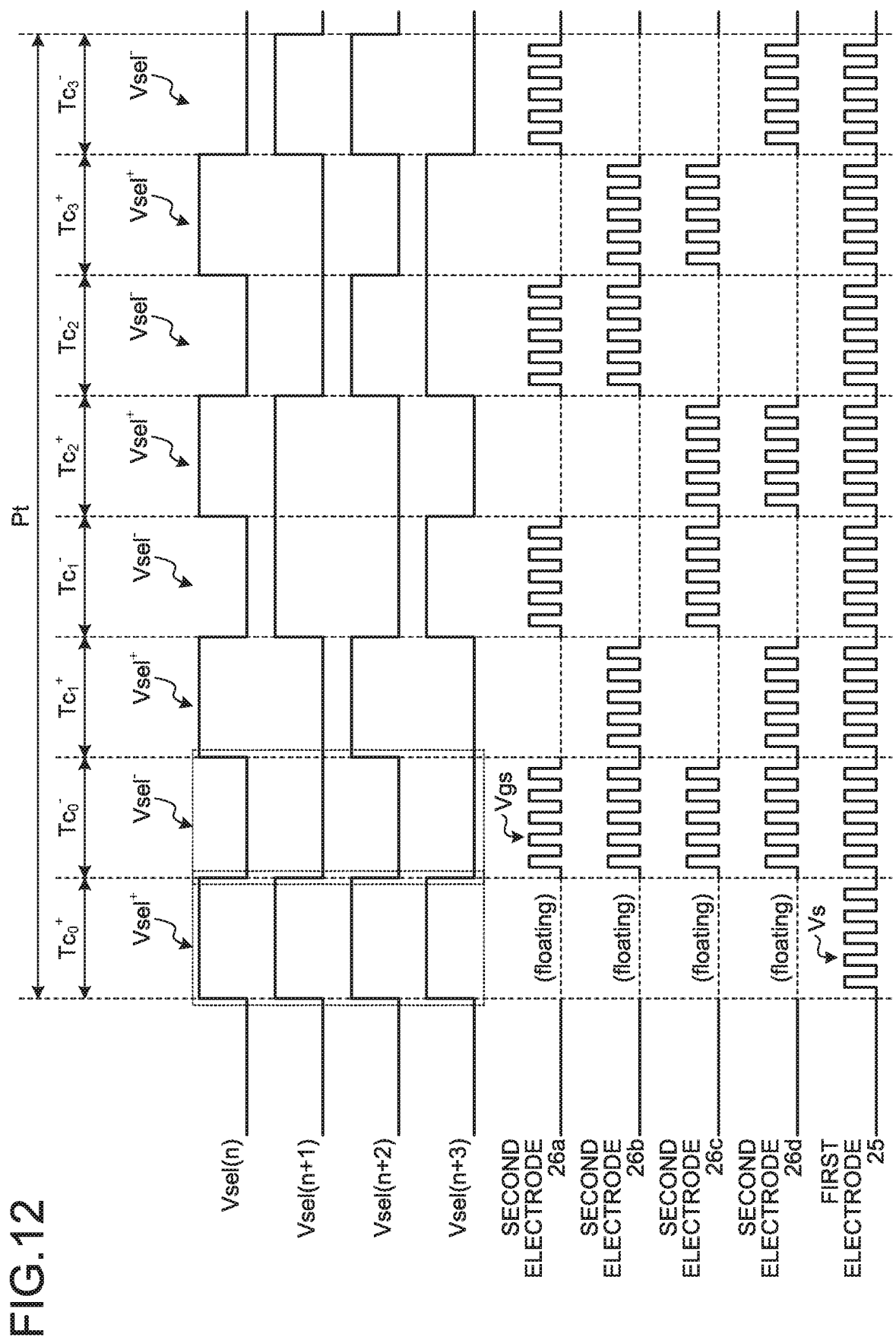
FIG. 12 is a timing waveform chart of an exemplary operation of a detector according to the present embodiment.

FIG. 12 is a timing waveform chart of an exemplary operation of the detector according to the present embodiment. As illustrated in FIG. 12, the first selection operations $Tc_p^+$ and the second selection operations $Tc_p^-$ are successively performed in the detection periods Pt1 and Pt2 (refer to FIG. 10). A successive pair of the first selection operation $Tc_p^+$ and the second selection operation $Tc_p^-$ is alternately performed. The execution order is not limited thereto and may be appropriately modified. The display apparatus 1, for example, may successively perform the four first selection operations $Tc_p^+$ (p=0, 1, 2, 3) and then perform the four second selection operations $Tc_p^-$ (p=0, 1, 2, 3). The numbers of times of execution of the first selection operations $Tc_p^+$ and the second selection operations $Tc_p^-$ are each equal to the number of second electrodes 26 overlapping the first electrode 25, that is, four in this example. In other words, the number of times of execution is equal to the number of row elements of the square matrix $H_h$ in Expression (1).

The guard control signal includes a selection signal Vsel serving as a control signal for switching the state of the second electrode 26 between a floating state and a shielded state. Selection signals Vsel(n), Vsel(n+1), Vsel(n+2), and Vsel(n+3) correspond to the second electrodes 26a, 26b, 26c, and 26d, respectively. The selection signals Vsel(n), Vsel(n+1), Vsel(n+2), and Vsel(n+3) become a high level corresponding to the element "1" of the square matrix $H_h$ and become a low level corresponding to the element "−1". A first selection signal Vsel$^+$ corresponding to the first selection operation $Tc_p^+$ corresponds to the row-direction elements "1" and "−1" of the square matrix $H_h$. A second selection signal Vsel$^+$ corresponding to the second selection operation $Tc_p^-$ is an inverted signal of the first selection signal Vsel$^+$. When the selection signals Vsel(n), Vsel(n+1), Vsel(n+2), and Vsel(n+3) are at a high level, the second electrodes 26a, 26b, 26c, and 26d are brought into a floating state where they are supplied with no voltage signal and their electric potential is not fixed. When the selection signals Vsel(n), Vsel(n+1), Vsel(n+2), and Vsel(n+3) are at a low level, the second electrodes 26a, 26b, 26c, and 26d are supplied with the guard signals Vgs and brought into a shielded state.

The detection drive signals Vs supplied to the first electrode 25 in the first selection operation $Tc_p^+$ and the second selection operation $Tc_p^-$ have the same polarity. The detection signals ($Sh_0$, $Sh_1$, $Sh_2$, and $Sh_3$) are calculated as the difference between the four first detection signals $Sh_0^+$, $Sh_1^+$, $Sh_2^+$, and $Sh_3^+$ and the four second detection signals $Sh_0^-$, $Sh_1^-$, $Sh_2^-$, and $Sh_3^-$, respectively. Alternatively, the detection drive signals Vs having opposite polarities between the first selection operation $Tc_p^+$ and the second selection operation $Tc_p^-$ may be supplied to the first electrode 25. In this case, the detection signals ($Sh_0$, $Sh_1$, $Sh_2$, and $Sh_3$) are calculated as the sum of the four first detection signals $Sh_0^+$, $Sh_1^+$, $Sh_2^+$, and $Sh_3^+$ and the four second detection signals $Sh_0^-$, $Sh_1^-$, $Sh_2^-$, and $Sh_3^-$, respectively.

Figure 13:
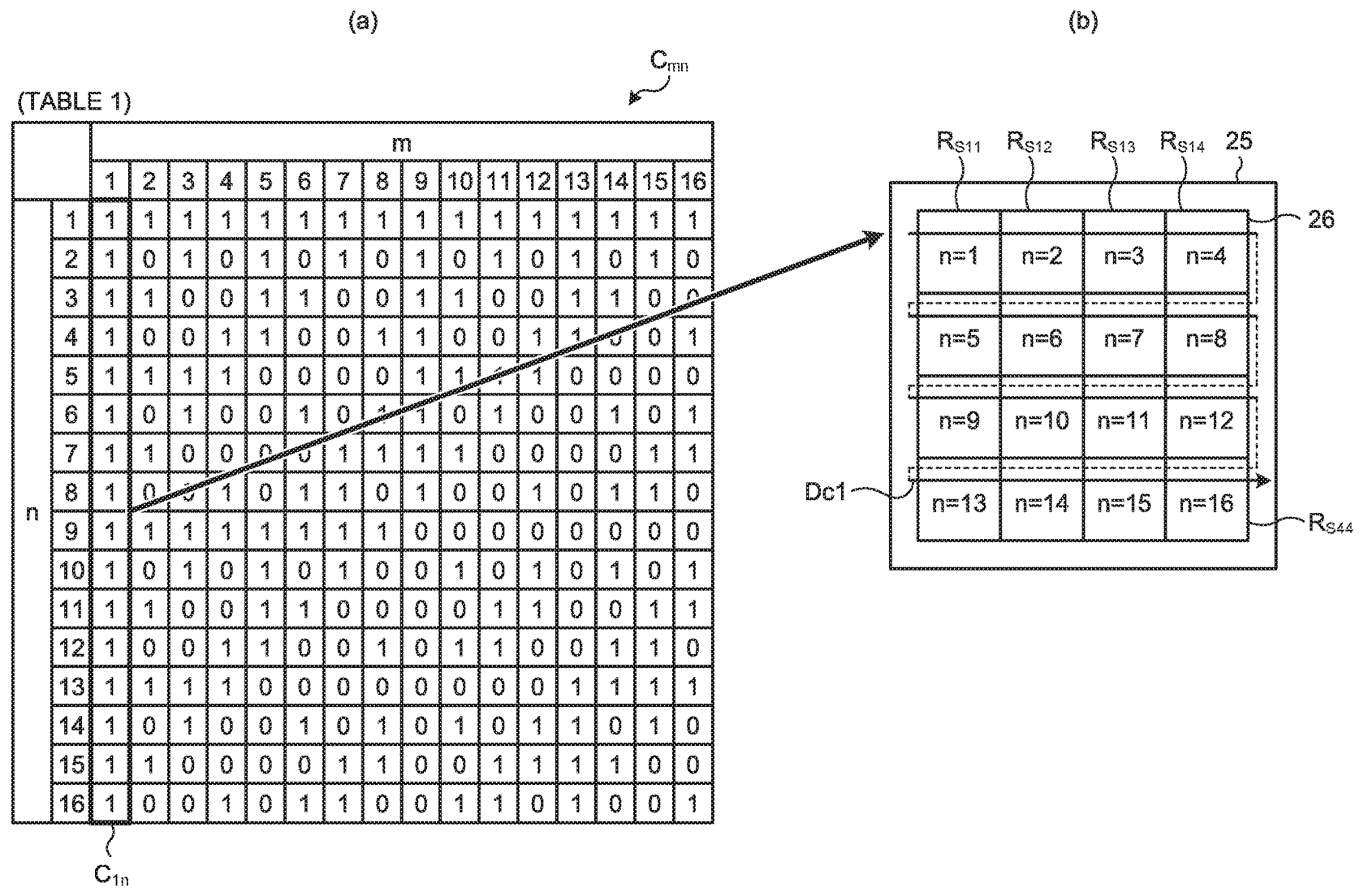

In the example illustrated in FIG. 11, the present embodiment performs code division multiplex drive on the second electrodes 26 arrayed in the row direction. The present embodiment is not limited thereto and may perform code division multiplex drive on the second electrodes 26 arrayed in a row-column configuration overlapping the first electrode 25. FIG. 13 is a diagram for explaining an example of an allocation pattern of a CDM code in code division multiplex drive performed by the detector according to the first embodiment.

To perform code division multiplex drive on the second electrodes 26 arrayed in four rows and four columns, that is, a total of 16 second electrodes 26 illustrated in FIG. 9, a predetermined code is defined based on a square matrix A in Expression (5), for example. The square matrix A is a Hadamard matrix and has 16 rows and 16 columns corresponding to the number of second electrodes 26.

$$A = \begin{pmatrix} 1 & 1 & 1 & 1 & 1 & 1 & 1 & 1 & 1 & 1 & 1 & 1 & 1 & 1 & 1 & 1 \\ 1 & -1 & 1 & -1 & 1 & -1 & 1 & -1 & 1 & -1 & 1 & -1 & 1 & -1 & 1 & -1 \\ 1 & 1 & -1 & -1 & 1 & 1 & -1 & -1 & 1 & 1 & -1 & -1 & 1 & 1 & -1 & -1 \\ 1 & -1 & -1 & 1 & 1 & -1 & -1 & 1 & 1 & -1 & -1 & 1 & 1 & -1 & -1 & 1 \\ 1 & 1 & 1 & 1 & -1 & -1 & -1 & -1 & 1 & 1 & 1 & 1 & -1 & -1 & -1 & -1 \\ 1 & -1 & 1 & -1 & -1 & 1 & -1 & 1 & 1 & -1 & 1 & -1 & -1 & 1 & -1 & 1 \\ 1 & 1 & -1 & -1 & -1 & -1 & 1 & 1 & 1 & 1 & -1 & -1 & -1 & -1 & 1 & 1 \\ 1 & -1 & -1 & 1 & -1 & 1 & 1 & -1 & 1 & -1 & -1 & 1 & -1 & 1 & 1 & -1 \\ 1 & 1 & 1 & 1 & 1 & 1 & 1 & 1 & -1 & -1 & -1 & -1 & -1 & -1 & -1 & -1 \\ 1 & -1 & 1 & -1 & 1 & -1 & 1 & -1 & -1 & 1 & -1 & 1 & -1 & 1 & -1 & 1 \\ 1 & 1 & -1 & -1 & 1 & 1 & -1 & -1 & -1 & -1 & 1 & 1 & -1 & -1 & 1 & 1 \\ 1 & -1 & -1 & 1 & 1 & -1 & -1 & 1 & -1 & 1 & 1 & -1 & -1 & 1 & 1 & -1 \\ 1 & 1 & 1 & 1 & -1 & -1 & -1 & -1 & -1 & -1 & -1 & -1 & 1 & 1 & 1 & 1 \\ 1 & -1 & 1 & -1 & -1 & 1 & -1 & 1 & -1 & 1 & -1 & 1 & 1 & -1 & 1 & -1 \\ 1 & 1 & -1 & -1 & -1 & -1 & 1 & 1 & -1 & -1 & 1 & 1 & 1 & 1 & -1 & -1 \\ 1 & -1 & -1 & 1 & -1 & 1 & 1 & -1 & -1 & 1 & 1 & -1 & 1 & -1 & -1 & 1 \end{pmatrix} \quad (5)$$

FIG. 13(a) is a table of an example of the CDM code generated based on the square matrix A. FIG. 13(b) is a diagram for explaining the correspondence between one column of the CDM code and the second electrodes. The CDM code is an example of the predetermined code. As indicated by Table 1 in FIG. 13(a), a CDM code $C_{mn}$ generates "1" corresponding to the element "1" of the square matrix A and generates "0" corresponding to the element "−1" of the square matrix A. The selection signal Vsel becomes a high level based on the element "1" in the CDM code $C_{mn}$, thereby bringing the selected second electrode 26 into a floating state. By contrast, the selection signal Vsel becomes a low level based on the element "0" in the CDM code $C_{mn}$, thereby bringing the selected second electrode 26 into a shielded state. The CDM code $C_{mn}$ is stored in advance in a storage of the detection controller 16, for example.

The present embodiment performs the detection operations Tc in units of one column of the CDM code $C_{mn}$. In this example, the present embodiment performs the detection operations Tc of 16 patterns from m=1 to m=16 of the CDM code $C_{mn}$. The present embodiment performs a first selection operation $Tc_{mn}^{+}$ and a second selection operation $Tc_{mn}^{-}$ in each of the detection operations Tc of 16 patterns. In other words, the present embodiment performs the detection operations of 32 patterns in total.

The method for allocating the CDM code $C_{mn}$ to the second electrodes 26 disposed in a row-column configuration is not particularly limited. As illustrated in FIG. 13(b), in the case of the CDM code $C_{1n}$ in the first column, for example, the second electrode controller 17 can allocate the CDM code $C_{1n}$ to the second electrodes 26 in order in the direction indicated by the arrow Dc1.

In other words, the second electrode controller 17 allocates n=1 to n=4 of the CDM code $C_{1n}$ to the second electrodes 26 in the first row in order. Similarly, the second electrode controller 17 allocates n=5 to n=8 of the CDM code $C_{1n}$ to the second electrodes 26 in the second row in order. The second electrode controller 17 allocates n=9 to n=12 of the CDM code $C_{1n}$ to the second electrodes 26 in the third row in order. The second electrode controller 17 allocates n=13 to n=16 of the CDM code $C_{1n}$ to the second electrodes 26 in the fourth row in order. As a result, the elements in the respective rows of the CDM code $C_{1n}$ are associated with the second electrodes 26 disposed in a row-column configuration in a one-to-one correspondence.

The method for allocating the CDM code $C_{mn}$ is not particularly limited, and the second electrode controller 17 simply needs to associate the elements of the CDM code $C_{mn}$ with the respective second electrodes 26. The second electrode controller 17, for example, may allocate the elements to the respective second electrodes 26 in order in the column direction or in a diagonal direction.

Figure 14:
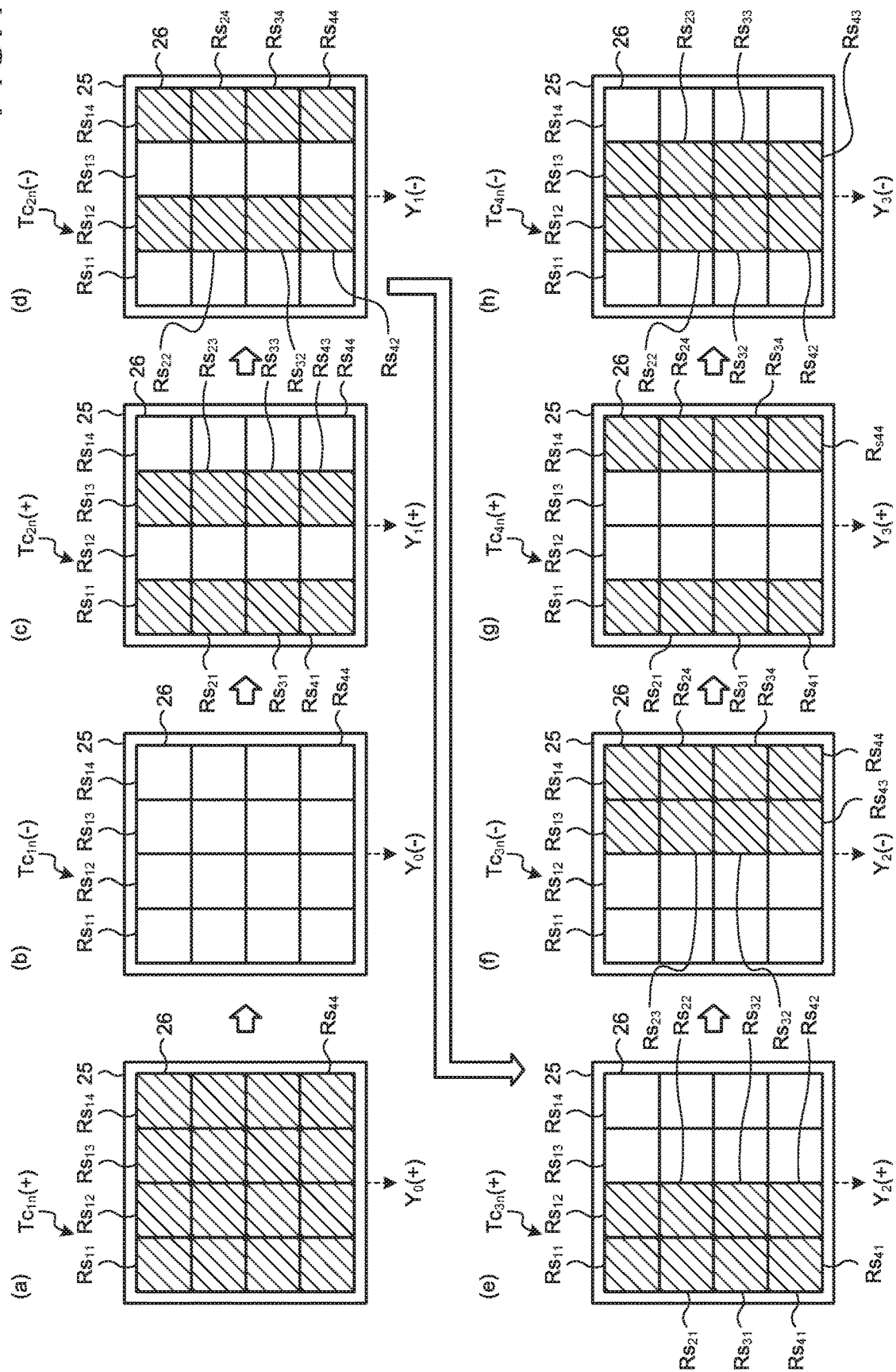
FIG. 14 is a diagram for explaining the selection patterns of the second electrodes corresponding to the first to the fourth columns of the CDM code.
Figure 15:
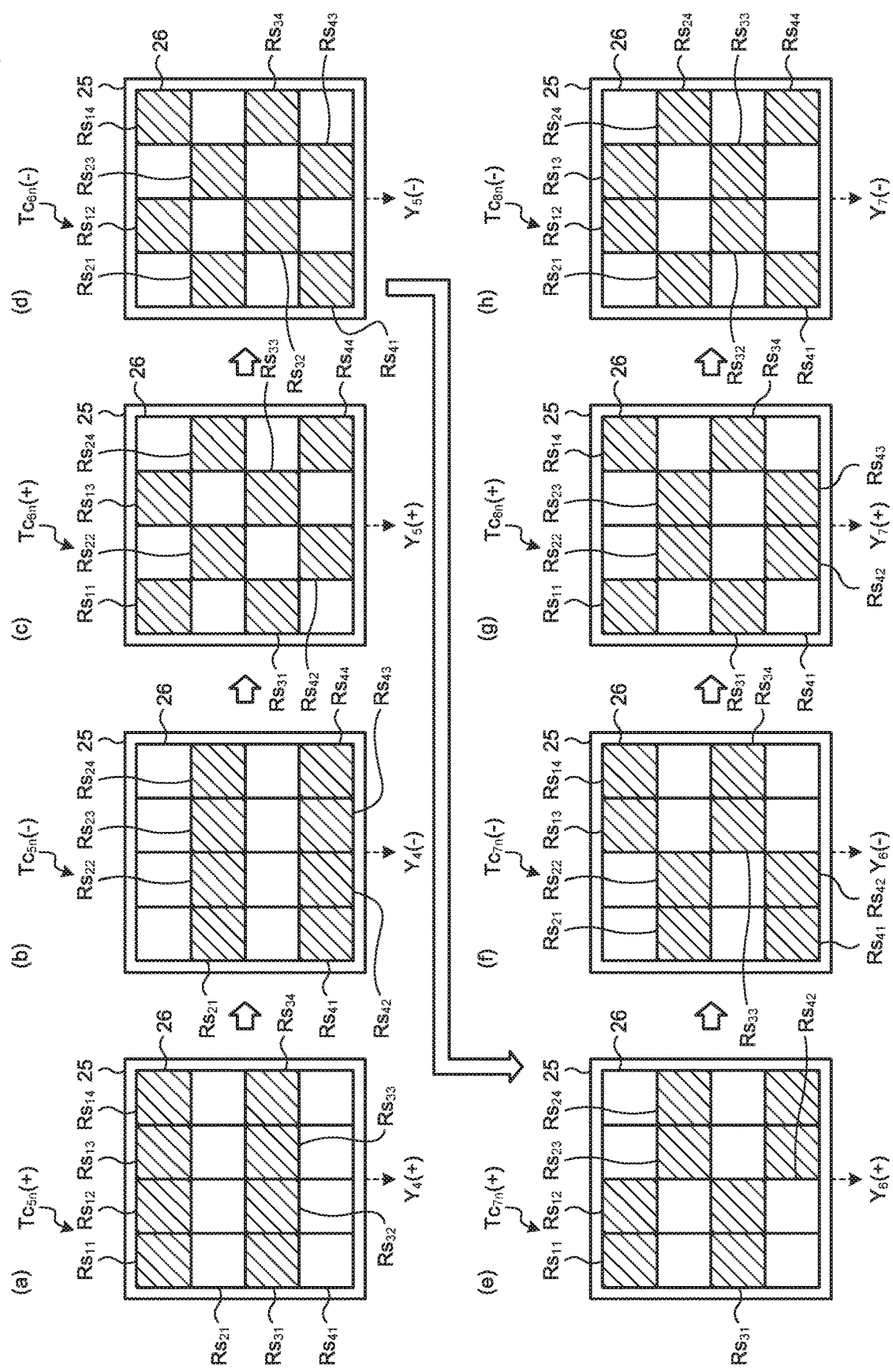
FIG. 15 is a diagram for explaining the selection patterns of the second electrodes corresponding to the fifth to the eighth columns of the CDM code.
Figure 16:
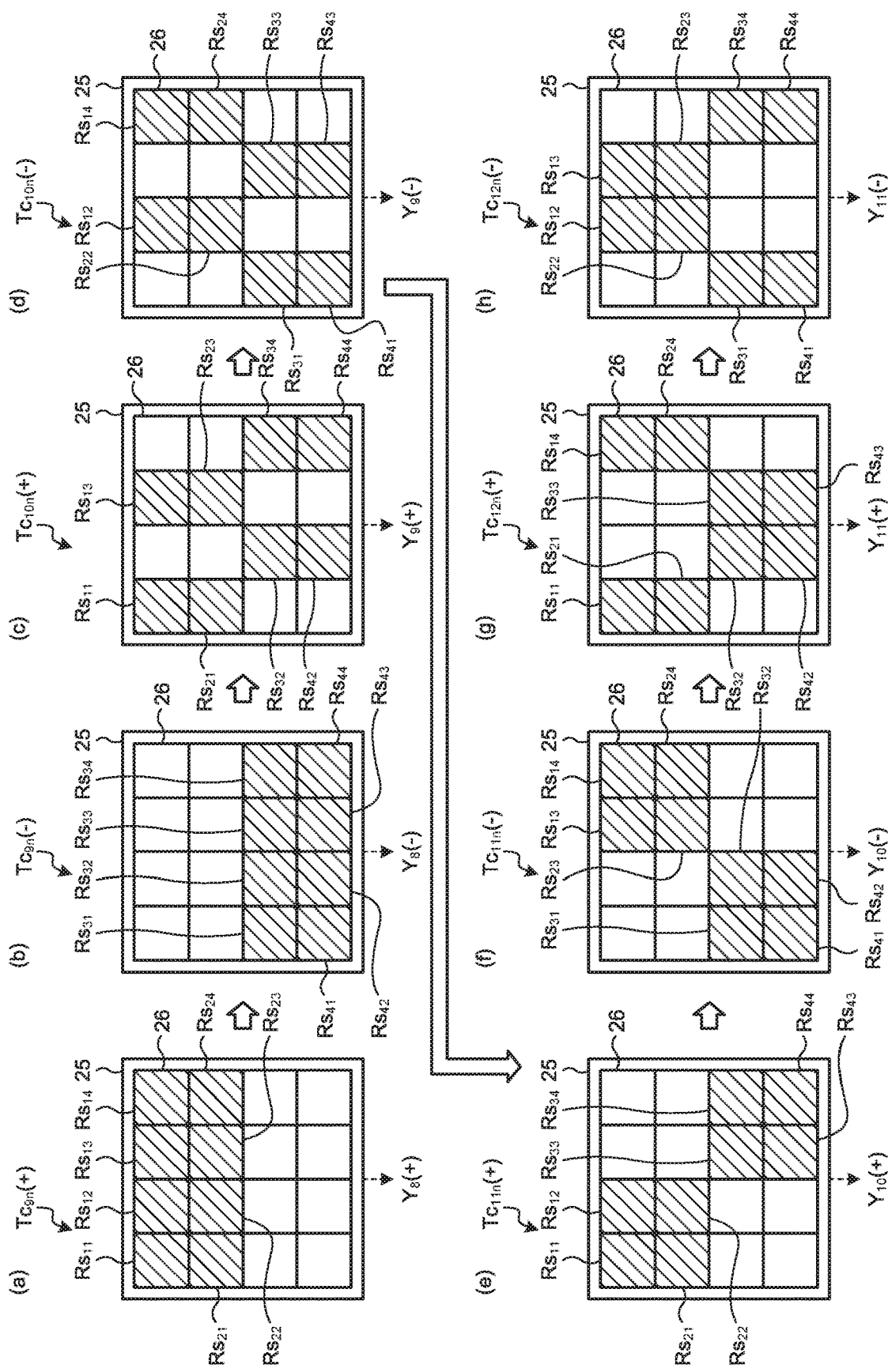
FIG. 16 is a diagram for explaining the selection patterns of the second electrodes corresponding to the ninth to the twelfth columns of the CDM code.
Figure 17:
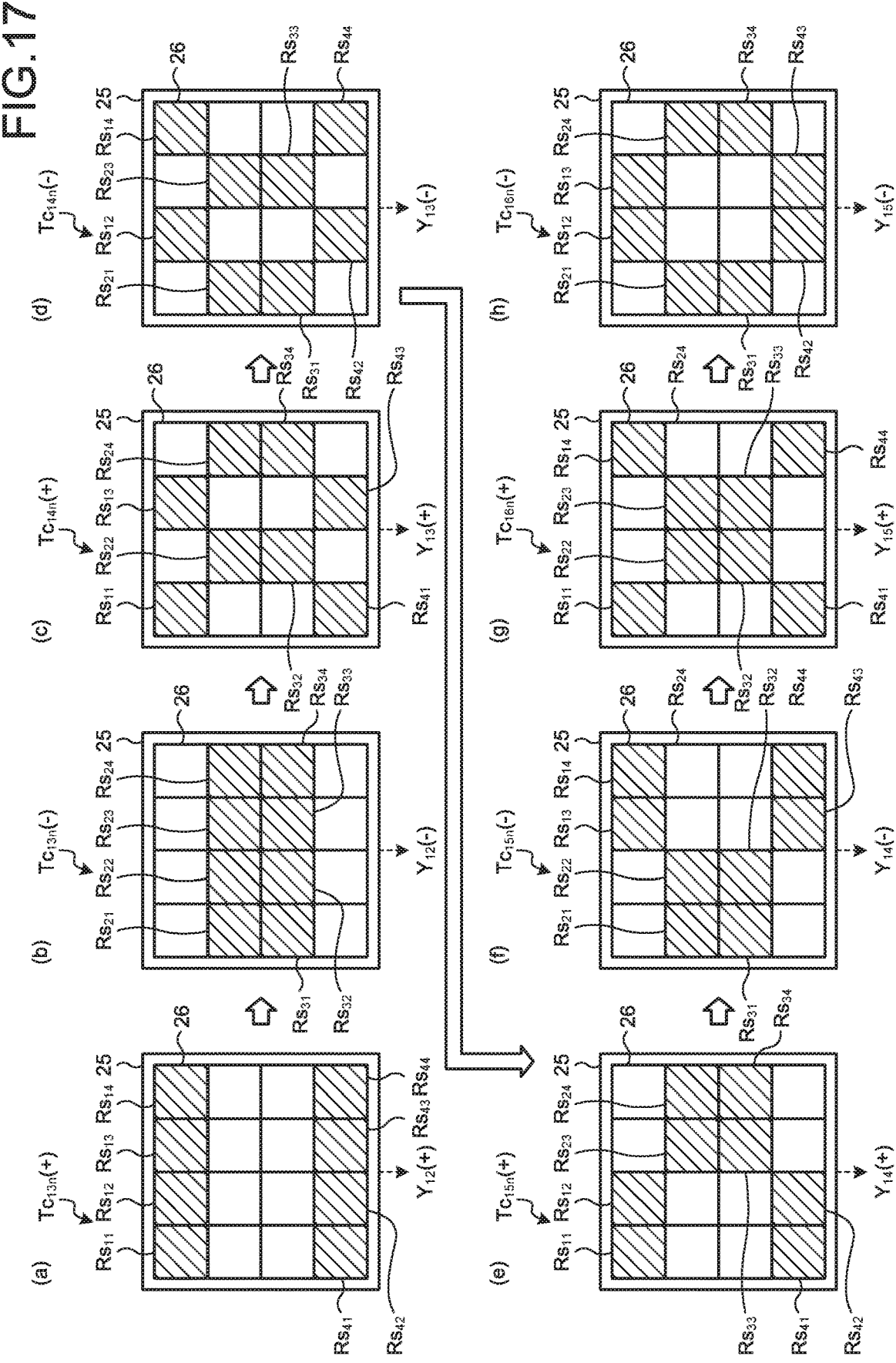
FIG. 17 is a diagram for explaining the selection patterns of the second electrodes corresponding to the thirteenth to the sixteenth columns of the CDM code.
Figure 18:
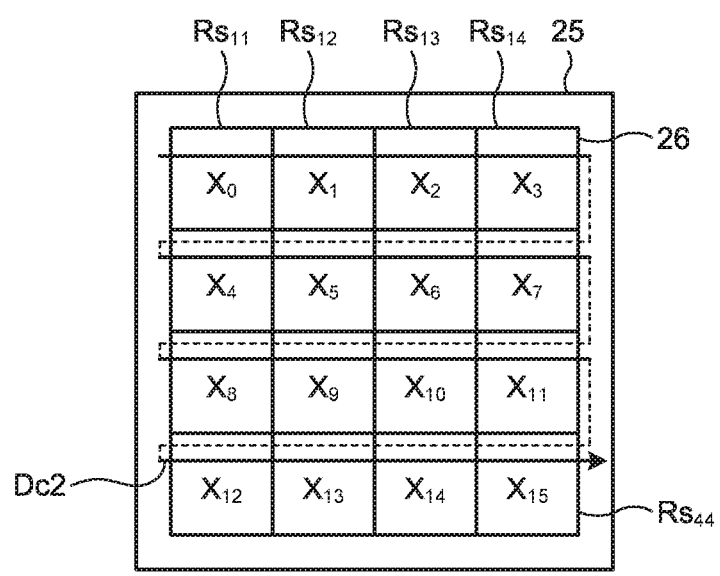
FIG. 18 is a diagram for explaining an example of an allocation pattern of decoding signals to the first electrode.

The following describes an example of code division multiplex drive using the CDM code $C_{mn}$ with reference to FIGS. 14 to 18. FIG. 14 is a diagram for explaining the selection patterns of the second electrodes corresponding to the first to the fourth columns of the CDM code. FIG. 15 is a diagram for explaining the selection patterns of the second electrodes corresponding to the fifth to the eighth columns of the CDM code. FIG. 16 is a diagram for explaining the selection patterns of the second electrodes corresponding to the ninth to the twelfth columns of the CDM code. FIG. 17 is a diagram for explaining the selection patterns of the second electrodes corresponding to the thirteenth to the sixteenth columns of the CDM code. FIG. 18 is a diagram for explaining an example of an allocation pattern of signals resulting from decoding to the first electrode.

FIG. 14(a) illustrates a selection pattern of the second electrodes in the first selection operation $Tc_{mn}(+)$ that is based on the CDM code $C_{1n}$ of the first column. FIG. 14(b) illustrates a selection pattern of the second electrodes in the second selection operation $Tc_{mn}(-)$ that is based on the CDM code $C_{1n}$ of the first column. Similarly, FIGS. 14(c) to 17(h) illustrate selection patterns in the first selection operations $Tc_{mn}(+)$ and the second selection operations $Tc_{mn}(-)$ from m=2 to m=16 of the CDM code $C_{mn}$.

As illustrated in FIG. 14(a), in the first selection operation $Tc_{1n}(+)$ based on the CDM code $C_{1n}$ of the first column, the second electrode controller 17 selects 16 second electrodes 26 overlapping the overlapping areas $Rs_{11}$ to $Rs_{44}$ as the first selection target corresponding to the element "1" of the CDM code $C_{1n}$. As a result, the 16 second electrodes 26 are brought into a floating state. The second electrode controller 17 selects no second electrode 26 as the second selection target because the element "0" is not present in the CDM code $C_{1n}$. The detection controller 16 supplies the detection drive signal Vs to the first electrode 25, thereby enabling detection of capacitance changes in all the overlapping areas Rs, that is, in the overlapping areas $Rs_{11}$ to $Rs_{44}$ of the first electrode 25. The first electrode 25 outputs a first detection signal $Y_0(+)$ obtained by integrating partial detection signals. The partial detection signals in this case are based on the capacitance changes in the overlapping areas $Rs_{11}$ to $Rs_{44}$.

As illustrated in FIG. 14(b), in the second selection operation $Tc_{1n}(-)$ based on the CDM code $C_{1n}$ of the first column, the second electrode controller 17 selects no second electrode 26 as the first selection target corresponding to the element "0" because the element "0" is not present in the CDM code $C_{1n}$. The second electrode controller 17 selects the 16 second electrodes 26 overlapping the overlapping areas $Rs_{11}$ to $Rs_{44}$ as the second selection target and supplies them with the guard signals Vgs. As a result, the 16 second electrodes 26 are brought into a shielded state. The detection controller 16 supplies the detection drive signal Vs to the first electrode 25. Because the 16 second electrodes 26 are in a shielded state, a capacitance change is suppressed in all the overlapping areas Rs, that is, in the overlapping areas $Rs_{11}$ to $Rs_{44}$ of the first electrode 25. The first electrode 25 outputs a second detection signal $Y_0(-)$.

The signal arithmetic processor 44 calculates a detection signal $Y_0$ corresponding to the CDM code $C_{1n}$ of the first column, which is the difference between the first detection signal $Y_0(+)$ and the second detection signal $Y_0(-)$, by: $Y_0=Y_0(+)-Y_0(-)$. The signal arithmetic processor 44 stores the detection signal $Y_0$ in the storage 47.

As illustrated in FIG. 14(c), in the first selection operation $Tc_{2n}(+)$ based on the CDM code $C_{2n}$ of the second column, the second electrode controller 17 selects eight second electrodes 26 overlapping the overlapping areas $Rs_{11}$, $Rs_{13}$, $Rs_{21}$, $Rs_{23}$, $Rs_{31}$, $Rs_{33}$, $Rs_{41}$, and $Rs_{43}$ as the first selection target corresponding to the element "1" of the CDM code $C_{2n}$. The second electrodes 26 serving as the first selection target are brought into a floating state. As a result, capacitance changes can be detected in the overlapping areas $Rs_{11}$, $Rs_{13}$, $Rs_{21}$, $Rs_{23}$, $Rs_{31}$, $Rs_{33}$, $Rs_{41}$, and $Rs_{43}$ of the first electrode 25. The second electrode controller 17 selects the second electrodes 26 not included in the first selection target as the second selection target. The second electrodes 26 serving as the second selection target are brought into a shielded state. As a result, a capacitance change is suppressed in the overlapping areas $Rs_{12}$, $Rs_{14}$, $Rs_{22}$, $Rs_{24}$, $Rs_{32}$, $Rs_{34}$, $Rs_{42}$, and $Rs_{44}$. The first electrode 25 outputs a first detection signal $Y_1(+)$ obtained by integrating partial detection signals. The partial detection signals in this case are based on the capacitance changes in the overlapping areas $Rs_{11}$, $Rs_{13}$, $Rs_{21}$, $Rs_{23}$, $Rs_{31}$, $Rs_{33}$, $Rs_{41}$, and $Rs_{43}$.

As illustrated in FIG. 14(d), in the second selection operation $Tc_{2n}(-)$ based on the CDM code $C_{2n}$ of the second column, the second electrode controller 17 selects eight second electrodes 26 overlapping the overlapping areas $Rs_{12}$, $Rs_{14}$, $Rs_{22}$, $Rs_{24}$, $Rs_{32}$, $Rs_{34}$, $Rs_{42}$, and $Rs_{44}$ as the first selection target corresponding to the element "0" of the CDM code $C_{2n}$. The second electrodes 26 serving as the first selection target are brought into a floating state. As a result, capacitance changes can be detected in the overlapping areas $Rs_{12}$, $Rs_{14}$, $Rs_{22}$, $Rs_{24}$, $Rs_{32}$, $Rs_{34}$, $Rs_{42}$, and $Rs_{44}$ of the first electrode 25. The second electrode controller 17 selects the second electrodes 26 not included in the first selection target as the second selection target. The second electrodes 26 serving as the second selection target are brought into a shielded state. As a result, a capacitance change is suppressed in the overlapping areas $Rs_{11}$, $Rs_{13}$, $Rs_{21}$, $Rs_{23}$, $Rs_{31}$, $Rs_{33}$, $Rs_{41}$, and $Rs_{43}$. The first electrode 25 outputs a second detection signal $Y_1(-)$ obtained by integrating partial detection signals. The partial detection signals in this case are based on the capacitance changes in the overlapping areas $Rs_{12}$, $Rs_{14}$, $Rs_{22}$, $Rs_{24}$, $Rs_{32}$, $Rs_{34}$, $Rs_{42}$, and $Rs_{44}$.

The signal arithmetic processor 44 calculates a detection signal $Y_1$ corresponding to the CDM code $C_{2n}$ of the second column, which is the difference between the first detection signal $Y_1(+)$ and the second detection signal $Y_1(-)$, by: $Y_1=Y_1(+)-Y_1(-)$. The signal arithmetic processor 44 stores the detection signal $Y_1$ in the storage 47.

Similarly, as illustrated in FIGS. 14(e) and 14(f), the display apparatus 1 performs the first selection operation $Tc_{3n}(+)$ and the second selection operation $Tc_{3n}(-)$ that are based on the CDM code $C_{3n}$ of the third column, thereby obtaining a detection signal $Y_2$. As illustrated in FIGS. 14(g) and 14(h), the display apparatus 1 performs the first selection operation $Tc_4(+)$ and the second selection operation $Tc_4(-)$ that are based on the CDM code $C_{4n}$ of the fourth column, thereby obtaining a detection signal $Y_3$.

As illustrated in FIGS. 15(a) to 15(h), the display apparatus 1 performs the first selection operations $Tc_{mn}(+)$ (m=5 to m=8) and the second selection operations $Tc_{mn}(-)$ (m=5 to m=8) based on the CDM code $C_{5n}$ of the fifth column to the CDM code $C_{8n}$ of the eighth column. Based on the CDM code $C_{mn}$, the selection pattern of the second electrodes 26 in a floating state and that of the second electrodes 26 in a shielded state are sequentially changed. The first electrode 25 outputs first detection signals $Y_4(+)$ to $Y_7(+)$ and second detection signals $Y_4(-)$ to $Y_7(-)$ corresponding to the respective selection patterns of the CDM code $C_{mn}$. Based on the first and second detection signals, the calculator 40 calculates detection signals $Y_4$, $Y_5$, $Y_6$, and $Y_7$.

Similarly, as illustrated in FIGS. 16(a) to 16(h), the display apparatus 1 performs the first selection operations $Tc_{mn}(+)$ (m=9 to m=12) and the second selection operations $Tc_{mn}(-)$ (m=9 to m=12) based on the CDM code $C_{9n}$ of the ninth column to the CDM code $C_{12n}$ of the twelfth column. The calculator 40 calculates detection signals $Y_8$, $Y_9$, $Y_{10}$, and $Y_{11}$.

As illustrated in FIGS. 17(a) to 17(h), the display apparatus 1 performs the first selection operations $Tc_{mn}(+)$ (m=13 to m=16) and the second selection operations $Tc_{mn}(-)$ (m=13 to m=16) based on the CDM code $C_{13n}$ of the thirteenth column to the CDM code $C_{16n}$ of the sixteenth column. The calculator 40 calculates detection signals $Y_{12}$, $Y_{13}$, $Y_{14}$, and $Y_{15}$.

The signal arithmetic processor 44 calculates a detection signal $Y_{m-1}$ corresponding to the CDM code $C_{mn}$ of the m-th column by: $Y_{m-1}=Y_{m-1}(+)-Y_{m-1}(-)$. The signal arithmetic processor 44 stores the detection signal $Y_{m-1}$ in the storage 47. In this example, the signal arithmetic processor 44 obtains 16 detection signals $Y_{m-1}$ the number of which is equal to the number of columns of the CDM code $C_{mn}$. The number of detection signals $Y_{m-1}$ is equal to the number of second electrodes 26 overlapping the first electrode 25.

The signal arithmetic processor 44 decodes the 16 detection signals $Y_{m-1}$ ($=Y_{m-1}(+)-Y_{m-1}(-)$) using Expression (6). The signal arithmetic processor 44 calculates partial detection signals $X_{m-1}$ (m=1 to m=16) resulting from decoding based on Expression (6).

$$\begin{pmatrix} X_0 \\ X_1 \\ X_2 \\ X_3 \\ X_4 \\ X_5 \\ X_6 \\ X_7 \\ X_8 \\ X_9 \\ X_{10} \\ X_{11} \\ X_{12} \\ X_{13} \\ X_{14} \\ X_{15} \end{pmatrix} = \begin{pmatrix} 1 & 1 & 1 & 1 & 1 & 1 & 1 & 1 & 1 & 1 & 1 & 1 & 1 & 1 & 1 & 1 \\ 1 & -1 & 1 & -1 & 1 & -1 & 1 & -1 & 1 & -1 & 1 & -1 & 1 & -1 & 1 & -1 \\ 1 & 1 & -1 & -1 & 1 & 1 & -1 & -1 & 1 & 1 & -1 & -1 & 1 & 1 & -1 & -1 \\ 1 & -1 & -1 & 1 & 1 & -1 & -1 & 1 & 1 & -1 & -1 & 1 & 1 & -1 & -1 & 1 \\ 1 & 1 & 1 & 1 & -1 & -1 & -1 & -1 & 1 & 1 & 1 & 1 & -1 & -1 & -1 & -1 \\ 1 & -1 & 1 & -1 & -1 & 1 & -1 & 1 & 1 & -1 & 1 & -1 & -1 & 1 & -1 & 1 \\ 1 & 1 & -1 & -1 & -1 & -1 & 1 & 1 & 1 & 1 & -1 & -1 & -1 & -1 & 1 & 1 \\ 1 & -1 & -1 & 1 & -1 & 1 & 1 & -1 & 1 & -1 & -1 & 1 & -1 & 1 & 1 & -1 \\ 1 & 1 & 1 & 1 & 1 & 1 & 1 & 1 & -1 & -1 & -1 & -1 & -1 & -1 & -1 & -1 \\ 1 & -1 & 1 & -1 & 1 & -1 & 1 & -1 & -1 & 1 & -1 & 1 & -1 & 1 & -1 & 1 \\ 1 & 1 & -1 & -1 & 1 & 1 & -1 & -1 & -1 & -1 & 1 & 1 & -1 & -1 & 1 & 1 \\ 1 & -1 & -1 & 1 & 1 & -1 & -1 & 1 & -1 & 1 & 1 & -1 & -1 & 1 & 1 & -1 \\ 1 & 1 & 1 & 1 & -1 & -1 & -1 & -1 & -1 & -1 & -1 & -1 & 1 & 1 & 1 & 1 \\ 1 & -1 & 1 & -1 & -1 & 1 & -1 & 1 & -1 & 1 & -1 & 1 & 1 & -1 & 1 & -1 \\ 1 & 1 & -1 & -1 & -1 & -1 & 1 & 1 & -1 & -1 & 1 & 1 & 1 & 1 & -1 & -1 \\ 1 & -1 & -1 & 1 & -1 & 1 & 1 & -1 & -1 & 1 & 1 & -1 & 1 & -1 & -1 & 1 \end{pmatrix} \begin{pmatrix} Y_0(+) - Y_0(-) \\ Y_1(+) - Y_1(-) \\ Y_2(+) - Y_2(-) \\ Y_3(+) - Y_3(-) \\ Y_4(+) - Y_4(-) \\ Y_5(+) - Y_5(-) \\ Y_6(+) - Y_6(-) \\ Y_7(+) - Y_7(-) \\ Y_8(+) - Y_8(-) \\ Y_9(+) - Y_9(-) \\ Y_{10}(+) - Y_{10}(-) \\ Y_{11}(+) - Y_{11}(-) \\ Y_{12}(+) - Y_{12}(-) \\ Y_{13}(+) - Y_{13}(-) \\ Y_{14}(+) - Y_{14}(-) \\ Y_{15}(+) - Y_{15}(-) \end{pmatrix} \quad (6)$$

As illustrated in FIG. 18, the detection controller 16 can allocate the partial detection signals $X_{m-1}$ resulting from decoding to the respective overlapping areas Rs of the first electrode 25 in order in the direction indicated by the arrow Dc2. The detection controller 16, for example, allocates the partial detection signals $X_0$ to $X_3$ resulting from decoding to the respective overlapping areas Rs in the first row in order. Similarly, the detection controller 16 allocates the partial detection signals $X_4$ to $X_7$ resulting from decoding to the respective overlapping areas Rs in the second row in order. The detection controller 16 allocates the partial detection signals $X_8$ to $X_{11}$ resulting from decoding to the respective overlapping areas Rs in the third row in order. The detection controller 16 allocates the partial detection signals $X_{12}$ to $X_{15}$ resulting from decoding to the respective overlapping areas Rs in the fourth row in order. As a result, the partial detection signals $X_{m-1}$ resulting from decoding are associated with the respective overlapping areas Rs of the first electrode 25 in a one-to-one correspondence.

The method for allocating the partial detection signals $X_{m-1}$ resulting from decoding to the respective overlapping areas Rs of the first electrode 25 corresponds to the method for allocating the CDM code $C_{mn}$ to the second electrodes 26 described above (refer to FIG. 13). If the CDM code $C_{mn}$ is allocated to the second electrodes 26 in the column direction in order, for example, the partial detection signals $X_{m-1}$ resulting from decoding are also allocated to the respective overlapping areas Rs of the first electrode 25 in the column direction in order. If the CDM code $C_{mn}$ is allocated to the second electrodes 26 in the diagonal direction, the partial detection signals $X_{m-1}$ resulting from decoding are also allocated to the respective overlapping areas Rs of the first electrode 25 in the diagonal direction in order.

When a finger is in contact with or in proximity to the first electrode 25, capacitance in the overlapping areas Rs changes corresponding to the unevenness on the surface of the finger and the distance between the finger and the overlapping areas Rs of the first electrode 25. The values of the partial detection signals $X_{m-1}$ resulting from decoding corresponding to the respective overlapping areas Rs of the first electrode 25 change corresponding to the capacitance changes. As a result, the coordinate extractor 45 can generate two-dimensional information indicating the shape of an external proximity object, such as a finger, in contact with or in proximity to the first electrode 25 based on the partial detection signals $X_{m-1}$ resulting from decoding. Specifically, the coordinate extractor 45, for example, may generate a two-dimensional image indicating the difference between the partial detection signals $X_{m-1}$ resulting from decoding corresponding to the unevenness of the external proximity object, such as a finger, as a shade of color (e.g., a gray scale). In this case, the calculator 40 outputs the two-dimensional information as the output Vout, for example. The calculator 40 may output the partial detection signals $X_{m-1}$ resulting from decoding as the output Vout and generate the two-dimensional information based on the partial detection signals $X_{m-1}$ resulting from decoding performed by an external MPU, for example.

As described above, the second electrode controller 17 switches the state of the second electrodes 26 serving as the first selection target selected based on the selection signals and the state of the second electrodes 26 serving as the second selection target not included in the first detection target out of the second electrodes 26 overlapping one first electrode 25 between a floating state and a shielded state. The detection controller 16 supplies the detection drive signal Vs to the first electrode 25. The first electrode 25 outputs the first detection signal $Y_{m-1}(+)$ and the second detection signal $Y_{m-1}(-)$ based on capacitance changes. The calculator 40 calculates the detection signal $Y_{m-1}$, which is the difference between the first detection signal $Y_{m-1}(+)$ and the second detection signal $Y_{m-1}(-)$, and performs decoding on the detection signal $Y_{m-1}$. The calculator 40 thus calculates the partial detection signals corresponding to the capacitance changes in the respective overlapping areas Rs of one first electrode 25. Consequently, the display apparatus 1 according to the present embodiment can increase the resolution for detection while suppressing an increase in the number of coupling wires 37 and the number of first electrodes 25.

Let us assume a case where one first electrode 25 is divided into pieces corresponding to the respective overlapping areas Rs. In this case, the intensity of the detection signals may possibly decrease because the area of each of the overlapping areas Rs is smaller than that of the first electrode 25. By performing the code division multiplex drive described above, the present embodiment can obtain 16 detection signals $Y_{m-1}$ the number of which is equal to the number of columns of the CDM code $C_{mn}$ as illustrated in FIGS. 14 to 17. As a result, the signal intensity increases by 16 times. In addition, the present embodiment calculates the detection signals $Y_{m-1}$ as the difference between the first detection signals $Y_{m-1}(+)$ and the second detection signals $Y_{m-1}(-)$. As a result, noise components can be reduced. Consequently, the present embodiment can increase the resolution for detection and improve the signal-to-noise (S/N) ratio.

In the example illustrated in FIGS. 14 to 17, the present embodiment changes the selection patterns of the second electrodes 26 in the order of the first selection operation $Tc_{1n}(+)$ and the second selection operation $Tc_{1n}(-)$ of the first column, the first selection operation $Tc_{2n}(+)$ and the second selection operation $Tc_{2n}(-)$ of the second column, . . . according to the order of the columns of the CDM code $C_{mn}$. The execution order is not limited thereto. The present embodiment, for example, may perform the first selection operations $Tc_{mn}(+)$ from m=1 to m=16 and then perform the second selection operations $Tc_{mn}(-)$ from m=1 to m=16. The order from m=1 to m=16 of the CDM code $C_{mn}$ may be appropriately modified.

Figure 19:
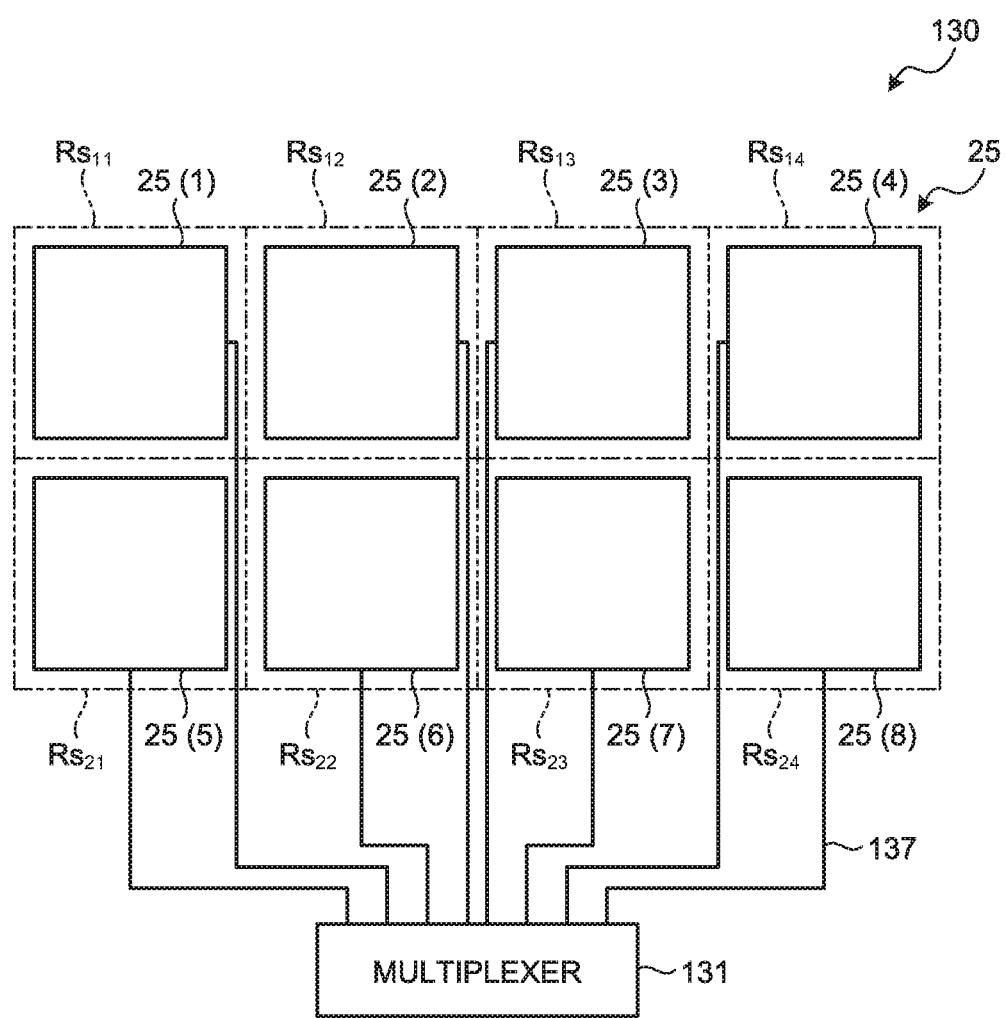
FIG. 19 is a diagram for schematically explaining the order of detection in the first electrode.
Figure 20:
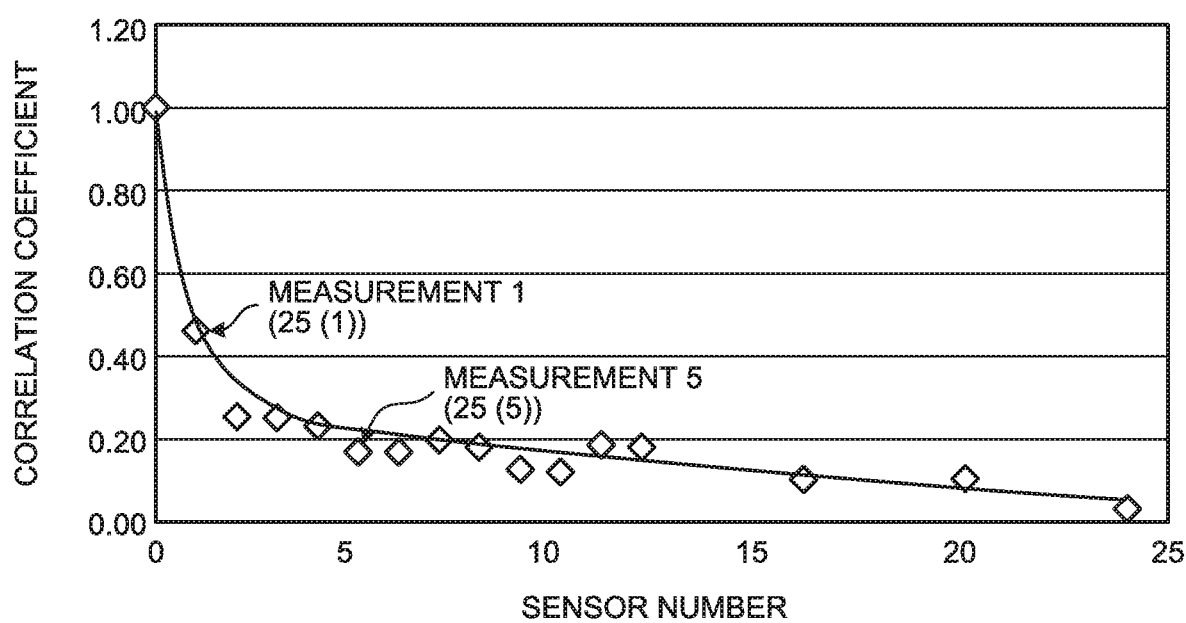
FIG. 20 is a graph schematically illustrating the relation between a sensor number and a correlation function.

FIG. 19 is a diagram for schematically explaining the order of detection in the first electrode. FIG. 20 is a graph schematically illustrating the relation between a sensor number and a correlation function. FIGS. 19 and 20 are drawings indicating the relation between an effect of noise and a detection timing in a detector 130 having the same configuration as that of the present disclosure. FIGS. 19 and 20 are drawing for explaining how the effect of noise changes. To simplify the explanation, FIGS. 19 and 20 illustrate a case where one first electrode 25 is divided into a plurality of pieces corresponding to the respective overlapping areas Rs. As illustrated in FIG. 19, for example, a first electrode 25(1) corresponds to the overlapping area $Rs_{11}$, a first electrode 25(2) corresponds to the overlapping area $Rs_{12}$, and a first electrode 25(5) corresponds to the overlapping area $Rs_{21}$.

As illustrated in FIG. 19, the first electrode 25(1), 25(2), . . . , 25(5), . . . are selected in this order out of the first electrodes 25, and the detection operation is performed thereon. Specifically, a multiplexer 131 sequentially selects the first electrode 25, and the selected first electrode 25 is supplied with the detection drive signal Vs via the multiplexer 131 and a wire 137. The detection order in the detector 130 illustrated in FIG. 19 is given by way of example only, and the detection operation performed by the display apparatus 1 according to the present embodiment and the detector 130 is not limited thereto.

In FIG. 20, the horizontal axis indicates the sensor number corresponding to the measurement order of the first electrodes 25. The vertical axis indicates the correlation function of the detection signals output from the respective first electrodes 25. When noise enters the detector 130, an error occurs in the detection signals output from the respective first electrodes 25. As illustrated in FIG. 20, the correlation function of the detection signals output from the respective first electrodes 25 tends to decrease as the sensor number increases. In other words, the error component caused by noise increases with the lapse of time. The error caused by an effect of noise increases between the detection signal output from the first electrode 25(1) measured first and the detection signal output from the first electrode 25(5) measured fifth, for example.

For this reason, it is preferable to perform the first selection operation $Tc_{mn}(+)$ and the second selection operation $Tc_{mn}(-)$ alternately like $Tc_{1n}(+)$, $Tc_{1n}(-)$, $Tc_{2n}(+)$, $Tc_{2n}(-)$, . . . as illustrated in FIGS. 14 to 17. This mechanism shortens the interval between the detection timings of the first detection signal $Y_{m-1}(+)$ and the second detection signal $Y_{m-1}(-)$, thereby reducing the difference in the noise components. The detection signal $Y_{m-1}$ is calculated as the difference between the first detection signal $Y_{m-1}(+)$ and the second detection signal $Y_{m-1}(-)$ by: $Y_{m-1}=Y_{m-1}(+)-Y_{m-1}(-)$. As a result, noise components in the first detection signal $Y_{m-1}(+)$ and those in the second detection signal $Y_{m-1}(-)$ are cancelled.

Figure 21:
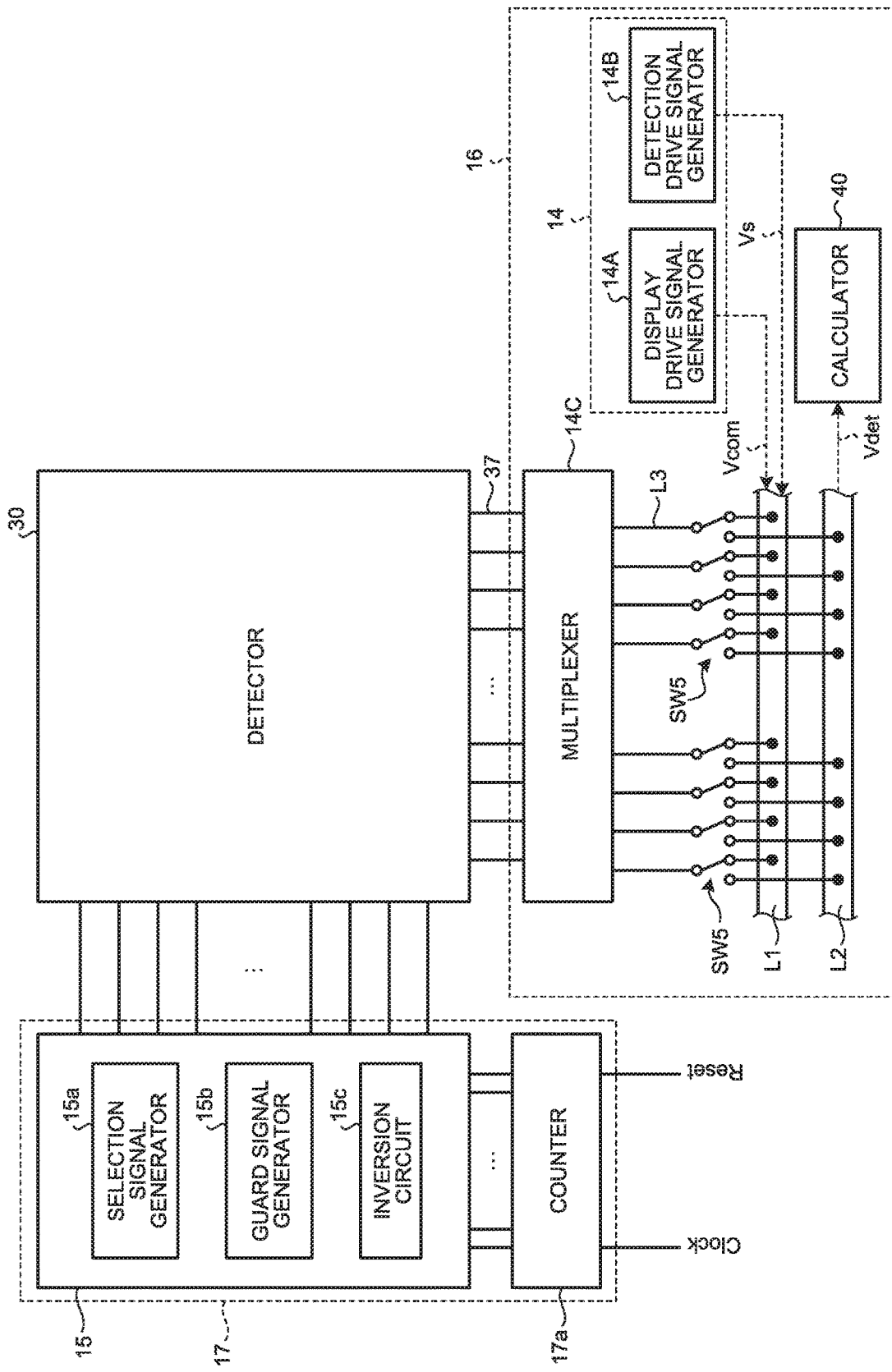
FIG. 21 is a block diagram of an exemplary configuration of a drive circuit according to the first embodiment.
Figure 22:
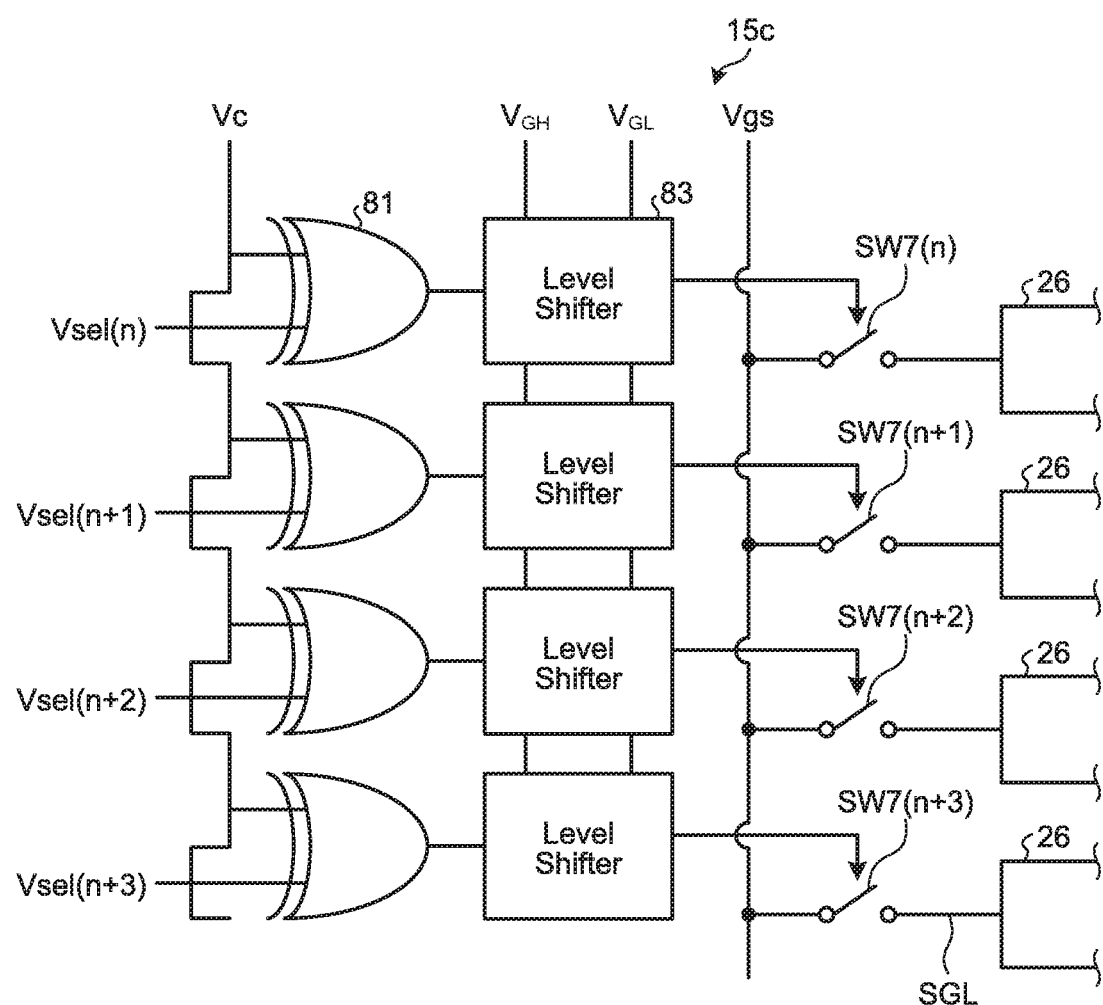
FIG. 22 is a circuit diagram of an example of an inversion circuit of the drive circuit according to the first embodiment.

The following describes an example of a drive circuit of the detector 30 according to the present embodiment. FIG. 21 is a block diagram of an exemplary configuration of the drive circuit according to the first embodiment. FIG. 22 is a circuit diagram of an example of an inversion circuit of the drive circuit according to the first embodiment.

As illustrated in FIG. 21, the second electrode controller 17 includes the second electrode driver 15 and a counter 17a. The second electrode driver 15 includes a selection signal generator 15a, a guard signal generator 15b, and an inversion circuit 15c.

The selection signal generator 15a generates the selection signals Vsel based on the CDM code $C_{mn}$. The selection signal Vsel is a voltage signal that becomes a high level corresponding to the element "1" of the CDM code $C_{mn}$ and becomes a low level corresponding to the element "0". The selection signal generator 15a supplies the selection signals Vsel to switches that switch between coupling and decoupling the second electrodes 26 of the detector 30 to and from the guard signal generator 15b.

The guard signal generator 15b generates the guard signals Vgs and supplies them to the second electrodes 26 serving as the second selection target described above. The second electrodes 26 serving as the first selection target are brought into a floating state where they are supplied with no guard signal Vgs from the guard signal generator 15b and their electric potential is not fixed.

The inversion circuit 15c generates a selection signal by inverting the high level part and the low level part of the selection signal Vsel supplied from the selection signal generator 15a. The selection signal generator 15a, for example, generates the first selection signal Vsel⁺ (refer to FIG. 12) for the first selection operation Tc⁺, and the inversion circuit 15c generates the second selection signal Vsel⁻ (refer to FIG. 12) for the second selection operation Tc⁻. An exemplary configuration of the inversion circuit 15c will be described later.

The counter 17a counts the pulse number of a clock signal supplied from a clock signal generator. Based on the count value output from the counter 17a, the selection signal generator 15a and the inversion circuit 15c sequentially switch the first selection signal Vsel⁺ and the second selection signal Vsel⁻, thereby selecting the second electrodes 26 serving as the first selection target and the second electrodes 26 serving as the second selection target. The clock signal generator is included in the display controller 11 (refer to FIG. 1), for example. The clock signal generator generates a reference clock for switching the first selection operations Tc⁺ and the second selection operations Tc⁻ illustrated in FIG. 12.

The second electrode controller 17 is supplied with a reset signal Reset at a timing when the detection period Pt is finished, for example. As a result, the selection signal generator 15a, the guard signal generator 15b, the inversion circuit 15c, and the counter 17a are reset.

As illustrated in FIG. 21, the detection controller 16 includes the first electrode driver 14, a multiplexer 14C, the calculator 40, and switches SW5. The multiplexer 14C is coupled to the first electrodes 25 of the detector 30 via the respective coupling wires 37. The multiplexer 14C is also coupled to the switches SW5 via respective third wires L3. The switch SW5 can switch between coupling and decoupling the first electrode driver 14 to and from the multiplexer 14C and between coupling and decoupling the calculator 40 to and from the multiplexer 14C.

The first electrode driver 14 includes a display drive signal generator 14A and a detection drive signal generator 14B. The display drive signal generator 14A generates the display drive signals Vcom and supplies them to the first electrodes 25 of the detector 30 via a first wire L1, the switches SW5, and the multiplexer 14C in the display operation. The detection drive signal generator 14B generates the detection drive signals Vs and supplies them to the first electrodes 25 of the detector 30 via the first wire L1, the switches SW5, and the multiplexer 14C. The first electrodes 25 sequentially or simultaneously output the detection signals Vdet to the calculator 40 via the multiplexer 14C.

The switch SW5, for example, can switch between supplying the detection drive signal Vs and outputting the detection signal Vdet. If the first wire L1 is coupled to the multiplexer 14C by the switch SW5, a second wire L2 is decoupled from the multiplexer 14C. As a result, the display drive signal Vcom or the detection drive signal Vs is supplied to the first electrode 25 via the first wire L1 and the third wire L3. By contrast, if the second wire L2 is coupled to the multiplexer 14C by the switch SW5, the first wire L1 is decoupled from the multiplexer 14C. As a result, the detection signal Vdet is supplied to the calculator 40 via the second wire L2 and the third wire L3.

The functions of the multiplexer 14C, the switches SW5, the first wire L1, the second wire L2, and the third wires L3 may be included in the first electrode driver 14. Alternatively, they may be included in a circuit provided separately from the first electrode driver 14. The display controller 11 may include the functions of the display drive signal generator 14A and the detection drive signal generator 14B. The multiplexer 14C, the switches SW5, the first wire L1, the second wire L2, and the third wires L3 are provided on the first substrate 21.

As illustrated in FIG. 22, the inversion circuit 15c includes exclusive OR circuits 81 and voltage signal switchers 83. Switches SW7 are coupled to the respective second electrodes 26 via the respective data lines SGL. The voltage signal switcher 83 supplies a voltage signal to the switch SW7. If the voltage signal is at a high level, for example, the switch SW7 is turned off. As a result, the corresponding second electrode 26 is supplied with no guard signal Vgs and brought into a floating state. If the voltage signal is at a low level, the switch SW7 is turned on. As a result, the corresponding second electrode 26 is supplied with the guard signal Vgs.

The exclusive OR circuits 81 are coupled to the clock signal generator and supplied with a clock signal Vc. The clock signal Vc, for example, is turned on (high level) corresponding to the first selection operations Tc$^+$ and turned off (low level) corresponding to the second selection operations Tc$^-$. The exclusive OR circuits 81 are supplied with the selection signals Vsel(n), Vsel(n+1), Vsel(n+2), and Vsel(n+3) from the selection signal generator 15a.

If the clock signal Vc is turned on (high level) and the selection signal Vsel is turned on (high level), or if the clock signal Vc is turned off (low level) and the selection signal Vsel is turned off (low level), the exclusive OR circuit 81 outputs a high-level signal. If the clock signal Vc is turned on (high level) and the selection signal Vsel is turned off (low level), or if the clock signal Vc is turned off (low level) and the selection signal Vsel is turned on (high level), the exclusive OR circuit 81 outputs a low-level signal.

The voltage signal switcher 83 is supplied with a high-level voltage signal $V_{GH}$ and a low-level voltage signal $V_{GL}$. The voltage signal switcher 83 switches the high-level voltage signal $V_{GH}$ and the low-level voltage signal $V_{GL}$ based on the output signal from the exclusive OR circuit 81 and outputs the signal to the switch SW7. If the exclusive OR circuit 81 outputs the high-level signal, the voltage signal switcher 83 outputs the high-level voltage signal $V_{GH}$ to the switch SW7. If the exclusive OR circuit 81 outputs the low-level signal, the voltage signal switcher 83 outputs the low-level voltage signal $V_{GL}$ to the switch SW7.

With the inversion circuit 15c having the configuration described above, the switch SW7 is turned off in the first selection operations Tc$^+$ based on the selection signal Vsel turned on (high level) corresponding to the element "1" of the CDM code $C_{mn}$. As a result, the second electrodes 26 serving as the first selection target are brought into a floating state. In the second selection operations Tc$^-$, a voltage signal obtained by inverting the selection signal Vsel is supplied to the switch SW7. In other words, in the second selection operations Tc$^-$, the selection signal Vsel turned on (high level) corresponding to the element "1" of the CDM code $C_{mn}$ is inverted. Consequently, a voltage signal turned on (high level) corresponding to the element "0" of the CDM code $C_{mn}$ is supplied to the switch SW7. As a result, the switch SW7 is turned off, and the second electrodes 26 serving as the first selection target are brought into a floating state.

The configuration of the inversion circuit 15c illustrated in FIG. 21 is given by way of example only and may be appropriately modified. The inversion circuit 15c is not necessarily provided, and the detection controller 16, for example, may hold the CDM code corresponding to the element "1" of the square matrix A in Expression (5) and the CDM code corresponding to the element "−1" of the square matrix A. The selection signal generator 15a may generate the selection signals for the first selection operations Tc$^+$ and those for the second selection operations Tc$^-$ based on the two CDM codes.

First Modification

Figure 23:
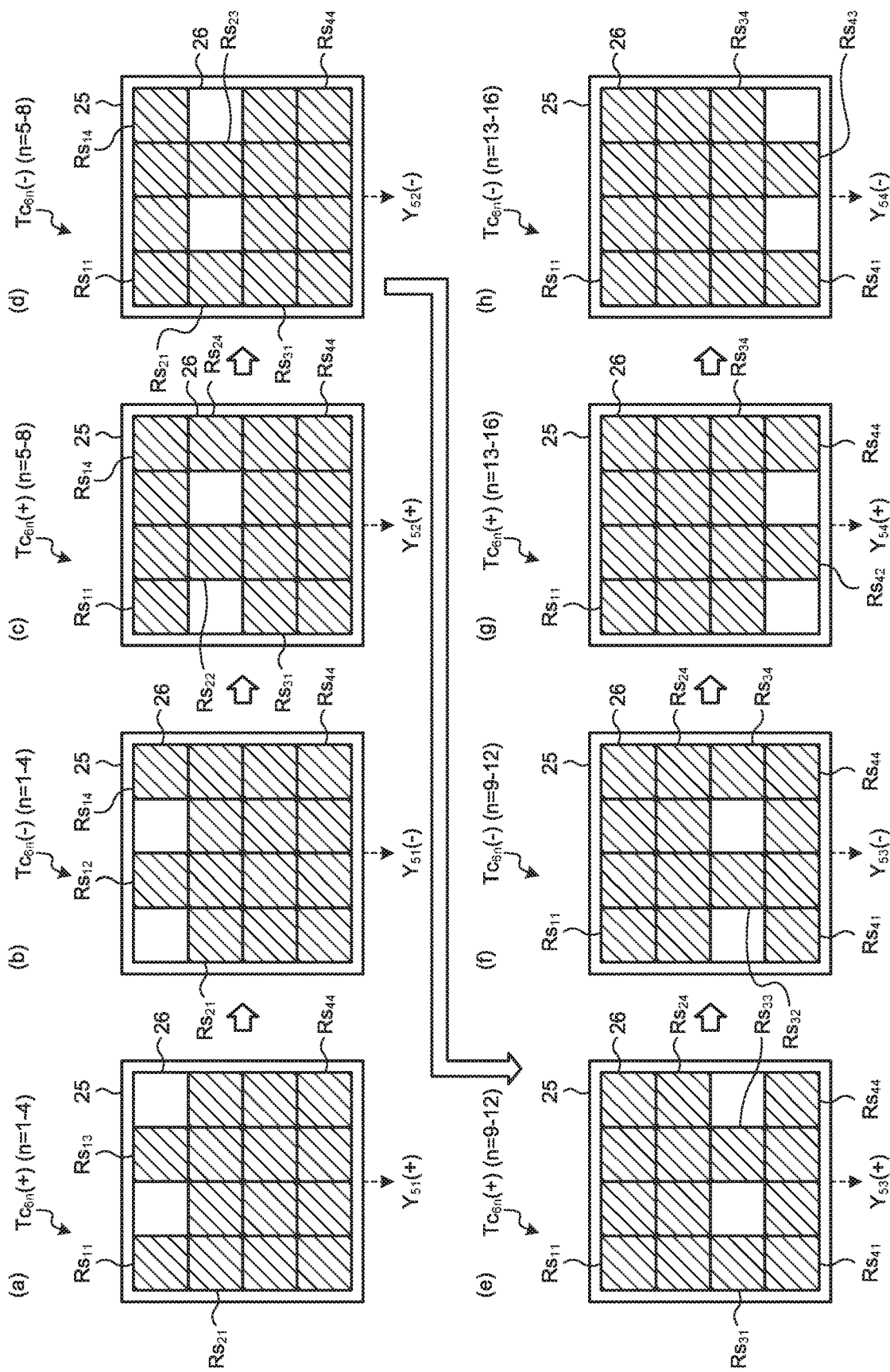
FIG. 23 is a diagram for explaining the selection patterns of the second electrodes according to a first modification of the first embodiment.

FIG. 23 is a diagram for explaining the selection patterns of the second electrodes according to a first modification of the first embodiment. In the example illustrated in FIGS. 14 to 17, the present embodiment performs the detection operation of one column of the CDM code $C_{mn}$ simultaneously on the second electrodes 26 arrayed in a matrix (row-column configuration). The present embodiment is not limited thereto. The second electrode controller 17, for example, may sequentially select the second electrodes 26 in units of one horizontal line coupled to one gate line GCL (refer to FIG. 7). The second electrode controller 17 may perform the detection operation in units of the overlapping areas Rs of one row overlapping the second electrodes 26 of one horizontal line.

FIG. 23 illustrates the selection patterns of the CDM code $C_{6n}$ of the sixth column and corresponds to FIGS. 15(c) and 15(d). FIG. 23(a) indicates the first selection operation Tc$_{6n}$(+) corresponding to the elements in the first to the fourth rows (n=1 to n=4) of the CDM code $C_{6n}$. FIG. 23(b) indicates the second selection operation Tc$_{6n}$(−) corresponding to the elements in the first to the fourth rows (n=1 to n=4) of the CDM code $C_{6n}$. FIGS. 23(c) and 23(d) indicate the first selection operation Tc$_{6n}$(+) and the second selection operation $Tc_{6n}(-)$, respectively, corresponding to the elements in the fifth to the eighth rows (n=5 to n=8) of the CDM code $C_{6n}$. FIGS. 23(e) and 23(f) indicate the first selection operation $Tc_{6n}(+)$ and the second selection operation $Tc_{6n}(-)$, respectively, corresponding to the elements in the ninth to the twelfth rows (n=9 to n=12) of the CDM code $C_{6n}$. FIGS. 23(g) and 23(h) indicate the first selection operation $Tc_{6n}(+)$ and the second selection operation $Tc_{6n}(-)$, respectively, corresponding to the elements in the thirteenth to the sixteenth rows (n=13 to n=16) of the CDM code $C_{6n}$.

As illustrated in FIG. 23(a), the gate driver 12 (refer to FIG. 1) selects the second electrodes 26 in the first row in the first selection operation $Tc_{6n}(+)$ corresponding to the elements in the first to the fourth rows (n=1 to n=4) of the CDM code $C_{6n}$. The second electrode controller 17 selects, out of the second electrodes 26 in the first row, the second electrodes 26 corresponding to the element "1" in the first to the fourth rows of the CDM code $C_{6n}$ as the first selection target. As a result, the second electrodes 26 overlapping the overlapping areas $Rs_{11}$ and $Rs_{13}$ are brought into a floating state. The second electrode controller 17 selects, out of the second electrodes 26 in the first row, the second electrodes 26 corresponding to the element "0" in the first to the fourth rows of the CDM code $C_{6n}$ as the second selection target. As a result, the second electrodes 26 overlapping the overlapping areas $Rs_{12}$ and $Rs_{14}$ are supplied with the guard signals Vgs and brought into a shielded state.

In FIG. 23(a), the second electrode controller 17 brings the second electrodes 26 in the second to the fourth rows not selected by the gate driver 12 (refer to FIG. 1) into a floating state. The detection controller 16 supplies the detection drive signal Vs to the first electrode 25, thereby enabling detection of capacitance changes in the overlapping areas $Rs_{11}$ and $Rs_{13}$ and the overlapping areas $Rs_{21}$ to $Rs_{44}$ of the first electrode 25. As a result, the first electrode 25 outputs a first detection signal $Y_{51}(+)$.

Subsequently, as illustrated in FIG. 23(b), the gate driver 12 (refer to FIG. 1) selects the second electrodes 26 in the first row in the second selection operation $Tc_{6n}(-)$. The second electrode controller 17 selects, out of the second electrodes 26 in the first row, the second electrodes 26 corresponding to the element "0" in the first to the fourth rows of the CDM code $C_{6n}$ as the first selection target. As a result, the second electrodes 26 overlapping the overlapping areas $Rs_{12}$ and $Rs_{14}$ are brought into a floating state. The second electrode controller 17 selects, out of the second electrodes 26 in the first row, the second electrodes 26 corresponding to the element "1" in the first to the fourth rows of the CDM code $C_{6n}$ as the second selection target. As a result, the second electrodes 26 overlapping the overlapping areas $Rs_{11}$ and $Rs_{13}$ are supplied with the guard signals Vgs and brought into a shielded state.

In FIG. 23(b), the second electrodes 26 in the second to the fourth rows not selected by the gate driver 12 (refer to FIG. 1) are in a floating state. The detection controller 16 supplies the detection drive signal Vs to the first electrode 25, thereby enabling detection of capacitance changes in the overlapping areas $Rs_{12}$ and $Rs_{14}$ and the overlapping areas $Rs_{21}$ to $Rs_{44}$ of the first electrode 25. As a result, the first electrode 25 outputs a second detection signal $Y_{51}(-)$. The calculator 40 calculates a detection signal $Y_{51}$ (=$Y_{51}(+)-Y_{51}(-)$), which is the difference between the first detection signal $Y_{51}(+)$ and the second detection signal $Y_{51}(-)$.

Subsequently, as illustrated in FIGS. 23(c) and 23(d), the gate driver 12 selects the second electrodes 26 in the second row in the first selection operation $Tc_{6n}(+)$ and the second selection operation $Tc_{6n}(-)$ corresponding to the elements in the fifth to the eighth rows (n=5 to n=8) of the CDM code $C_{6n}$. The second electrode controller 17 selects, out of the second electrodes 26 in the second row, the second electrodes 26 serving as the first selection target and the second electrodes 26 serving as the second selection target corresponding to the elements in the fifth to the eighth rows of the CDM code $C_{6n}$. The second electrode controller 17 thus switches the states of the second electrodes 26 between a floating state and a shielded state. In FIGS. 23(c) and 23(d), the second electrodes 26 in the first, the third, and the fourth rows not selected by the gate driver 12 (refer to FIG. 1) are in a floating state. The calculator 40 calculates a detection signal $Y_{52}$ (=$Y_{52}(+)-Y_{52}(-)$), which is the difference between a first detection signal $Y_{52}(+)$ and a second detection signal $Y_{52}(-)$ output from the first electrode 25.

Similarly, as illustrated in FIGS. 23(e) to 23(h), the gate driver 12 sequentially selects the second electrodes 26 in the third row and those in the fourth row. The second electrode controller 17 selects, out of the second electrodes 26 in the third row and those in the fourth row, the second electrodes 26 serving as the first selection target and the second electrodes 26 serving as the second selection target. The second electrode controller 17 thus switches the states of the second electrodes 26 between a floating state and a shielded state. The calculator 40 calculates a detection signal $Y_{53}$ (=$Y_{53}(+)-Y_{53}(-)$), which is the difference between a first detection signal $Y_{53}(+)$ and a second detection signal $Y_{53}(-)$ output from the first electrode 25. The calculator 40 calculates a detection signal $Y_{54}$ (=$Y_{53}(+)-Y_{53}(-)$), which is the difference between a first detection signal $Y_{54}(+)$ and a second detection signal $Y_{54}(-)$ output from the first electrode 25.

The calculator 40 integrates the four detection signals $Y_{51}$, $Y_{52}$, $Y_{53}$, and $Y_{54}$ obtained by sequentially selecting the second electrodes 26 in one horizontal line. The calculator 40 thus calculates a detection signal $Y_5$ corresponding to the CDM code $C_{6n}$ in the sixth column. While FIGS. 23(a) to 23(h) illustrate the selection patterns of the CDM code $C_{6n}$ in the sixth column, the present modification can calculate the detection signal $Y_{m-1}$ by sequentially selecting the second electrodes 26 in units of one horizontal line based on the columns of the CDM code $C_{mn}$ (m=1 to m=16). The present modification performs decoding on the detection signal $Y_{m-1}$ using Expression (6), thereby calculating the signals resulting from decoding of the respective overlapping areas Rs.

The present modification can make the output of the detection signals larger by bringing the second electrodes 26 not selected by the gate driver 12 into a floating state. The present modification is not limited thereto. The present modification may supply the guard signals Vgs to the second electrodes 26 not selected by the gate driver 12, thereby bringing them into a shielded state.

Second Modification

Figure 24:
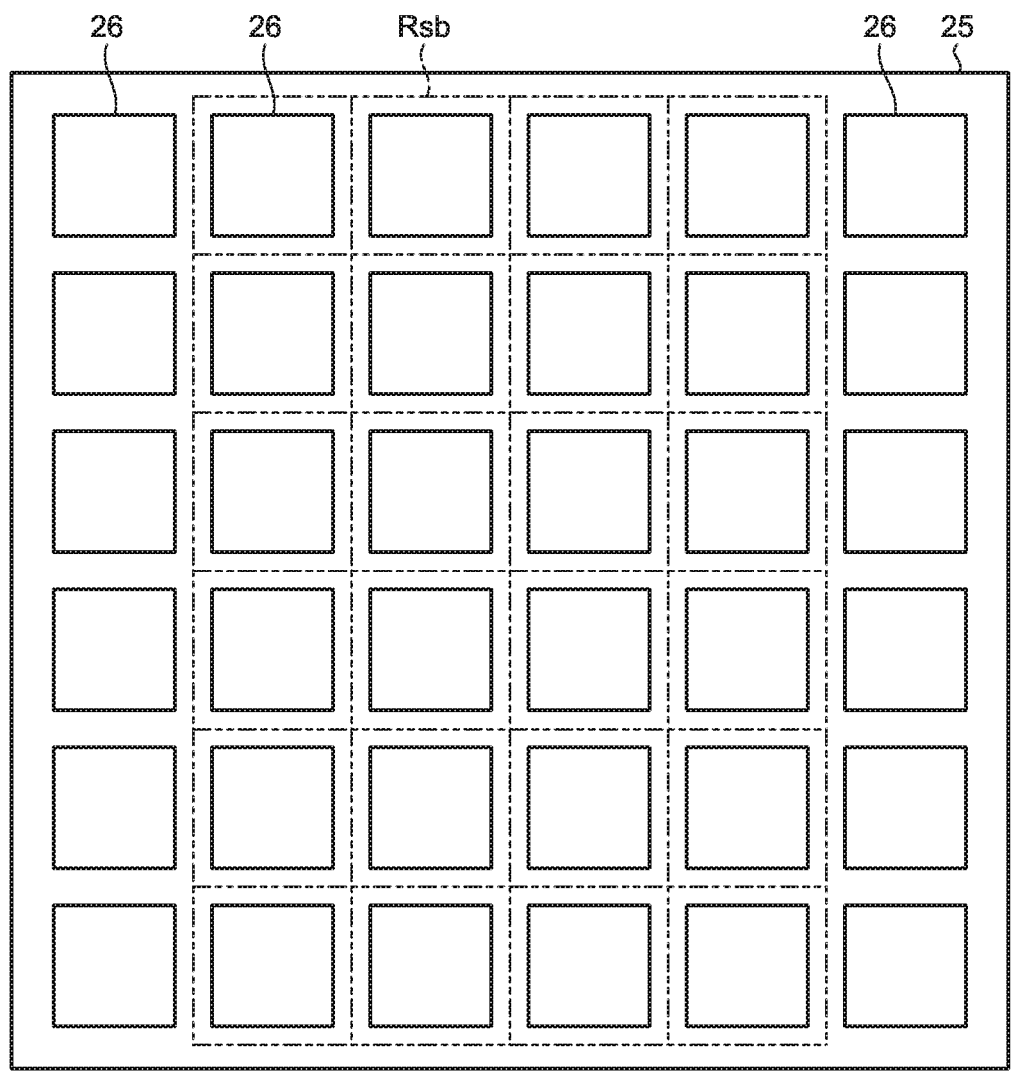
FIG. 24 is a plan view of the relation between the first electrode and the second electrodes according to a second modification of the first embodiment.

FIG. 24 is a plan view of the relation between the first electrode and the second electrodes according to a second modification of the first embodiment. In the example illustrated in FIGS. 14 to 17 and other figures, the present embodiment performs code division multiplex drive based on the predetermined code on the second electrodes 26 in four rows and four columns. The configuration of the second electrodes 26 is not limited thereto, and they may be arrayed in five or more rows and five or more columns, for example. In addition, the electrode block including the second electrodes 26 is not limited to a square electrode block having the same number of rows and columns. As illustrated in FIG.

24, the electrode block may be a rectangular electrode block including the second electrodes 26 in six rows and four columns. The electrode block may have a polygonal shape.

The present embodiment need not perform code division multiplex drive on all the second electrodes 26 overlapping the first electrode 25 and may perform it on some of the second electrodes 26 overlapping the first electrode 25. In FIG. 24, for example, the second electrodes 26 corresponding to overlapping areas Rsb are to be subjected to code division multiplex drive. The present embodiment does not necessarily perform code division multiplex drive on the second electrodes 26 disposed on the outer side than the overlapping areas Rsb. In this case, the second electrode controller 17 may supply the guard signals Vgs to the second electrodes 26 disposed on the outer side than the overlapping areas Rsb in the detection operation, thereby bringing them into a shielded state. Alternatively, the second electrode controller 17 may supply no guard signal Vgs to the second electrodes 26, thereby bringing them into a floating state.

Figure 26:
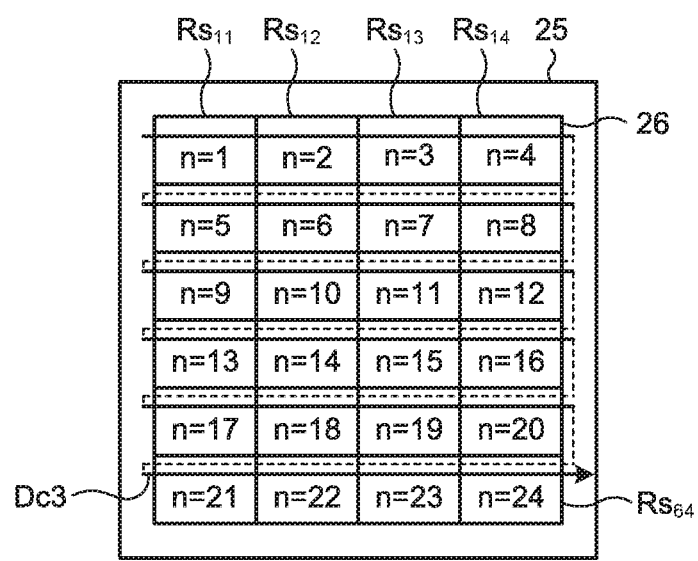
FIG. 26 is a diagram for explaining an example of an allocation pattern of the CDM code to the second electrodes according to the second modification.

The CDM code $C_{mn}$ illustrated in FIG. 13(a) has 16 rows and 16 columns. If the number of second electrodes 26 is equal to or larger than 17, some of the second electrodes 26 fail to be associated with the CDM code $C_{mn}$. FIG. 25 is a table of an example of the CDM code according to the second modification of the first embodiment. FIG. 26 is a diagram for explaining an example of an allocation pattern of the CDM code to the second electrodes according to the second modification.

As indicated by Table 2 in FIG. 25, a CDM code $Ca_{mn}$ according to the present modification has elements in 32 rows and 32 columns. The present modification can switch the states of 24 second electrodes 26 in six rows and four columns between a floating state and a shielded state based on the CDM code $Ca_{mn}$. The elements in the first to the twenty-fourth rows (n=1 to n=24) of the CDM code $Ca_{1n}$ in the first row of the CDM code $Ca_{mn}$ are allocated to the 24 second electrodes 26 illustrated in FIG. 24. The elements in the twenty-fifth to the thirty-second rows of the CDM code $Ca_{1n}$ are not allocated to any second electrode 26 and are not used in the detection operation.

The method for allocating the CDM code $Ca_{mn}$ to the second electrodes 26 disposed in a row-column configuration is not particularly limited. As illustrated in FIG. 26, in the case of the CDM code $Ca_{1n}$ in the first column, the detection controller 16 can allocate the CDM code $Ca_{1n}$ to the second electrodes 26 in order in the direction indicated by the arrow Dc3.

In other words, the detection controller 16 allocates the elements from n=1 to n=4 of the CDM code $Ca_{1n}$ to the second electrodes 26 in the first row in order. Similarly, the detection controller 16 allocates the elements from n=5 to n=8 of the CDM code $Ca_{1n}$ to the second electrodes 26 in the second row in order. The detection controller 16 allocates the elements from n=9 to n=12 of the CDM code $Ca_{1n}$ to the second electrodes 26 in the third row in order. The detection controller 16 sequentially allocates the elements of the CDM code $Ca_{1n}$ to the second electrodes 26 row by row. As a result, the elements in the respective rows of the CDM code $C_{1n}$ are associated with the second electrodes 26 disposed in a row-column configuration in a one-to-one correspondence.

The CDM code $Ca_{mn}$ according to the present modification has 32 columns, and the present modification performs the detection operations column by column. In other words, the number of combinations in selecting the second electrodes 26 serving as the first selection target and the second electrodes 26 serving as the second selection target is 32, which is equal to the number of columns of the CDM code $Ca_{mn}$. The present modification performs the first selection operation and the second selection operation in each of the 32 patterns. In other words, the present modification performs the detection operations of 64 patterns in total.

While FIG. 25 illustrates the CDM code $Ca_{mn}$ having 32 rows and 32 columns, the data structure is not limited thereto. The order of the CDM codes $C_{mn}$ and $Ca_{mn}$ is $2^n$ (n=1, 2, ... ) because they are generated from a Hadamard matrix as described above. If the number of second electrodes 26 is equal to or larger than 33, for example, the order of the CDM code can be set to $2^6=64$.

Third Modification

Figure 27:
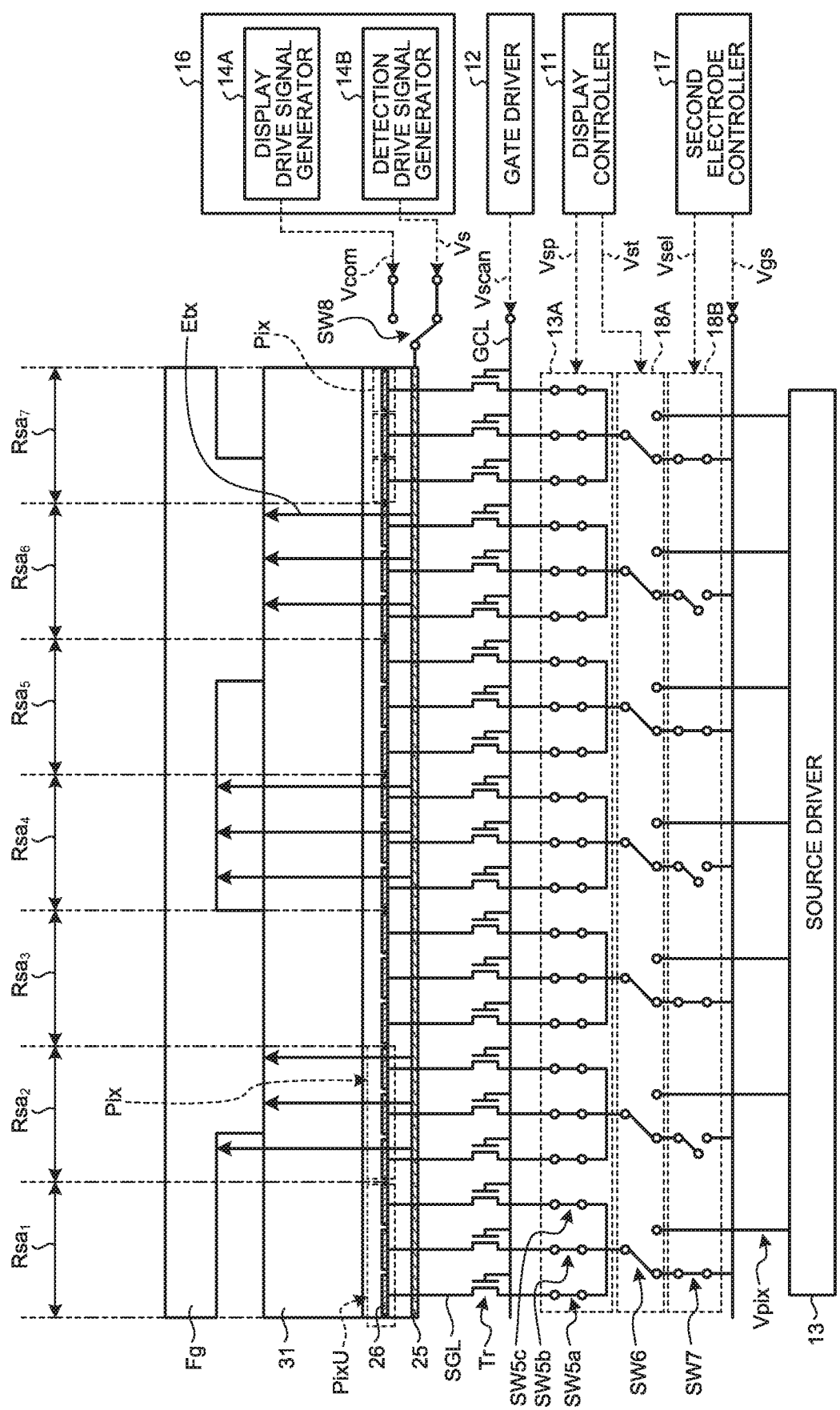
FIG. 27 is a diagram schematically illustrating the drive circuit for the second electrodes according to a third modification of the first embodiment.

FIG. 27 is a diagram schematically illustrating the drive circuit for the second electrodes according to a third modification of the first embodiment. As illustrated in FIG. 27, the present modification collectively drives a plurality of second electrodes 26 serving as one pixel group PixU. Specifically, the present modification switches the second electrodes 26 serving as the first selection target and the second electrodes 26 serving as the second selection target in units of one pixel group PixU including a plurality of second electrodes 26 based on the CDM code $C_{mn}$. In other words, the present modification switches the second electrodes 26 serving as the first selection target and the second electrodes 26 serving as the second selection target in units of a second electrode group including a plurality of second electrodes 26.

As illustrated in FIG. 27, the second electrodes 26 are coupled to a multiplexer 13A via the respective data lines SGL. The second electrodes 26 serving as one pixel group PixU can be coupled to a first switch unit 18A by respective switches SW5a, SW5b, and SW5c. The first switch unit 18A includes switches SW6 for the respective pixel groups PixU and switches the coupling state between the second electrodes 26 serving as one pixel group PixU and the source driver 13. The first switch unit 18A also switches the coupling state between the second electrodes 26 serving as one pixel group PixU and the second electrode controller 17.

In the display operation, the source driver 13 is coupled to the second electrodes 26 serving as one pixel group PixU by the first switch unit 18A and supplies the pixel signals Vpix to the second electrodes 26. The multiplexer 13A switches coupling in units of one second electrode 26 serving as a sub-pixel SPix, thereby performing the display operation. The multiplexer 13A and the first switch unit 18A are controlled based on control signals Vsp and Vst, respectively, supplied from the display controller 11. In the display operation, the display drive signal generator 14A of the detection controller 16 is coupled to the first electrode 25 by a switch SW8 and supplies the display drive signal Vcom to the first electrode 25.

In the detection operation, the first switch unit 18A couples a second switch unit 18B to the second electrodes 26 serving as one pixel group PixU. The second switch unit 18B switches between coupling and decoupling the second electrodes 26 serving as one pixel group PixU to and from the second electrode controller 17 based on the selection signal Vsel supplied from the second electrode controller 17. The switches SW7 of the second switch unit 18B are turned off based on the selection signal Vsel corresponding to the element "1" of the CDM code $C_{mn}$, thereby bringing the second electrodes 26 serving as the first selection target into a floating state. By contrast, the switches SW7 of the second switch unit 18B are turned on based on the selection signal Vsel corresponding to the element "0" of the CDM code $C_{mn}$. As a result, the guard signals Vgs are supplied to the second electrodes 26 serving as the second selection target, thereby bringing them into a shielded state.

The switches SW7 according to the present modification are provided for the respective pixel groups PixU. The three switches SW5a, SW5b, and SW5c of the multiplexer 13A can be coupled to one switch SW7. With this configuration, the second electrode controller 17 can supply the guard signal Vgs to the second electrodes 26 serving as one pixel group PixU simultaneously or bring the second electrodes 26 serving as one pixel group PixU into a floating state simultaneously. In the detection operation, the detection drive signal generator 14B of the detection controller 16 is coupled to the first electrode 25 by the switch SW8 and supplies the detection drive signal Vs to the first electrode 25.

Overlapping areas Rsa of the first electrode 25 each overlap three second electrodes 26 serving as one pixel group PixU. The present modification switches the area that can detect a capacitance change and the area that suppresses a capacitance change in each of the overlapping areas Rsa of the first electrode 25. In the example illustrated in FIG. 27, for example, the second electrodes 26 corresponding to overlapping areas $Rsa_1$, $Rsa_3$, $Rsa_5$, and $Rsa_7$ are in a shielded state. As a result, a capacitance change is suppressed in the overlapping areas $Rsa_1$, $Rsa_3$, $Rsa_5$, and $Rsa_7$ when the detection drive signal Vs is supplied. By contrast, the second electrodes 26 corresponding to overlapping areas $Rsa_2$, $Rsa_4$, and $Rsa_6$ are in a floating state. An electric field Etx extending from the first electrode 25 reaches a finger Fg in contact with or in proximity to the detector 30. Consequently, the present modification can detect capacitance changes corresponding to the unevenness on the surface of the finger Fg in the overlapping areas $Rsa_2$, $Rsa_4$, and $Rsa_6$ of the first electrode 25.

By collectively driving a plurality of second electrodes 26 as described above, the present modification can provide appropriate resolution for detection. In the detection operation, the present modification can reduce the number of combinations in selecting the second electrodes 26, thereby simplifying the processing performed by the calculator 40. While the present modification collectively drives three second electrodes 26 serving as one pixel group PixU, the configuration is not limited thereto. The present modification may collectively drive four or more second electrodes 26 or a plurality of pixel groups PixU, for example. In this case, capacitance changes are detected in units of areas overlapping a plurality of pixel groups PixU in the first electrode 25. In other words, the number of collectively driven second electrodes 26 need not correspond to an integral multiple of the pixel group PixU, and the second electrodes 26 may be driven in units of the second electrode group including a plurality of second electrodes 26.

Second Embodiment

Figure 28:
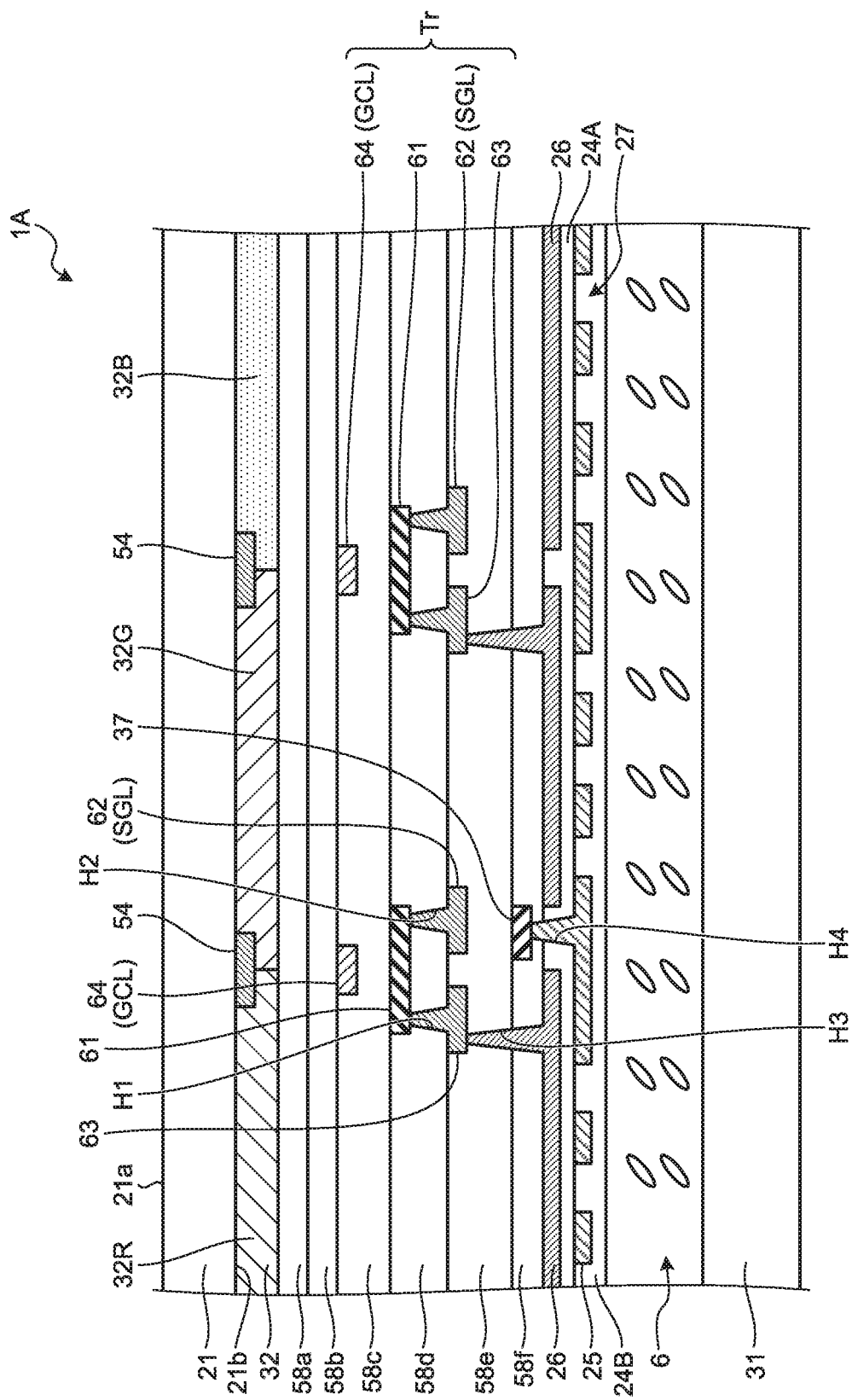
FIG. 28 is a sectional view of a schematic sectional structure of the display apparatus according to a second embodiment of the present disclosure.

FIG. 28 is a sectional view of a schematic sectional structure of the display apparatus according to a second embodiment of the present disclosure. In a display apparatus 1A according to the present embodiment, a first surface 21a of the first substrate 21 serves not only as a detection surface with or to which an external object, such as a finger, is in contact or in proximity but also as a display surface on which an observer can visually recognize an image passing therethrough.

As illustrated in FIG. 28, the color filters 32, the switching elements Tr, the coupling wire 37, the second electrodes 26, and the first electrode 25 are provided in this order on a second surface 21b opposite to the first surface 21a of the first substrate 21. The second substrate 31 is disposed facing the second surface 21b of the first substrate 21. The liquid crystal layer 6 is provided between the second substrate 31 and the first electrode 25. In the present embodiment, an upper side indicates a side in a direction from the second substrate 31 toward the first substrate 21 of the direction perpendicular to the second surface 21b, and a lower side indicates a direction from the first substrate 21 toward the second substrate 31.

The color filters 32R, 32G, and 32B are provided on the second surface 21b of the first substrate 21 corresponding to the respective pixels Pix. Light-shielding layers 54 are provided on the second surface 21b of the first substrate 21 at the boundaries between the color filters 32R, 32G, and 32B. The switching elements Tr are provided at positions under the boundaries between the color filters 32R, 32G, and 32B.

The switching element Tr includes a semiconductor layer 61, a source electrode 62, a drain electrode 63, and a gate electrode 64. The semiconductor layer 61 can be made of a publicly known material, such as polysilicon and an oxide semiconductor. A portion of the data line SGL under the semiconductor layer 61 serves as the source electrode 62. A portion of the gate line GCL overlapping the semiconductor layer 61 serves as the gate electrode 64.

The gate electrode 64 is provided below the color filters 32 with a planarization layer 58a and an insulating layer 58b interposed therebetween. The gate electrode 64 is provided at a position under the light-shielding layer 54. The semiconductor layer 61 is provided below the gate electrode 64 with an insulating layer 58c interposed therebetween. The source electrode 62 and the drain electrode 63 are provided below the semiconductor layer 61 with an insulating layer 58d interposed therebetween. While the source electrode 62 and the drain electrode 63 are provided to the same layer, they may be provided to different layers. The drain electrode 63 is electrically coupled to the semiconductor layer 61 through a contact hole H1. The source electrode 62 is electrically coupled to the semiconductor layer 61 through a contact hole H2.

The coupling wire 37 is provided below the source electrode 62 and the drain electrode 63 with an insulating layer 58e interposed therebetween. The second electrode 26 is provided below the coupling wire 37 with an insulating layer 58f interposed therebetween. The second electrode 26 is electrically coupled to the drain electrode 63 through a contact hole H3. The first electrode 25 is provided below the second electrode 26 with an insulating layer 24A interposed therebetween. The first electrode 25 is electrically coupled to the coupling wire 37 through a contact hole H4. An insulating layer 24B is provided between the first electrode 25 and the liquid crystal layer 6.

As described above, the second electrodes 26 are provided for the respective color filters 32R, 32G, and 32B corresponding to the respective pixels Pix. The first electrode 25 is provided under the second electrodes 26. The first electrode 25 according to the present embodiment is provided between the second electrodes 26 and the liquid crystal layer 6. The first electrode 25 has a plurality of openings 27. Fringe electric fields formed between the first electrode 25 and the second electrodes 26 pass through the openings 27 and reach the liquid crystal layer 6, thereby performing the display operation.

The second electrode controller 17 according to the present embodiment also switches the states of the second electrodes 26 between a floating state and a shielded state based on the CDM code $C_{mn}$. The calculator 40 decodes the detection signals output from the first electrode 25. The display apparatus 1A thus can detect capacitance changes caused by an external object, such as a finger, in contact with or in proximity to the first surface 21a with satisfactory resolution.

In the configuration according to the present embodiment, the second electrodes 26, the first electrodes 25, and the liquid crystal layer 6 are provided in this order in a direction from the first substrate 21 toward the second substrate 31. In other words, the liquid crystal later 6 is not present between the first electrodes 25 serving as the detection electrodes and the first surface 21a serving as the detection surface. If the permittivity changes because of a change in the orientation state of the liquid crystal layer 6 in the detection operation, the configuration can suppress capacitance changes in the first electrodes 25. Consequently, the display apparatus 1A according to the present embodiment can suppress noise in the detection operation.

Third Embodiment

Figure 29:
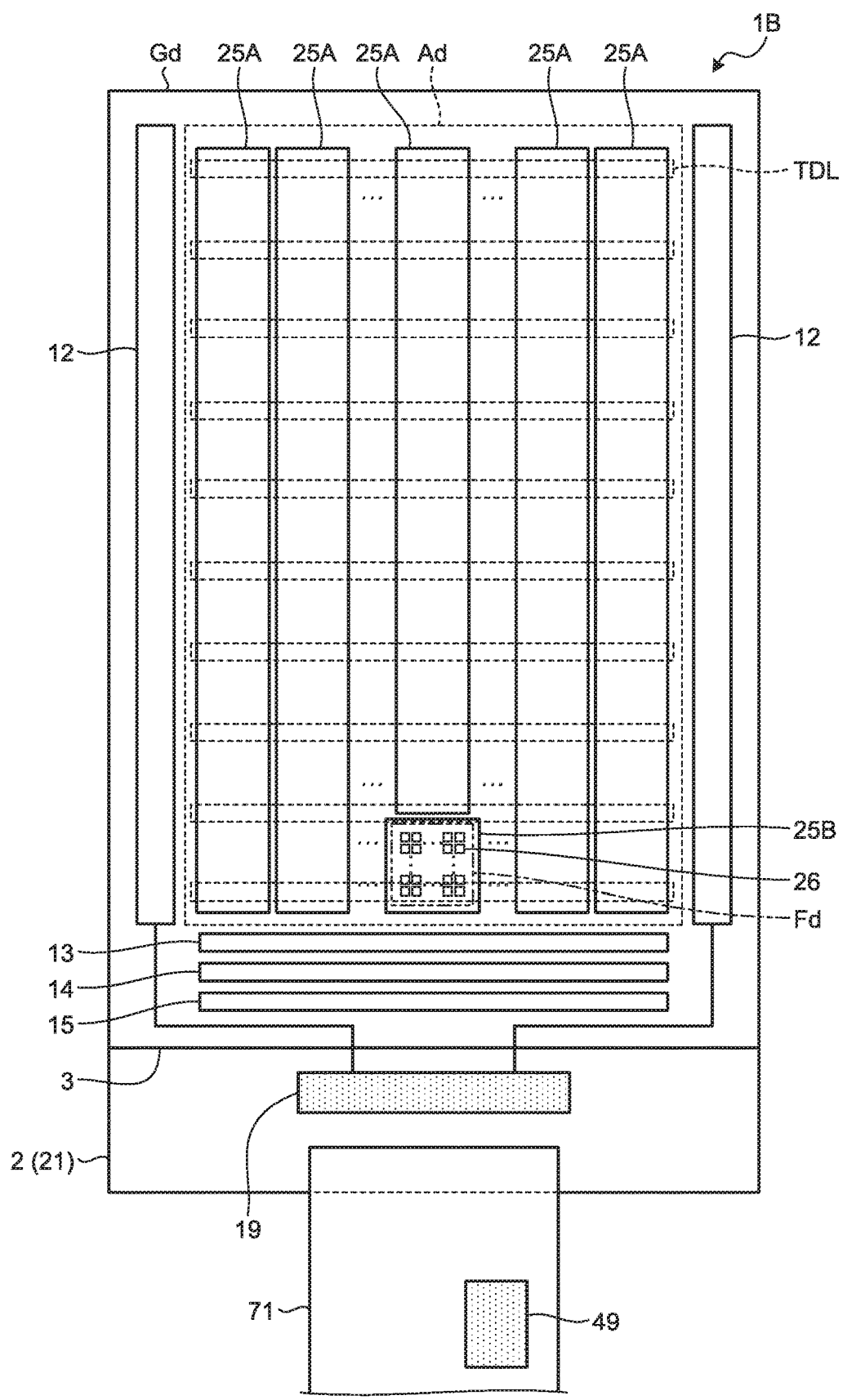
FIG. 29 is a plan view of an example of arrangement of the first electrodes in the display apparatus according to a third embodiment of the present disclosure.
Figure 30:
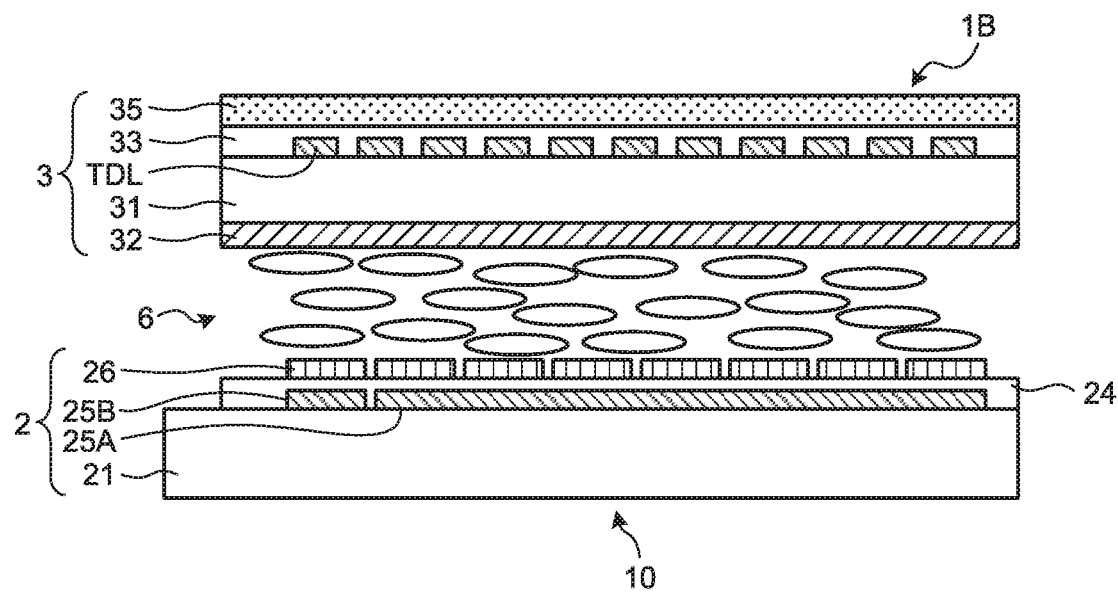
FIG. 30 is a sectional view of a schematic sectional structure of the detection display device according to the third embodiment.

FIG. 29 is a plan view of an example of arrangement of the first electrodes in the display apparatus according to a third embodiment of the present disclosure. FIG. 30 is a sectional view of a schematic sectional structure of the detection display device according to the third embodiment. While the first electrodes 25 according to the first and the second embodiments are arrayed in a matrix (row-column configuration), the configuration is not limited thereto.

As illustrated in FIG. 29, a display apparatus 1B according to the present embodiment includes first strip electrodes 25A and a second block electrode 25B. The first strip electrodes 25A and the second block electrode 25B are provided in the display region Ad of the first substrate 21. The first strip electrodes 25A extend in a direction along the long side of the display region Ad and are arrayed in a direction along the short side of the display region Ad.

The second block electrode 25B is a rectangular block electrode provided along the short side of the first strip electrode 25A. The second block electrode 25B is provided along the short side of the display region Ad on the side provided with the first IC 19. An end of the first strip electrode 25A faces an end of the second block electrode 25B with a space interposed therebetween.

As illustrated in FIG. 30, detection electrodes TDL are provided on a surface opposite to the surface provided with the color filter 32 of the second substrate 31. The detection electrodes TDL extend in a direction intersecting the extending direction of the first strip electrodes 25A. Capacitance is formed at the intersections of the detection electrodes TDL and the first strip electrodes 25A. The display apparatus 1B can detect the position of an external object in contact with or in proximity to the detector 30 based on signals corresponding to capacitance changes between the detection electrodes TDL and the first strip electrodes 25A according to the principle of what is called mutual capacitance touch detection.

As illustrated in FIG. 29, the present embodiment includes the fingerprint acquisition portion Fd at the position overlapping the second block electrode 25B. The second electrode controller 17 (refer to FIG. 1) switches the states of the second electrodes 26 in the fingerprint acquisition portion Fd between a floating state and a shielded state based on the CDM code $C_{mn}$. The calculator 40 decodes the detection signals output from the second block electrode 25B. The display apparatus 1B thus can detect capacitance changes caused by an external object, such as a finger, in contact with or in proximity to the detector 30 with satisfactory resolution.

The second block electrode 25B is provided to an outer part of the display region Ad on the side provided with the first IC 19. This configuration can suppress an effect on a displayed image in the detection operation. The display apparatus 1B can detect the shape of the surface of an external object in contact with or in proximity to the detector 30 using the second block electrode 25B different from the first strip electrodes 25A. Consequently, the display apparatus 1B can suppress generation of noise or the like in the detection operation performed by the first strip electrodes 25A. While the second block electrode 25B is disposed at the center in the outer part of the display region Ad on the side provided with the first IC 19, the position of the second block electrode 25B is not limited thereto. The second block electrode 25B may be disposed at the left or right end in the outer part on the side provided with the first IC 19 or in another outer part of the display region Ad on the side opposite to the side provided with the first IC 19.

EXAMPLES

Figure 31:
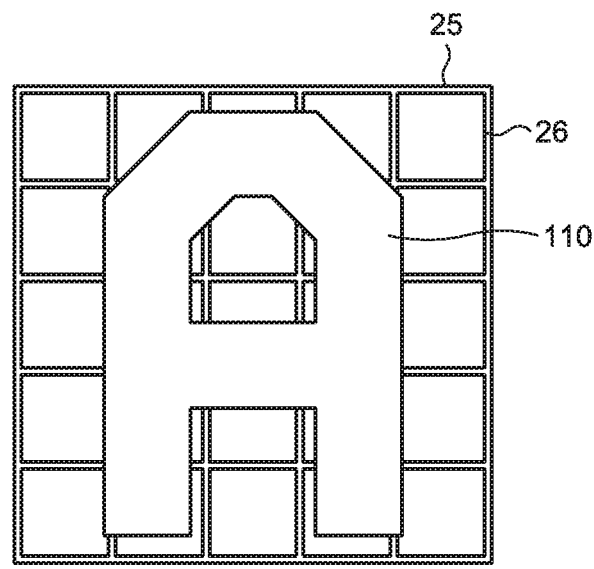
FIG. 31 is a plan view of a calculation model used for a simulation.
Figure 32:
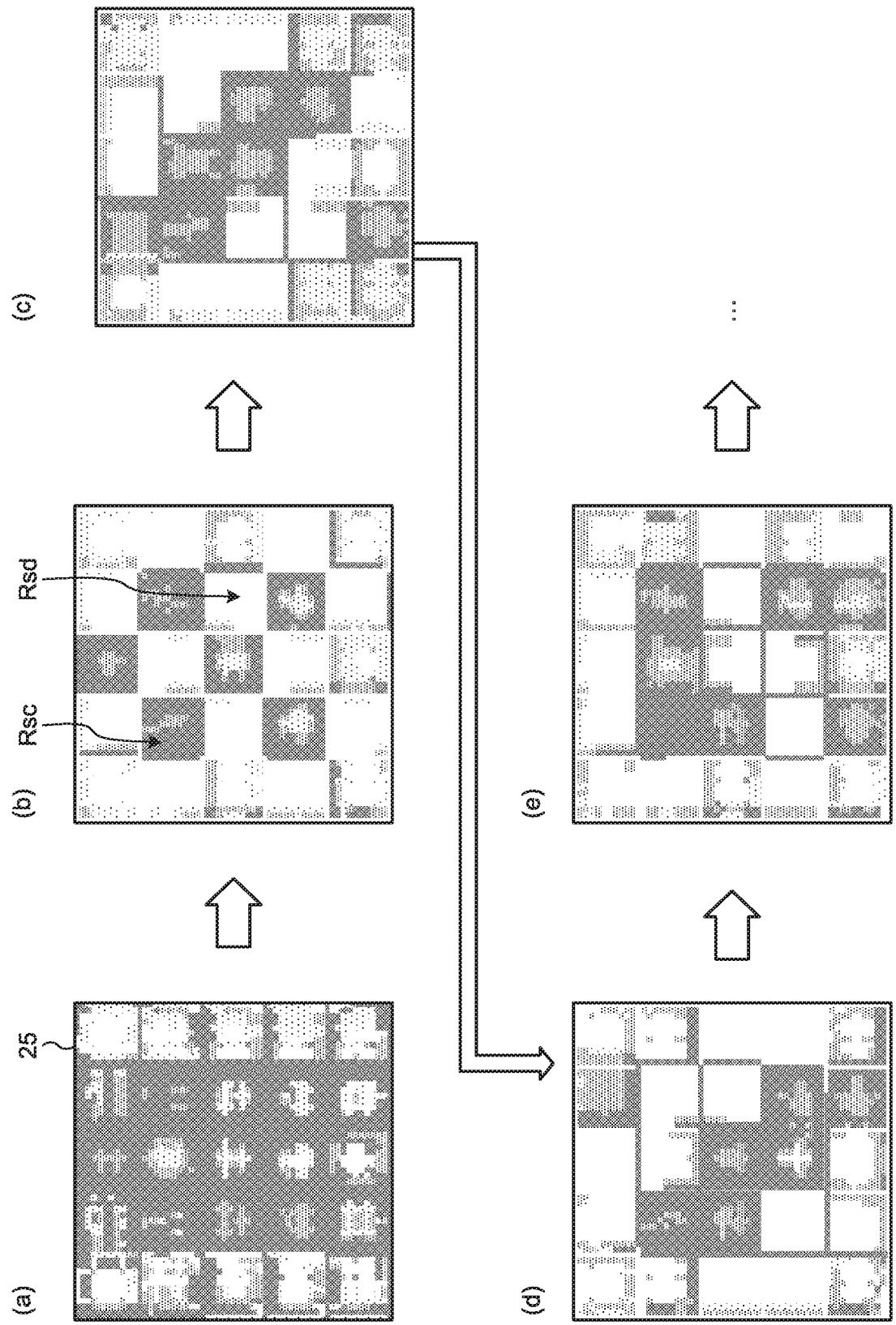
FIG. 32 is a diagram of simulation results of charge distribution in code division multiplex drive according to an example.
Figure 33:
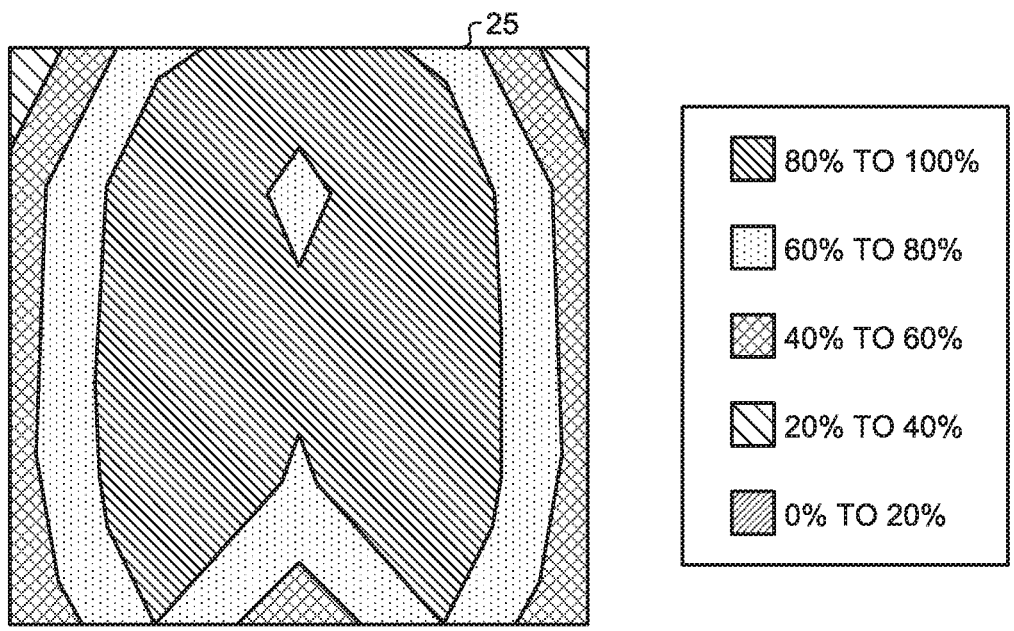
FIG. 33 is a graph of detection values resulting from decoding in code division multiplex drive according to the example.
Figure 34:
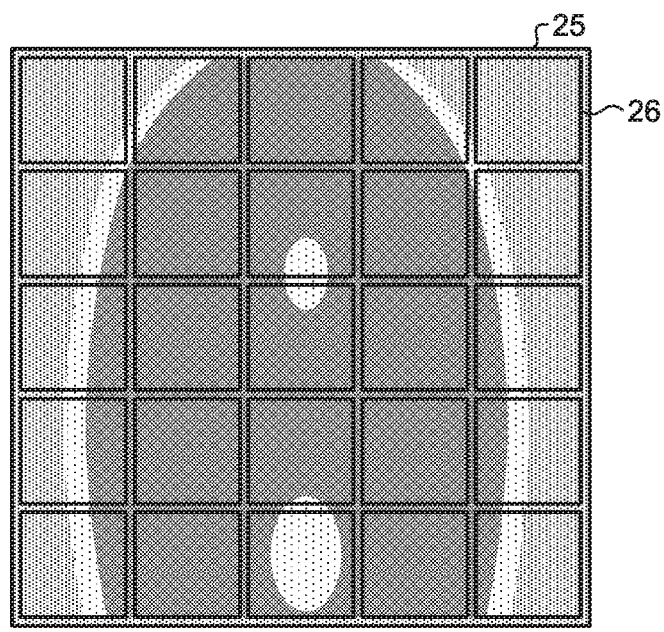
FIG. 34 is a diagram of simulation results of charge distribution in the display apparatus according to a comparative example.
Figure 35:
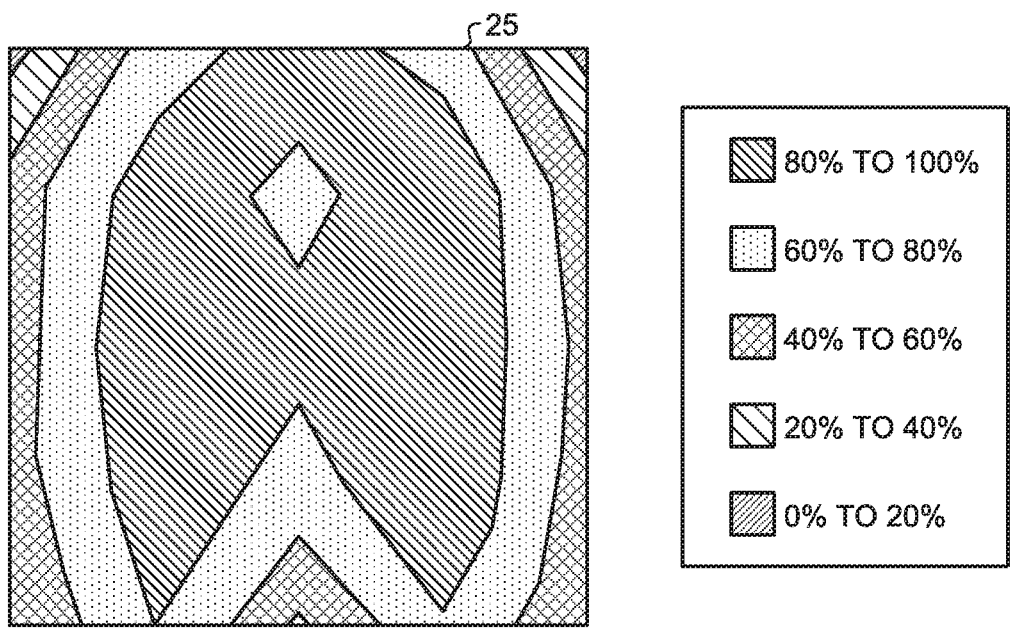
FIG. 35 is a diagram of detection values of the display apparatus according to the comparative example.

FIG. 31 is a plan view of a calculation model used for a simulation. FIG. 32 is a diagram of simulation results of charge distribution in code division multiplex drive according to an example. FIG. 33 is a graph of detection values resulting from decoding in code division multiplex drive according to the example. FIG. 34 is a diagram of simulation results of charge distribution in the display apparatus according to a comparative example. FIG. 35 is a diagram of detection values of the display apparatus according to the comparative example.

As illustrated in FIG. 31, a simulation was run in the present example using a model in which the second electrodes 26 in five rows and five columns overlap one first electrode 25. The present example calculated the distribution of sensor detection values obtained when an object to be detected 110 is positioned on the first electrode 25 and the second electrodes 26. The object to be detected 110 has an "A" shape in this example and has an outer shape smaller than that of the first electrode 25.

As illustrated in FIG. 32, the present example calculates charge distribution in the first electrode 25 obtained when code division multiplex drive is performed on the second electrodes 26. In FIG. 32, the magnitude of electric charges is represented by the shape of color. The portion in white indicates a small electric charge, and the portion in gray indicates a large electric charge. To simplify the drawing, FIG. 32 does not illustrate the second electrodes 26. In FIG. 32, the combination of the second electrodes 26 serving as the first selection target and the second electrodes 26 serving as the second selection target varies based on the CDM code.

The second electrodes 26 serving as the first selection target are in a floating state, and the electric charge of the first electrode 25 increases by proximity of the object to be detected 110. In an overlapping area Rsc illustrated in FIG. 32(b), for example, the second electrode 26 is in a floating state, and the object to be detected 110 is in proximity to the overlapping area Rsc. As a result, the electric charge is large. By contrast, in an overlapping area Rsd, the object to be detected 110 is in proximity thereto, but the second electrode 26 is in a shielded state. As a result, the electric charge is small. The present example simulates the distribution of electric charges for each column of the CDM code, thereby calculating the values corresponding to the magnitude of electric charges in the respective detection operations as the detection signal values.

The present example performed decoding on the detection signal values in the respective detection operations to calculate the distribution of sensor detection values in the first electrode 25 as illustrated in FIG. 33. FIG. 33 illustrates the distribution of variation of the sensor detection values based on the sensor detection value obtained when the object to be detected 110 is not present. As illustrated in FIG. 33, it was found that large sensor detection values are obtained at the positions overlapping the object to be detected 110 by performing code division multiplex drive on the second electrodes 26 and performing decoding.

In a comparative example illustrated in FIGS. 34 and 35, code division multiplex drive is not performed, and the second electrodes 26 are used as the detection electrodes. As illustrated in FIG. 34, the distribution of electric charges in the second electrodes 26 is high at the positions overlapping the object to be detected 110 and low at the positions not overlapping the object to be detected 110. As illustrated in FIG. 35, it was found that large sensor detection values are obtained at the positions overlapping the object to be detected 110 in the distribution of the sensor detection values from the respective second electrodes 26.

By comparing FIG. 33 with FIG. 35, it was found that decoding on the detection signals output from one first electrode 25 in the present example can provide the resolution for detection equivalent to the resolution obtained when detection is performed using a plurality of (25 in the comparative example) second electrodes 26.

While exemplary embodiments according to the present disclosure have been described, the embodiments are not intended to limit the disclosure. The contents disclosed in the embodiments are given by way of example only, and various changes may be made without departing from the spirit of the disclosure. Appropriate changes made without departing from the spirit of the disclosure naturally fall within the technical scope of the disclosure.

The display apparatus, for example, may be a detection apparatus not including the display device 20 but including the detector 30. In this case, the display apparatus simply needs to include at least the first substrate 21, the first electrodes 25, the second electrodes 26, the detection controller 16, and the second electrode controller 17.

What is claimed is:

1. A detection apparatus comprising:
a first substrate;
a first electrode disposed on the first substrate;
a plurality of second electrodes having an area smaller than an area of the first electrode and overlapping the first electrode;
a detection controller coupled to the first electrode and configured to detect a detection signal corresponding to a capacitance change in the first electrode; and
a second electrode controller configured to supply, to some of second electrodes in the second electrodes, a guard signal for suppressing a capacitance change in overlapping areas of the first electrode overlapping the respective second electrodes, wherein
the second electrode controller is configured to bring second electrodes serving as a first selection target out of the second electrodes into a floating state where an electric potential is not fixed and is configured to supply the guard signal to second electrodes serving as a second selection target not included in the first selection target,
the second electrode controller is configured to perform a first selection operation for bringing the second electrodes serving as the first selection target into a floating state and is configured to perform a second selection operation for bringing the second electrodes serving as the second selection target into a floating state at a timing different from a timing of the first selection operation,
a first detection signal is output from the first electrode to the detection controller in the first selection operation, and a second detection signal is output from the first electrode to the detection controller in the second selection operation, and
the detection controller includes a calculator configured to calculate difference between the first detection signal and the second detection signal.

2. The detection apparatus according to claim 1, wherein the detection controller includes a calculator configured to calculate the capacitance change in each of the overlapping areas based on the detection signal supplied from the first electrode.

3. The detection apparatus according to claim 1, wherein the detection controller is configured to supply a detection drive signal to the first electrode and is configured to be supplied with the detection signal due to the detection drive signal from the first electrode.

4. The detection apparatus according to claim 1, wherein the second electrodes are provided in a row-column configuration overlapping the first electrode.

5. The detection apparatus according to claim 1, wherein the second electrode controller is configured to perform the first selection operation and the second selection operation at successive timings.

6. The detection apparatus according to claim 1, wherein the detection controller is configured to provide signals having the same polarity to the first electrode in the first selection operation and the second selection operation.

7. The detection apparatus according to claim 1, wherein
the second electrode controller is configured to select a first group of the second electrodes as a first selection target and select a second group of the second electrodes as a second selection target at a first timing,
the second electrode controller is configured to select a third group of the second electrodes as the first selection target and select a fourth group of the second electrodes as the second selection target at a second timing,
the second electrode controller is configured to bring the first selection target into the floating state and supply the guard signal to the second selection target,
the first group of the second electrodes is equal to the third group of the second electrodes, and
the second group of the second electrodes is equal to the fourth group of the second electrodes.

8. The detection apparatus according to claim 1, wherein the second electrode controller includes a selection signal generator configured to generate a selection signal for selecting the second electrodes and an inversion circuit configured to generate a signal by inverting a high level part and a low level part of the selection signal.

9. The detection apparatus according to claim 1, wherein
a plurality of the first electrodes are arrayed in a row-column configuration,
the first electrodes are coupled to respective coupling wires, and
the detection signal is output to the detection controller via the coupling wires.

10. The detection apparatus according to claim 1, wherein the second electrode controller selects the second electrodes in units of a second electrode group including a plurality of second electrodes.

11. A display apparatus comprising:
the detection apparatus according to claim 1; and
a display layer configured to display an image.

12. The display apparatus according to claim 11, wherein the display layer is controlled by the first electrode and the second electrodes.

13. The display apparatus according to claim 11, wherein the first electrode is supplied with a display drive signal serving as a common potential for a plurality of pixels, and each the second electrodes is supplied with respective pixel signals in a display operation.

14. The display apparatus according to claim 11, wherein the second electrodes, the first electrode, and the display layer are provided in order from a display surface on which the image is displayed.

15. A detection method performed by a detection apparatus including:
a first substrate;
a first electrode disposed on the first substrate;
a plurality of second electrodes having an area smaller than the area of the first electrode and overlapping the first electrode;
a detection controller coupled to the first electrode and configured to detect a detection signal corresponding to a capacitance change in the first electrode; and
a second electrode controller configured to select some of second electrodes in the second electrodes, the detection method comprising step of
supplying, to the some of the second electrodes by the second electrode controller, a guard signal for suppressing a capacitance change in overlapping areas of the first electrode overlapping the respective second electrodes and supplying a detection signal corresponding to the capacitance change in the first electrode to the detection controller, wherein
the second electrode controller is configured to bring second electrodes serving as a first selection target out of the second electrodes into a floating state where an electric potential is not fixed and is configured to supply the guard signal to second electrodes serving as a second selection target not included in the first selection target,
the second electrode controller is configured to perform a first selection operation for bringing the second electrodes serving as the first selection target into a floating state and is configured to perform a second selection operation for bringing the second electrodes serving as the second selection target into a floating state at a timing different from a timing of the first selection operation,
a first detection signal is output from the first electrode to the detection controller in the first selection operation, and a second detection signal is output from the first electrode to the detection controller in the second selection operation, and
the detection controller includes a calculator configured to calculate difference between the first detection signal and the second detection signal.

16. A detection apparatus comprising:
a first substrate;
a first electrode disposed on the first substrate;
a plurality of second electrodes having an area smaller than an area of the first electrode and overlapping the first electrode;
a detection controller coupled to the first electrode and configured to detect a detection signal corresponding to a capacitance change in the first electrode; and
a second electrode controller configured to supply, to some of second electrodes in the second electrodes, a guard signal for suppressing a capacitance change in overlapping areas of the first electrode overlapping the respective second electrodes, wherein
the second electrode controller is configured to bring second electrodes serving as a first selection target out of the second electrodes into a floating state where an electric potential is not fixed and is configured to supply the guard signal to second electrodes serving as a second selection target not included in the first selection target,
wherein the second electrode controller is configured to select the second electrodes serving as the first selection target and the second electrodes serving as the second selection target corresponding to a selection signal that is based on a predetermined code, and
the selection signal based on the predetermined code is a signal that is based on a Hadamard matrix.

* * * * *